United States Patent
Kurokawa et al.

(10) Patent No.: US 9,177,203 B2
(45) Date of Patent: Nov. 3, 2015

(54) TARGET DETECTION DEVICE AND TARGET DETECTION METHOD

(71) Applicant: SECOM CO., LTD., Shibuya-ku, Tokyo (JP)

(72) Inventors: Takaharu Kurokawa, Mitaka (JP); Takumi Munekata, Mitaka (JP)

(73) Assignee: SECOM CO., LTD., Shibuya-ku (JP)

( * ) Notice: Subject to any disclaimer, the term of this patent is extended or adjusted under 35 U.S.C. 154(b) by 0 days.

(21) Appl. No.: 14/409,439

(22) PCT Filed: Jun. 28, 2013

(86) PCT No.: PCT/JP2013/067914
§ 371 (c)(1),
(2) Date: Dec. 18, 2014

(87) PCT Pub. No.: WO2014/003182
PCT Pub. Date: Jan. 3, 2014

(65) Prior Publication Data
US 2015/0146922 A1 May 28, 2015

(30) Foreign Application Priority Data
Jun. 29, 2012 (JP) ................................. 2012-147690

(51) Int. Cl.
*G06K 9/00* (2006.01)
*G06K 9/68* (2006.01)

(52) U.S. Cl.
CPC .............. *G06K 9/00624* (2013.01); *G06K 9/68* (2013.01)

(58) Field of Classification Search
CPC .............................. G06K 9/00624; G06K 9/68
See application file for complete search history.

(56) References Cited

U.S. PATENT DOCUMENTS

| 8,254,647 | B1 * | 8/2012 | Nechyba et al. | 382/118 |
| 8,351,661 | B2 * | 1/2013 | Begeja et al. | 382/118 |
| 8,411,912 | B2 * | 4/2013 | Bigioi et al. | 382/118 |
| 8,682,040 | B2 * | 3/2014 | Tsuji | 382/118 |

(Continued)

FOREIGN PATENT DOCUMENTS

| CN | 101021944 A | 8/2007 |
| JP | 2007-108990 | 4/2007 |

(Continued)

OTHER PUBLICATIONS

International Search Report for corresponding PCT Application No. PCT/JP2013/067914, mailed Aug. 13, 2013, 3pp.
Office action mailed Jul. 2, 2015 in corresponding Chinese Application No. 201380034610.7 including English translation, 16pp.

*Primary Examiner* — Tom Y Lu
(74) *Attorney, Agent, or Firm* — Christie, Parker & Hale, LLP

(57) ABSTRACT

A target detection device that determines whether input data acquired from a data input module contains a detection target, the target detection device including: a multi-level data generation module for generating, from the input data, a plurality of data mutually different in an information level, the information level being a degree representing the detection target; an evaluation value calculation module for calculating, for each of the plurality of data, an evaluation value representing a degree of likelihood of the detection target; and a target determination module for determining that the input data contains the detection target when an increasing degree by which the evaluation value calculated for each of the plurality of data mutually different in the information level increases according to increase of the information level is equal to or more than a lower limit value of the increasing degree where the input data contains the detection target.

17 Claims, 22 Drawing Sheets

(56) References Cited

U.S. PATENT DOCUMENTS 8,840,889 B2 * 9/2014 Chen .................... 424/139.1
8,942,434 B1 * 1/2015 Karakotsios et al. ........ 382/117

FOREIGN PATENT DOCUMENTS

| JP | 2009-230284 | 10/2009 |
| JP | 2010-166212 | 7/2010 |

* cited by examiner

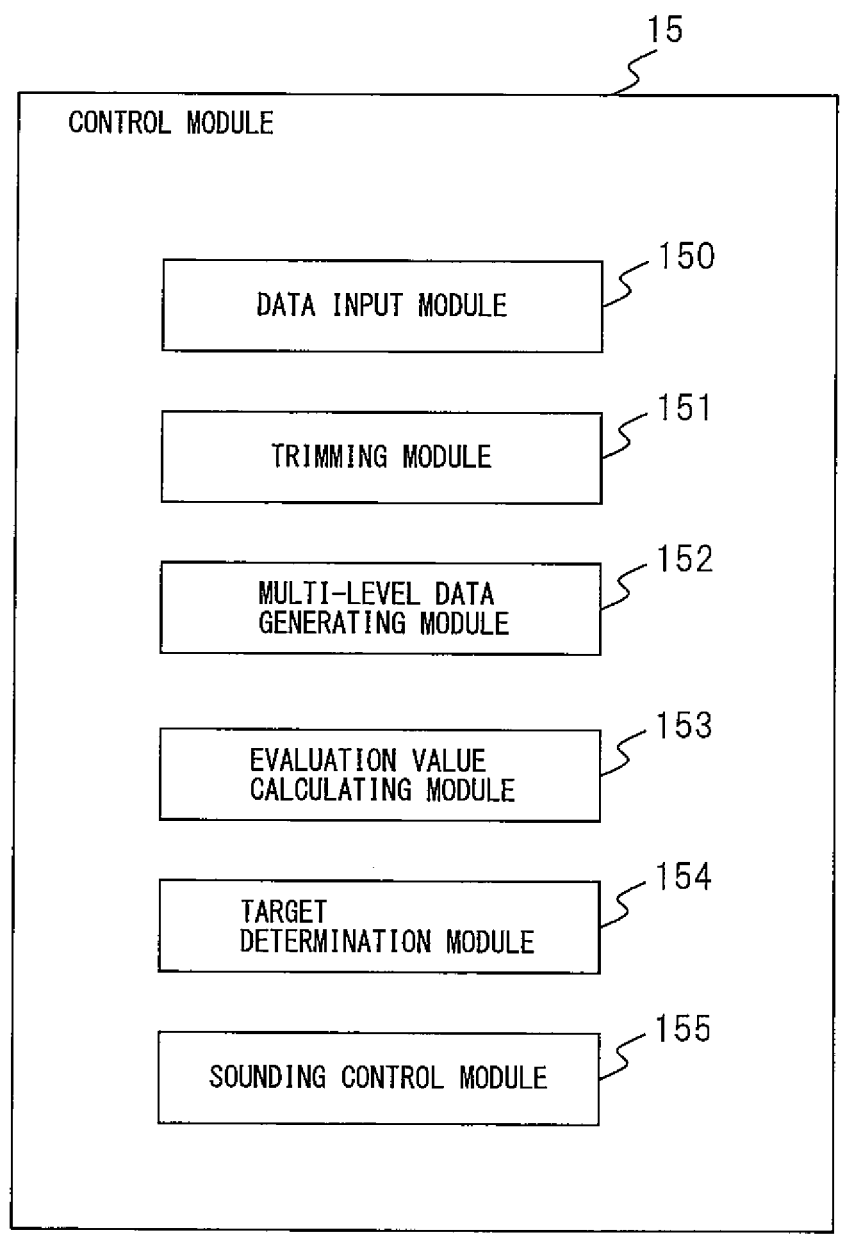

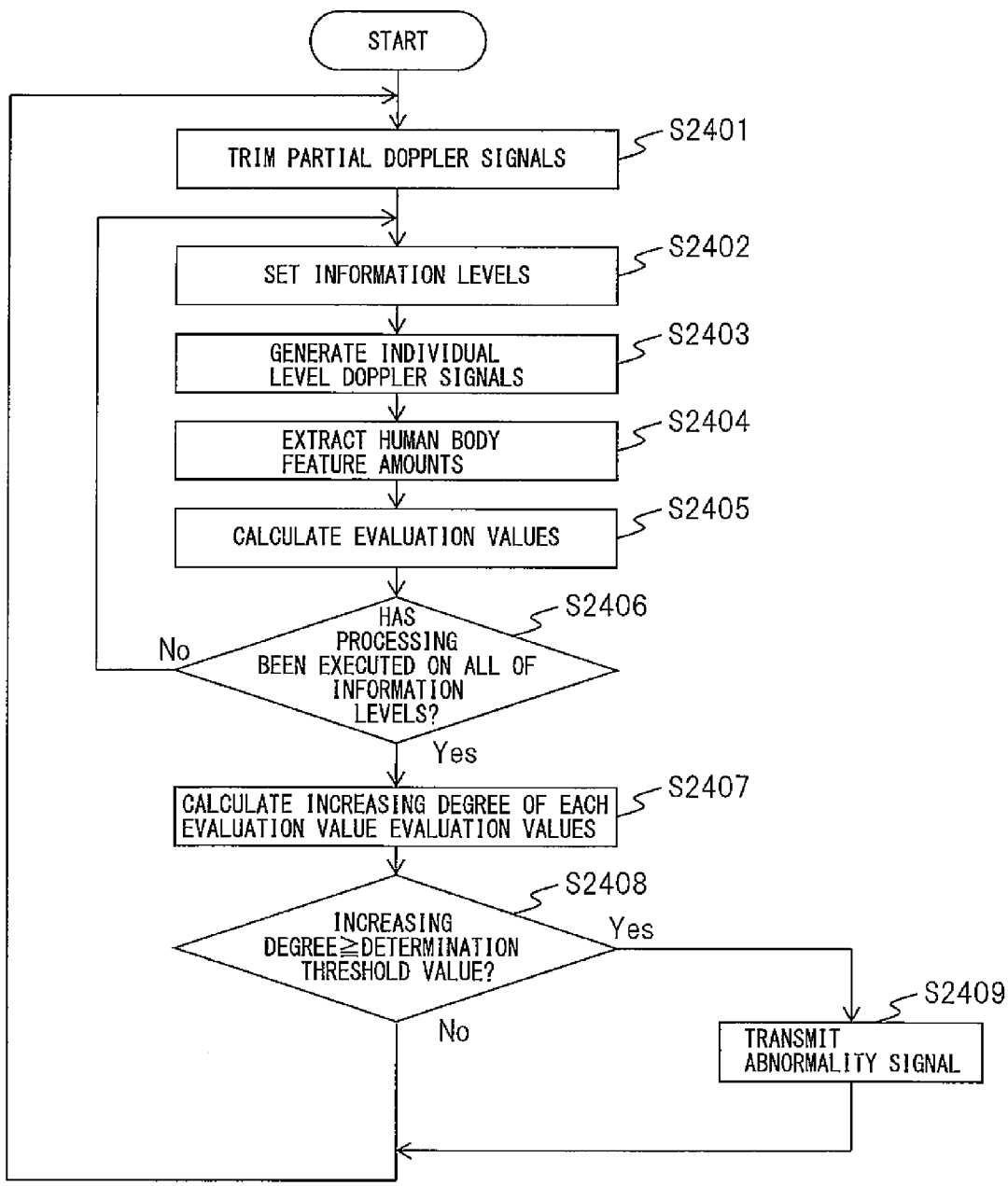

TARGET DETECTION DEVICE AND TARGET DETECTION METHOD

CROSS-REFERENCE TO RELATED APPLICATION

This application is a National Phase Patent Application and claims the priority of International Application Number PCT/JP2013/067914, filed on Jun. 28, 2013, which claims priority of Japanese Patent Application Number JP 2012-147690, filed on Jun. 29, 2012. The disclosures of which are hereby incorporated by reference.

TECHNICAL FIELD

This application relates to a target detection device and a target detection method for detecting a detection target from input data.

BACKGROUND

Conventionally, for various purposes including security, capturing or search of photos or videos, organization thereof, and the like, techniques for detecting a detection target such as a face or a person from data such as an image, a sound, or a sensor signal, have been studied. In particular, in recent years, techniques for detecting a detection target from an image using a classifier generated by machine learning, have been extensively studied. For example, a classifier for determining whether an image contains a person is generated, using a feature parameter(s) extracted from each of a large number of images for learning that contain a person and a large number of images for learning that do not contain the person, to perform machine learning of a decision boundary that partitions a feature parameter(s) space into a space where feature parameters of the person are distributed and a remaining space. When the feature parameter(s) extracted from the image is input, the classifier determines whether the image contains the person, depending on which side of the decision boundary the feature parameter(s) is located in the feature parameter(s) space.

However, images containing a person and images not containing the person have diversity, and it is generally difficult to find a decision boundary that can completely separate these images. In particular, for example, a feature parameter(s) extracted from an image containing something similar to a person, like a jacket hung on a hanger or the like, is highly likely to be located on a space side of a decision boundary where feature parameters of the person are distributed, which may lead to an erroneous determination that the image contains the person.

Accordingly, for example, Patent Literature 1 has proposed an object detection device for causing a classifier to learn in accordance with characteristics of an installation environment of the device. The object detection device causes the classifier to learn using images from a monitoring camera upon installation of the monitoring camera.

CITATION LIST

Patent Literature

Patent Literature 1: Japanese Unexamined Patent Publication No. 2009-230284

SUMMARY

Technical Problem

In the object detection device described in Patent Literature 1, the classifier is caused to learn using images from the monitoring camera after installation of the monitoring camera, which can thereby reduce an erroneous determination that an object similar to a person as an example of a detection target, like a jacket hung on a hanger in an installation place of the camera, is the person. However, when another object similar to the detection target is newly placed after causing the classifier to learn, the object detection device of Patent Literature 1 can erroneously determine that the new object is the detection target, since the classifier has not been caused to learn using images containing the new object.

The object detection device may improve detection accuracy for a detection target by performing machine learning using a large number of images. However, images containing objects other than the detection target have diversity. It is thus difficult to cause the classifier to learn so as to completely prevent erroneous determination regarding all images containing an object having a feature parameter(s) similar to a feature parameter(s) extracted from an image containing the detection target. A problem causing such an erroneous determination is common not only to the detection of a detection target using a classifier but also to detection of a detection target using other methods such as pattern matching, as well as common not only to the detection of a detection target from images but also to detection of a detection target from various types of data, such as a sound and a sensor signal.

It is an object of this application to provide a target detection device and a target detection method that can improve in accuracy for detecting a detection target from input data.

Solution Problem

According to an aspect of the device, there is provided a target detection device that determines whether input data acquired from a data input module contains a detection target. The target detection device including: a multi-level data generation module for generating, from the input data, a plurality of data mutually different in an information level, the information level being a degree representing the detection target; an evaluation value calculation module for calculating, for each of the plurality of data, an evaluation value representing a degree of likelihood of the detection target; and a target determination module for determining that the input data contains the detection target when an increasing degree by which the evaluation value calculated for each of the plurality of data mutually different in the information level increases according to increase of the information level is equal to or more than a lower limit value of the increasing degree where the input data contains the detection target.

Preferably, the information level is a degree of detail to which each of the plurality of data represents the detection target.

Preferably, the information level is a degree to which each of the plurality of data is suitable for feature representation of the detection target.

Preferably, the target determination module obtains, for each information level, a difference by subtracting the evaluation value of an information level lower by a predetermined number of levels than each information level from the evaluation value of each information level, and obtains any one of a total value and a maximum value of obtained differences, as the increasing degree.

Preferably, the target determination module obtains a difference by subtracting, in ascending order of the information level, the evaluation value of an information level lower by a predetermined number of levels than each information level from the evaluation value of each information level, obtains, each time the difference is obtained, an accumulated value of the obtained difference as the increasing degree, determines whether the obtained increasing degree is equal to or more than the lower limit value, and determines that the input data contains the detection target when the obtained increasing degree is equal to or more than the lower limit value.

Preferably, the target determination module obtains, as the increasing degree, any one of a difference obtained by subtracting a minimum value of the evaluation values of all the information levels from a maximum value of the evaluation values thereof and a ratio of the maximum value of the evaluation values of all the information levels to the minimum value of the evaluation values thereof.

Preferably, the target determination module determines that the input data contains the detection target when the increasing degree is equal to or more than the lower limit value and a representative evaluation value which is a statistical representative value of the evaluation value calculated for each of the plurality of data mutually different in the information level is equal to or more than a predetermined value, whereas determines that the input data does not contain the detection target when the increasing degree is less than the lower limit value or the representative evaluation value is less than the predetermined value.

Preferably, the input data is image data; and the multi-level data generation module generates, as the plurality of data mutually different in the information level, a plurality of data mutually different in sharpness in which the sharpness is higher as the information level is higher, whereas the sharpness is lower as the information level is lower.

Preferably, the multi-level data generation module generates, as the plurality of data mutually different in the sharpness, a plurality of data by applying an averaging filter which has a smaller filter size as the information level is higher and which has a larger filter size as the information level is lower, respectively.

Preferably, the multi-level data generation module generates, as the plurality of data mutually different in the information level, a plurality of data by superimposing, on the input data, a smaller amount of noise as the information level is higher and a larger amount of noise as the information level is lower, respectively.

Preferably, the input data is image data; and the multi-level data generation module generates, as the plurality of data mutually different in the information level, a plurality of data mutually different in image intelligibility in which the image intelligibility is higher as the information level is higher, whereas the image intelligibility is lower as the information level is lower.

Preferably, the multi-level data generation module generates, as the plurality of data mutually different in the image intelligibility, a plurality of data by increasing a number of gradation levels of pixel values of the input data as the information level is higher and by reducing the number of gradation levels of the pixel values of the input data as the information level is lower.

Preferably, the multi-level data generation module generates, as the plurality of data mutually different in the information level, a plurality of data by reducing a masking degree for a portion which represents the detection target in the input data as the information level is higher and by increasing the masking degree for the portion as the information level is lower.

Preferably, the multi-level data generation module generates a feature parameter(s) of the detection target, and generates, as the plurality of data mutually different in the information level, a plurality of data mutually different in information amount regarding the feature parameter(s) such that the information amount represented by the feature parameter(s) is larger as the information level is higher, whereas the information amount is smaller as the information level is lower.

Preferably, the multi-level data generation module generates, as the plurality of data mutually different in the information level, a plurality of data by multiplying respectively the feature parameter(s) by a positive coefficient of 1 or less which is larger as the information level is higher and which is smaller as the information level is lower.

Preferably, the input data is image data; and the multi-level data generation module generates, as the plurality of data mutually different in the information level, a plurality of data by geometrically converting the input data in a lesser degree as the information level is higher and in a greater degree as the information level is lower.

Preferably, the geometrical conversion is a conversion that rotates an image, and the multi-level data generation module generates, as the plurality of geometrically converted data, a plurality of data in which a rotation angle of the image is smaller as the information level is higher, whereas the rotation angle of the image is larger as the information level is lower.

Preferably, the geometrical conversion is a conversion that converts an image to a trapezoid, and the multi-level data generation module generates, as the plurality of geometrically converted data, a plurality of data in which a ratio of a bottom side and a top side of the trapezoid is closer to 1 as the information level is higher, whereas the ratio of the bottom side and the top side thereof is more distant from 1 as the information level is lower.

Preferably, the input data is a time-series signal, and the multi-level data generation module generates, as the plurality of data mutually different in the information level, a plurality of data by applying, to the input data, a band pass filter having a larger pass band as the information level is higher and having a narrower pass band as the information level is lower, respectively.

Preferably, the input data is a time-series signal, and the multi-level data generation module generates, as the plurality of data mutually different in the information level, a plurality of data by sampling the input data at a higher sampling frequency as the information level is higher and at a lower sampling frequency at the information level is lower, respectively.

Preferably, the input data is a time-series signal, and the multi-level data generation module generates, as the plurality of data mutually different in the information level, a plurality of data by attenuating amplitude of the input data such that the amplitude of the input data is larger as the information level is higher and the amplitude of the input data is smaller as the information level is lower, respectively.

Preferably, the input data is an acoustic signal, and the multi-level data generation module generates, as the plurality of data mutually different in the information level, a plurality of data by causing clipping to occur by amplifying amplitude of the input data such that the amplitude of the input data is smaller as the information level is higher and the amplitude of the input data is larger as the information level is lower, respectively.

Preferably, the input data is a time-series signal, and the multi-level data generation module generates, as the plurality of data mutually different in the information level, a plurality of data by quantizing the input data by increasing a number of steps for dividing a range in which a value of the input data can fall as the information level is higher and by reducing the number of steps therefor as the information level is lower, respectively.

Preferably, the evaluation value calculation module includes a classifier that has been caused to learn in advance using at least data containing the detection target so that when the data generated by the multi-level data generation module is input, the evaluation value calculation module outputs an evaluation value.

Preferably, the target detection device further includes a storage module for storing reference data generated in advance from data containing the detection target and the evaluation value calculation module calculates, as an evaluation value, a degree to which the data generated by the multi-level data generation module is similar to the reference data.

According to an aspect of the method, there is provided a target detection method for determining whether input data acquired from a data input module contains a detection target in a target detection device. The target detection method including: generating, from the input data, a plurality of data mutually different in an information level, the information level being a degree representing the detection target; calculating, for each of the plurality of data, an evaluation value representing a degree of likelihood of the detection target; and determining that the input data contains the detection target when an increasing degree by which the evaluation value calculated for each of the plurality of data mutually different in the information level increases according to increase of the information level is equal to or more than a lower limit value of the increasing degree where the input data contains the detection target.

According to an aspect of the computer program, there is provided a target detection computer program for causing a target detection device to determine whether input data acquired from a data input module contains a detection target, and to execute a process. The process including: generation of a plurality of data mutually different in an information level as a degree of representation of the detection target from the input data; calculation of an evaluation value representing a degree of likelihood of the detection target for each of the plurality of data; and determination that the input data contains the detection target when an increasing degree by which the evaluation value calculated for each of the plurality of data mutually different in the information level increases according to increase of the information level is equal to or more than a lower limit value of the increasing degree where the input data contains the detection target.

Advantageous Effects of Invention

The target detection device and the target detection method can improve in accuracy for detecting a detection target from input data.

BRIEF DESCRIPTION OF DRAWINGS

FIG. 3 is a schematic structural diagram of a control module of the intercom according to the first embodiment.

FIG. 24 is a flowchart depicting an operation of target detection processing by the human body sensor according to the sixth embodiment.

DESCRIPTION OF EMBODIMENTS

A description will be given below of a target detection device according to an embodiment with reference to the drawings.

The target detection device obtains a feature parameter(s) specific to a detection target from input data that is a subject for detection processing, inputs the obtained feature parameter(s) to a classifier generated by machine learning to calculate an evaluation value representing a degree of likelihood of the detection target, and then determines whether the input data contains the detection target, from the calculated evaluation value. The present inventor repeated extensive and intensive studies and found that when a plurality of data mutually different in an information level is generated from input data and an evaluation value is calculated from each of the plurality of data, there is a great difference between input data containing a detection target and input data not containing the detection target as to how the evaluation value changes according to change of the information level. The information level of data is a degree to which the data represents features of a detection target, which is a degree of detail (a degree to which representation is possible) to which the data represents the features of the detection target or a degree to which the data is suitable for feature representation of the detection target.

Figure 1A:
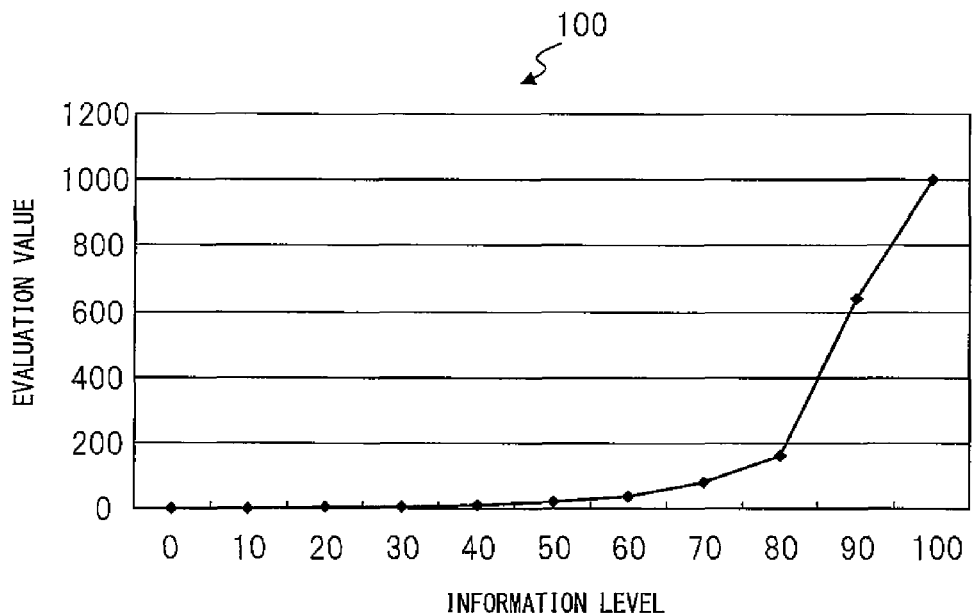
FIG. 1A is a graph depicting an example of a relationship between the information level and the evaluation value.
Figure 1B:
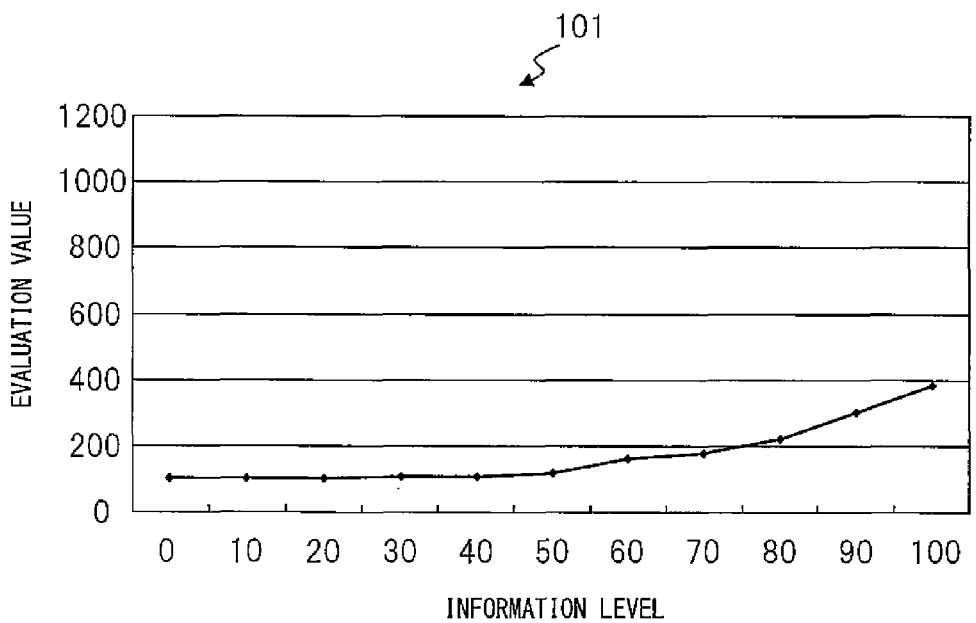
FIG. 1B is a graph depicting an example of a relationship between the information level and the evaluation value.

Each of FIGS. 1A and 1B depicts an example of a relationship between the information level of data and the evaluation value representing a degree of likelihood of the data to a detection target. A graph 100 of FIG. 1A depicts an example of the relationship between the information level and the evaluation value when input data contains the detection target and a graph 101 of FIG. 1B depicts an example of the relationship between the information level and the evaluation value when the input data does not contain the detection target. In each of FIGS. 1A and 1B, the horizontal axis represents the information level and the vertical axis represents the evaluation value. As depicted in FIG. 1A, when the input data contains the detection target, the evaluation value tends to sharply increase along with increase of the information level. On the other hand, as depicted in FIG. 1B, when the input data does not contain the detection target, the evaluation value does not increase so sharply as compared to when the input data contains the detection target, even though the information level increases. In addition, such a tendency is observed regardless of a magnitude of the evaluation value itself. In other words, even when a feature parameter(s) of the detection target obtained from the input data is located on a side that is not a detection target side with respect to a decision boundary in a feature parameter(s) space despite that the input data contains the detection target, the evaluation value tends to increase sharply when the information level increases. On the other hand, even when the feature parameter(s) of the detection target obtained from the input data is located on the detection target side with respect to the decision boundary in the feature parameter(s) space despite that the input data does not contain the detection target, the evaluation value tends not to increase sharply even when the information level increases.

Thus, the target detection device according to an embodiment generates a plurality of data mutually different in the information level from input data, obtains a feature parameter(s) of a detection target for each of the generated plurality of data, and inputs the obtained feature parameter(s) to a classifier generated by machine learning to calculate each evaluation value. Then, the target detection device obtains an increasing degree by which the calculated evaluation value increases according to increase of the information level, and determines that the input data contains the detection target when the obtained increasing degree is equal to or more than a lower limit value of the increasing degree where the input data contains the detection target. In other words, the target detection device determines whether the input data contains the detection target, not depending on which side of the decision boundary the feature parameter(s) of the detection target is located on in the feature parameter(s) space but depending on a change of a position of the feature parameter(s) with respect to the decision boundary when the information level is changed. In this way, the target detection device intends to improve accuracy for detecting a detection target from input data.

Hereinbelow, a description will be given of an intercom incorporating a target detection device according to a first embodiment, with reference to the drawings. The intercom is installed at an entrance or the like. When a call button is pressed, the intercom captures an image of the entrance or the like to determine whether the face of a person is contained in the captured image. Then, when the captured image contains the face of the person, the intercom causes a buzzer installed inside the room to sound to notify the presence of a visitor to someone in the room. On the other hand, when the captured image does not contain the face of the visitor, the intercom determines that the call button has been mischievously pressed and does not cause the buzzer to sound. In other words, in the intercom according to the present embodiment, input data is image data and detection target is the face of a person.

Figure 2:
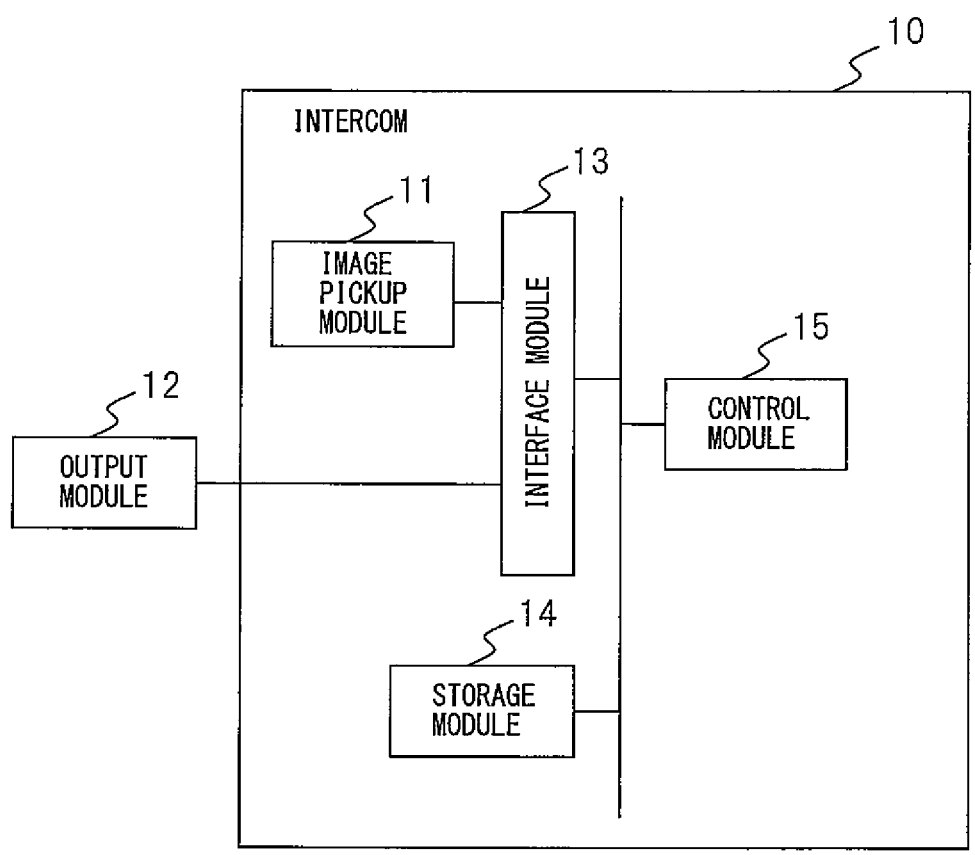
FIG. 2 is a schematic structural diagram of an intercom according to a first embodiment.

FIG. 2 is a diagram depicting a schematic structure of the intercom according to the present embodiment. An intercom 10 includes an imaging module 11, an output module 12, an interface module 13, a storage module 14, and a control module 15, as depicted in FIG. 2. The following is a detailed description of each of the modules of the intercom 10.

The imaging module 11 is a camera that captures an image of the entrance or the like where the intercom 10 is installed. The imaging module 11 includes, for example, photoelectric conversion elements (for example, CCD sensors, C-MOS sensors, or the like) arranged in a two-dimensional array and outputting electric signals corresponding to an amount of received light and an imaging optical system for forming an image of a monitored region on the photoelectric conversion elements. The imaging module 11 is connected to the interface module 13 to send a captured image to the interface module 13.

The captured image can be a grayscale or color multi-gradation image. In the present embodiment, the captured image is a grayscale image having 320 pixels wide and 240 pixels high and having an 8-bit luminance resolution. Alternatively, as the captured image, there can be used an image that has a resolution and a gradation other than those in the present embodiment.

The output module 12 is an example of a notification module and has, for example, a buzzer. The output module 12 is arranged inside a house and connected to the interface module 13. When a buzzer sounding signal is input through the interface module 13, the output module 12 sounds the buzzer to notify the presence of a visitor to a person in the house.

The interface module 13 includes an interface circuit connected to the imaging module 11 and the output module 12, for example, an interface circuit equivalent to a video interface and an audio interface or a serial bus such as a universal serial bus. The interface module 13 is connected to the control module 15 via, for example, a bus, and outputs the buzzer sounding signal received from the control module 15 to the output module 12.

The storage module 14 includes semiconductor memories such as a ROM (Read Only Memory) and a RAM (Random Access Memory). The storage module 14 stores a computer program for controlling the intercom 10 and various kinds of data, and inputs/outputs the stored information from/to the control module 15. The various kinds of data include reference data of face.

The control module 15 is an example of the target detection device and includes at least one processor of a CPU (Central Processing Unit), a DSP (Digital Signal Processor), an MCU (Micro Control Unit), and the like and a peripheral circuit thereof. The control module 15 reads the captured image stored in the storage module 14 to determine whether the captured image contains a face and also controls sounding of the buzzer of the output module 12.

FIG. 3 is a diagram depicting a schematic structure of the control module 15. As depicted in FIG. 3, the control module 15 includes a data input module 150, a trimming module 151, a multi-level data generation module 152, an evaluation value calculation module 153, a target determination module 154, and a sounding control module 155, as functional modules mounted by software operating on the processor.

Each of these modules included in the control module 15 may be configured by an independent integrated circuit, firmware, a microprocessor, or the like.

Each of the modules included in the control module 15 will be described in detail below.

The data input module 150 reads the captured image from the storage module 14 and sends the image to the trimming module 151.

The trimming module 151 sequentially trims an image with a predetermined size to be used as a target of detection processing from the captured image acquired from the data input module 150, and sends the trimmed image to the multi-level data generation module 152. The trimming module 151 sets a plurality of trimming positions in the captured image and also sets a plurality of sizes for an image to be trimmed in a range of a size of the face of the visitor in the captured image assumed from a state of installation of the imaging module 11 and an individual difference between visitors. Then, the trimming module 151 sequentially trims partial images of a number of combinations of the set positions and the set sizes. For example, the trimming positions can be set to positions shifted by every half of a length in a horizontal direction of an image to be trimmed in the horizontal direction from a left upper end of the captured image and positions shifted by every half of a length in a vertical direction of the image to be trimmed in the vertical direction additionally from those positions. Hereinafter, an image trimmed by the trimming module 151 will be referred to as partial image. In the embodiment, a partial image is an example of the input data.

The multi-level data generation module 152 generates a plurality of data mutually different in an information level from input data, correlates the generated data with information levels, and sends the data to the evaluation value calculation module 153. Hereinafter, the plurality of data mutually different in the information level is referred to as multi-level data. The multi-level data generation module 152 in the present embodiment generates a plurality of images mutually different in an information level (hereinafter referred to as individual level images) from each partial image trimmed from the captured image as the input data to generate, as multi-level data, the original partial image and the generated individual level images.

The multi-level data generation module 152 of the present embodiment generates, as the multi-level data, a plurality of images mutually different in sharpness in which the sharpness is higher as the information level is higher, whereas the sharpness is lower as the information level is lower. The multi-level data generation module 152 performs averaging processing of a partial image to generate individual level images having low sharpness. For example, the multi-level data generation module 152 applies, to the partial image, an averaging filter smaller in a filter size as the information level is higher and larger in the filter size as the information level is lower, respectively, to generate a plurality of individual level images mutually different in the sharpness. When the filter size of the averaging filter is n (for example, n represents an integer of from 2 to 30), an average value of pixel values of pixels present in a range of n pixels×n pixels centered around the corresponding pixels in the partial image is set for each pixel of the individual level images. In other words, as the filter size becomes larger, the averaging filter has a narrower pass band, so that the resulting individual level image becomes a blurred image and has lower sharpness. As a result, since a degree to which the individual level image can represent facial features becomes lower, the information level becomes lower. For example, information levels are set to 30 levels from 1 to 30. Then, a filter size at an information level of 1 is 30, and as the information level becomes higher by every 1, the filter size is set to a value smaller by 1. In addition, when the information level is a maximum value of 30, there is used an original partial image to which the averaging filter has not been applied.

The evaluation value calculation module 153 calculates an evaluation value representing a degree of likelihood of a detection target for each data including in the multi-level data, correlates each evaluation value with each information level, and sends to the target determination module 154. The evaluation value calculation module 153 in the present embodiment includes a Real-Adaboost classifier using a Haar-like feature parameter(s) as a facial feature parameter(s), which is one or more feature parameters useful for discrimination of the face of a person. The Haar-like feature parameter(s) is a luminance difference between a plurality of adjacent rectangular regions arbitrarily set in an image region. A detail of Haar-like feature parameter(s) is disclosed, for example, in Paul Viola and Michael Jones, "Rapid Object Detection using a Boosted Cascade of Simple Features", IEEE CVPR, vol. 1, pp. 511-518, 2001.

The Real-Adaboost classifier includes a plurality of weak classifiers and a strong classifier that integrates determination results of the respective weak classifiers to determine. For each of the weak classifiers, a feature parameter(s) is calculated from an image using a Haar-like feature parameter(s) predetermined in each weak classifier. Each of the weak classifiers outputs a higher value as the corresponding partial image is more likely to contain the face and outputs a lower value as the corresponding partial image is less likely to contain the face. On the other hand, the strong classifier outputs, as an evaluation value, a sum of the output values from each of the weak classifiers. The evaluation value includes at least three or more values, which are, for example, consecutive values.

The adjacent rectangular region whose Haar-like feature parameter(s) is to be used as each weak classifier is determined by preliminarily learning from a plurality of facial images for learning containing the face and a plurality of non-facial images for learning not containing the face (the facial images for learning and the non-facial images for learning will be hereinafter collectively referred to as leaning images). An outline of learning steps will be as follows.

(1) A computer that performs preliminarily learning sets, for each image for learning, a plurality of adjacent rectangular regions in an image region and calculates a Haar-like feature parameter(s) regarding each of the set adjacent rectangular regions.

(2) The computer determines a weight for each image for learning. An initial value of the weight is the same value in each image for learning.

(3) The computer calculates, for each of the set adjacent rectangular regions, a probability density distribution $W_+^j$ of the facial image for learning from the weight set regarding the facial image for learning, per Haar-like feature parameter(s) regarding the each set adjacent rectangular region. The character "j" represents a number corresponding to a value of the Haar-like feature parameter(s). Similarly, the computer calculates, for each of the set adjacent rectangular regions, a probability density distribution $W_-^j$ of the facial image for learning from the weight set regarding the non-facial image for learning, per Haar-like feature parameter(s) regarding the each set adjacent rectangular region. The computer may quantize each Haar-like feature parameter(s) by dividing a range in which the value of the Haar-like feature parameter(s) can fall into a plurality of sections to calculate a probability density distribution and a probability density distribution $W_-^j$.

(4) The computer calculates, regarding each Haar-like feature parameter(s), an evaluation value Z from the probability density distribution $W_+^j$ of the facial image for learning and the probability density distribution $W_+^j$ of the non-facial image for learning by the following formula:

$$Z = 2 \sum_j \sqrt{W_+^j W_-^j} \quad (1)$$

A smaller coupling degree Z means that the distribution of the facial image for learning is more discrete from the distribution of the non-facial image for learning. Accordingly, the computer selects the Haar-like feature parameter(s) regarding an adjacent rectangular region in which the evaluation value Z is a minimum value, as a single weak classifier. An output h(x) of the weak classifier is represented by the following formula:

$$h(x) = \frac{1}{2} \ln \frac{W_+^j + \varepsilon}{W_-^j + \varepsilon} \quad (2)$$

In the formula, "x" represents a value of the Haar-like feature parameter(s) input to the weak classifier, and "$\varepsilon$" represents a constant value (for example, $10^{-10}$) for preventing the denominator from being 0. As depicted in the formula (2), the weak classifier outputs a larger value as the probability density distribution $W_+^j$ of the facial image for learning corresponding to an input value (Haar-like feature parameter(s)) is larger, and outputs a smaller value as the probability density distribution $W_-^j$ of the non-facial image for learning corresponding to the input value is larger. Then, the weak classifier outputs a positive value when the probability density distribution $W_+^j$ of the facial image for learning is larger than the probability density distribution $W_-^j$ of the non-facial image for learning, outputs a negative value when the probability density distribution $W_+^j$ is smaller than the probability density distribution $W_-^j$, and outputs 0 when both of the distributions $W_+^j$ and $W_-^j$ are the same.

(5) The computer increases the weight of an image for learning for which the weak classifier using the selected Haar-like feature parameter(s) has failed to discriminate and decreases the weight of an image for learning for which the weak classifier has succeeded to discriminate. Then, the computer normalizes weights of the images for learning so that a sum of weights of all the images for learning is 1.

(6) The computer repeats the steps of from (3) to (5) a predetermined number of times.

The storage module 14 stores, as reference data of face, information of the Haar-like feature parameter(s) used as each weak classifier, information representing the adjacent rectangular regions, and information representing an output function of each weak classifier determined as above.

The evaluation value calculation module 153 uses, as an evaluation value, a sum of output values of each weak classifier selected in (4). The evaluation value is a positive value when the Haar-like feature parameter(s) is located in a face-side region with respect to the decision boundary in the feature parameter(s) space, whereas the evaluation value is a negative value when the Haar-like feature parameter(s) is located in a non-face side region with respect to the decision boundary. An absolute value of the evaluation value becomes larger as the position of the feature parameter(s) is more distant from the decision boundary, whereas the absolute value becomes smaller as the position is closer to the decision boundary.

Figure 4A:
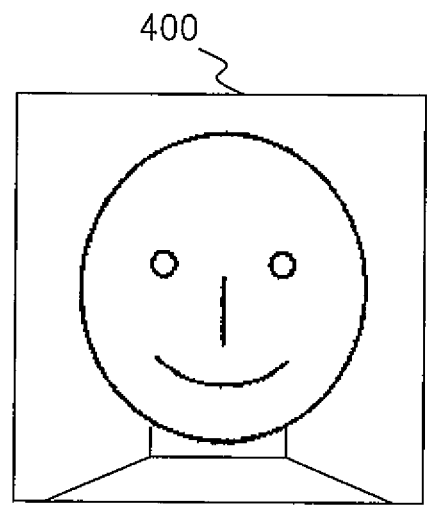
FIG. 4A is an example of an image containing a human face.
Figure 4B:
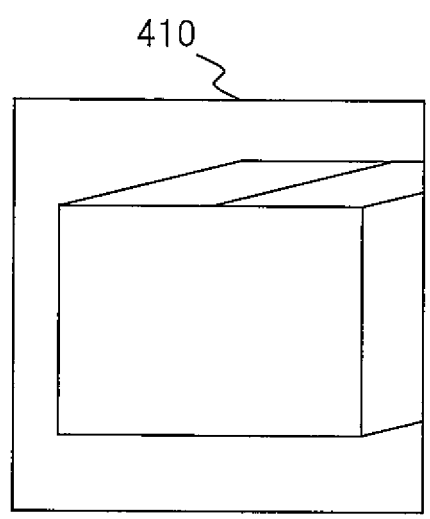
FIG. 4B is an example of an image containing no human face.

FIGS. 4A and 4B depict examples of partial images. A partial image 400 depicted in FIG. 4A is an image that obviously contains the face of a person, whereas a partial image 410 depicted in FIG. 4B is an image that obviously does not contain the face of a person.

Figure 5:
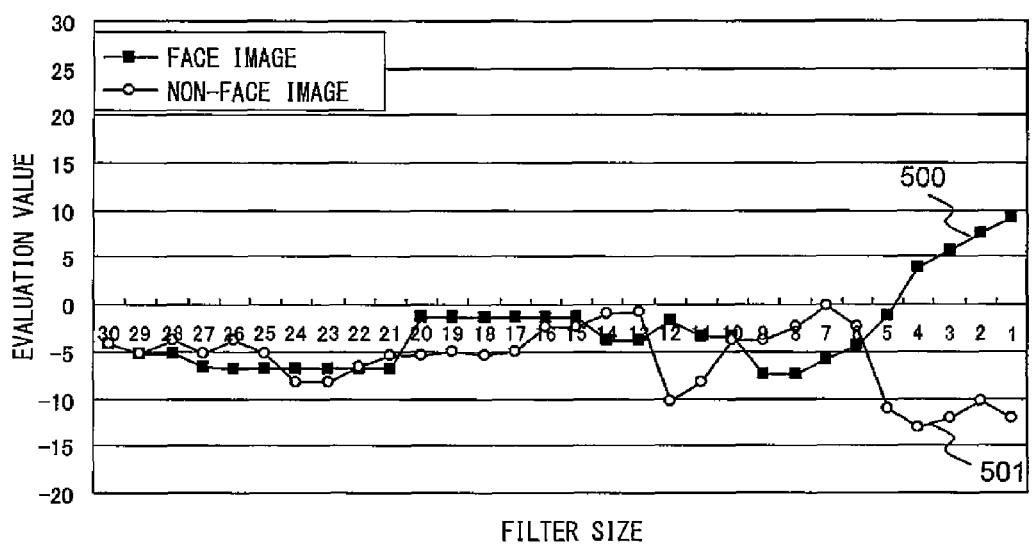
FIG. 5 is a graph depicting an example of a relationship between filter size and evaluation value.

FIG. 5 depicts an example of a relationship between filter sizes of an averaging filter applied to the partial images 400 and 410 by the multi-level data generation module 152 and evaluation values calculated by the evaluation value calculation module 153 from images generated by applying the averaging filter having the filter sizes. In FIG. 5, the horizontal axis represents filter size and the vertical axis represents evaluation value. When the filter size is 2 or more, the filter size is set to n (n represents an integer of from 2 to 30) and evaluation values are calculated regarding individual level images generated by applying an averaging filter with a size of n pixels×n pixels to a partial image. When the filter size is 1, an evaluation value is calculated regarding the original partial image to which no averaging filter has been applied. The evaluation value obtained at the filter size of 1, i.e., the evaluation value for the original partial image indicates a sign of a correct answer. Accordingly, regarding the partial images 400 and 410, even the use of the evaluation value for the original partial image allows a correct determination as to whether the image contains the face.

Figure 6A:
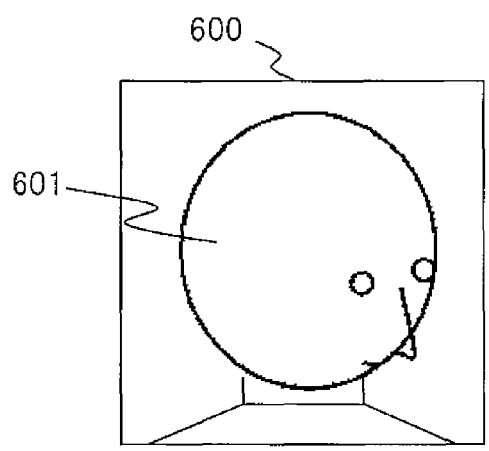
FIG. 6A is an example of an image containing a human face.
Figure 6B:
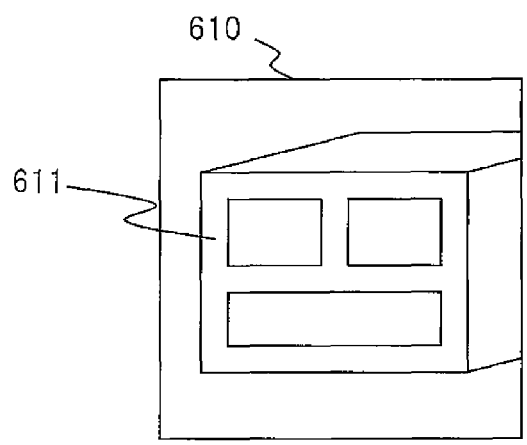
FIG. 6B is an example of an image containing no human face.

On the other hand, FIGS. 6A and 6B depict other examples of partial images. A partial image 600 depicted in FIG. 6A contains a face 601 of a person. However, the person is looking down, so that the partial image 600 is an image in which it is difficult to determine whether the face of the person is visible in the image. In addition, a partial image 610 depicted in FIG. 6B does not contain the face of a person but contains an object 611 easily mistaken as the face of a person.

Figure 7:
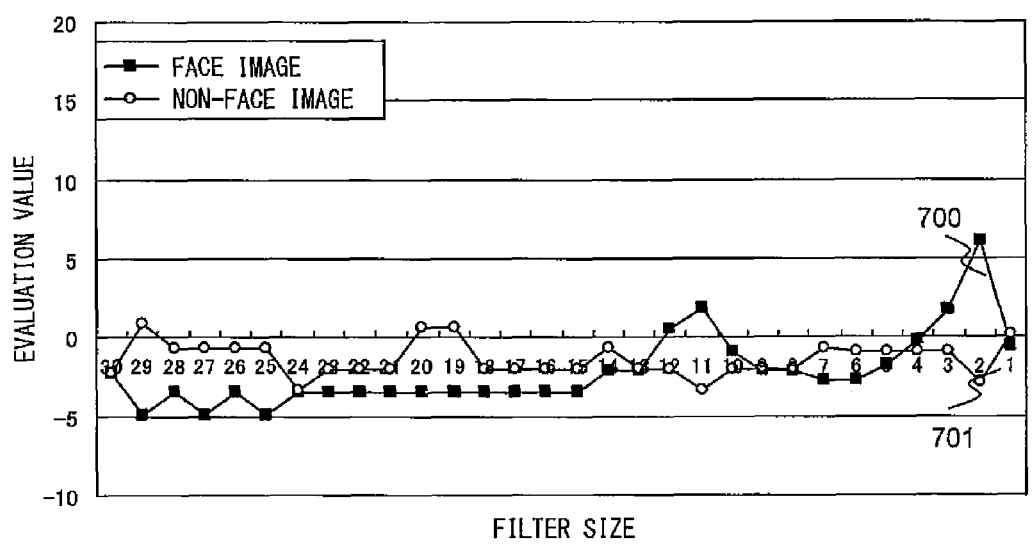
FIG. 7 is a graph depicting an example of a relationship between filter size and evaluation value.

FIG. 7 depicts an example of a relationship between filter sizes of an averaging filter applied to the partial images 600 and 610 by the multi-level data generation module 152 and evaluation values calculated by the evaluation value calculation module 153 from images generated by applying the averaging filter having the filter sizes. In FIG. 7, the horizontal axis represents filter size and the vertical axis represents evaluation value. An evaluation value at the filter size of 1, i.e., the evaluation value for the original partial image is a value of an incorrect answer, since the signs of plus and minus are reversed. Accordingly, regarding the partial images 600 and 610, it is difficult to correctly determine whether the face is contained in the image from the evaluation value for the original partial image.

On the other hand, in a graph 500 of FIG. 5, the evaluation value sharply increases in a range of filter sizes of from 9 to 1, and in a graph 700 of FIG. 7, the evaluation value sharply increases in a range of filter sizes of from 7 to 2. In contrast, the evaluation value of a graph 501 and the evaluation value of a graph 701 do not increase so much as those of the graphs 500 and 700.

Figure 8:
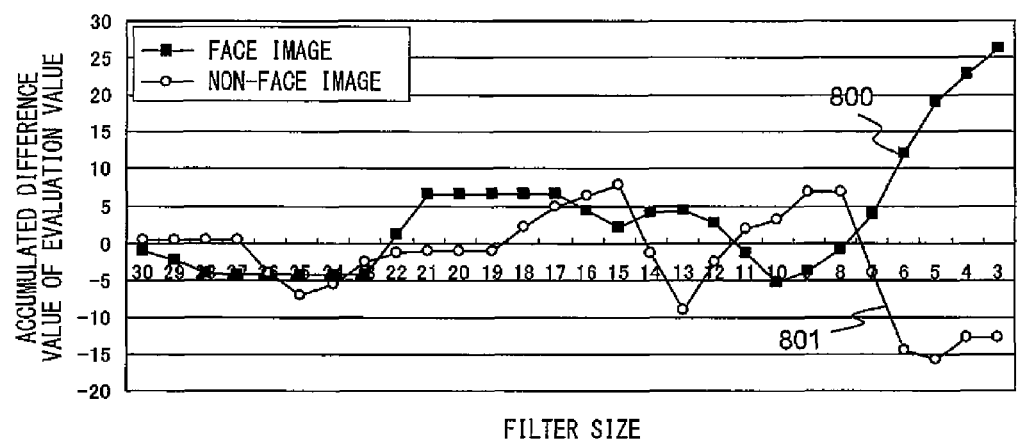
FIG. 8 is a graph depicting an example of a relationship between filter size and accumulated evaluation value difference.
Figure 9:
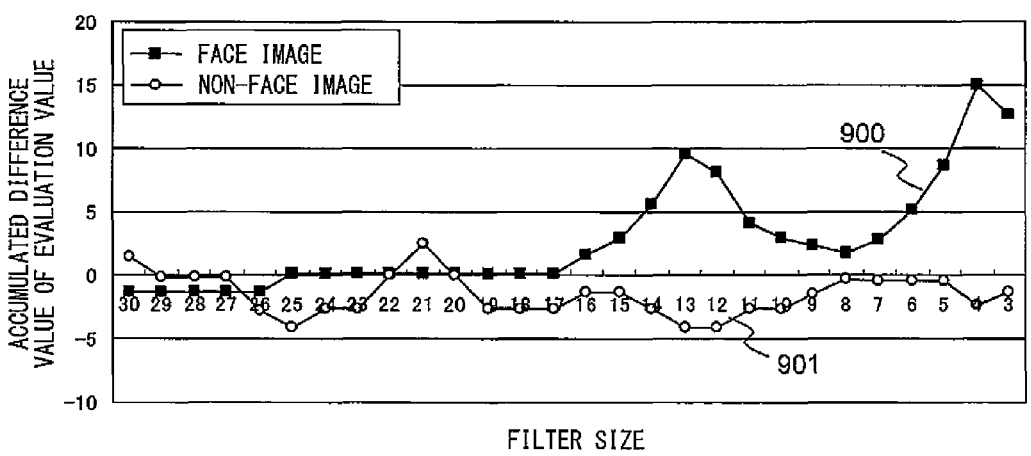
FIG. 9 is a graph depicting an example of a relationship between filter size and accumulated evaluation value difference.

FIGS. 8 and 9 depict graphs each indicating an increasing degree of an evaluation value according to changes of the filter size of an averaging filter applied to a partial image. When the filter size is an odd number, the averaging filter is applied in such a manner that an element at a center position of the filter corresponds to a center pixel of a region to which the filter is applied in the partial image. However, when the filter size is an even number, there is no element at the center position of the filter, so that the averaging filter is applied in a state in which the filter is shifted by every 0.5 pixels in the horizontal direction and the vertical direction, respectively. Thus, in FIGS. 8 and 9, in order to eliminate an inconsistency between filter sizes of odd numbers and filter sizes of even numbers, the vertical axis represents accumulated value (hereinafter referred to as accumulated difference value) obtained by accumulating, in descending order of filter size, a difference obtained by subtracting an evaluation value corresponding to each filter size from an evaluation value corresponding to a filter size smaller by only 2 than the filter size, and the horizontal axis represents filter size. A graph 800 of FIG. 8 indicates accumulated difference values of evaluation values of the graph 500 of FIG. 5, and a graph 801 thereof indicates accumulated difference values of evaluation values of the graph 501 thereof. In addition, a graph 900 of FIG. 9 indicates accumulated difference values of evaluation values obtained from the graph 700 of FIG. 7, and a graph 901 thereof indicates accumulated difference values of evaluation values obtained from the graph 701 thereof.

In the graph 500 of FIG. 5, since the evaluation value increases in the range of filter sizes of from 9 to 1, differences obtained by subtracting respective evaluation values corresponding to filter sizes of from 9 to 3 from respective evaluation values corresponding to filter sizes of from 7 to 1 are positive values. Thus, in the graph 800 of FIG. 8, the accumulated difference value increases in a range of filter sizes of from 9 to 3, and particularly is sufficiently large in a range of filter sizes of 6 or below. On the other hand, the evaluation value of the graph 501 of FIG. 5 does not increase so much as that of the graph 500, so that the accumulated difference values of the graph 801 of FIG. 8 are not as large as those of the graph 800 over the full range of filter sizes.

In addition, in the graph 700 of FIG. 7, since the evaluation value increases in a range of filter sizes of from 7 to 2, differences obtained by subtracting respective evaluation values corresponding to filter sizes of from 7 to 4 from respective evaluation values corresponding to filter sizes of from 5 to 2 are positive values. Thus, in the graph 900 of FIG. 9, the accumulated difference value increases in a range of filter sizes of from 7 to 4, and in particular, is sufficiently large at a filter size of 4. On the other hand, the evaluation value of the graph 701 of FIG. 7 does not increase so much as that of the graph 500, so that the accumulated difference values of the graph 901 of FIG. 9 are not as large as those of the graph 900 over the full range of filter sizes. Accordingly, the control module 15 can all correctly determine whether the face is contained in each of the partial images 600, 601, 700, and 701 by determining whether the each partial image contains the face based on the accumulated difference value, for example, depending on whether the accumulated difference value is 10 or larger.

The target determination module 154 obtains an increasing degree by which the evaluation value calculated for each data included in multi-level data increases according to increase of the information level, determines whether the input data contains the detection target depending on whether the obtained increasing degree represents an increasing degree regarding the detection target, and then outputs a result of the determination. The target determination module 154 in the present embodiment calculates increasing degrees regarding evaluation values calculated by the evaluation value calculation module 153 from the original partial image and each individual level image and compares each of the increasing degrees with a predetermined determination threshold value. Then, when the increasing degree is equal to or more than the determination threshold value, the target determination module 154 determines that the partial image contains the face, whereas when the increasing degree is less than the determination threshold value, the target determination module 154 determines that the partial image does not contain the face. The determination threshold value to be set is a lower limit value of the increasing degree where the input data contains the detection target. For example, the determination threshold value can be a value that is based on increasing degrees of evaluation values calculated regarding a plurality of facial images for test containing a face and increasing degrees of evaluation values calculated regarding a plurality of non-facial images for test not containing the face by preliminary experiment and allows the discrimination of these images. In that case, for example, the determination threshold value is an average value between an average value of the increasing degrees of the evaluation values calculated regarding the facial images for test and an average value of the increasing degrees of the evaluation values calculated regarding the non-facial images for test. Alternatively, the determination threshold value may be a maximum value of the increasing degrees of the evaluation values calculated regarding the non-facial images for test or a minimum value of the increasing degrees of the evaluation values calculated regarding the facial images for test.

For example, the target determination module 154 subtracts, for each information level, the evaluation value of an information level lower by a predetermined number of levels than each information level from the evaluation value of each information level to obtain a difference. Then, a total value of obtained differences is used as an increasing degree. In this case, the target determination module 154 subtracts, per filter size, an evaluation value calculated from each image generated using an averaging filter with each filter size from an evaluation value calculated from each image generated using an averaging filter with a filter size smaller by 2 than the filter size to obtain a difference. Then, a total value of obtained differences is used as an increasing degree. In this way, the target determination module 154 can calculate the increasing degree by separating each evaluation value into an odd-numbered group in which an averaging filter applied to an image from which the evaluation value has been calculated has a filter size of an odd number and an even-numbered group in which the averaging filter has a filter size of an even number. This can eliminate the inconsistency between the use of a filter size of an odd number and the use of a filter size of an even number, as described in the illustration of FIGS. 8 and 9. The followings are formulae for calculating an increasing degree by separating each evaluation value into an even-numbered group and an odd-numbered group:

$$\Delta_{n1}=S_{n1-2}-S_{n1}, \text{provided that } n1=N, N-2, \ldots 6, 4 \quad (3)$$

$$\Delta_{n2}=S_{n2-2}-S_{n2}, \text{provided that } n2=N-1, N-3, \ldots 5, 3 \quad (4)$$

$$D=\Sigma\Delta_{n1}+\Sigma\Delta_{n2}, \text{provided that } n1=N, N-2, \ldots 6, 4;\ n2=N-1, N-3, \ldots 5, 3 \quad (5)$$

In the formulae, $S_n$ represents an evaluation value at a filter size of n; n1 represents the even-numbered group and n2 represents the odd-numbered group; N represents a maximum filter size; $\Delta_n$ represents a value obtained by subtracting the evaluation value at the filter size of n from an evaluation value at a filter size of n−2; and D represents an increasing degree of evaluation value. Although the increasing degree can be calculated by using only the even-numbered group or only the odd-numbered group, the use of both groups can increase the number of information levels, so that each evaluation value can be analyzed in more detail.

Alternatively, the target determination module 154 may, without separating each evaluation value into an even-numbered group and an odd-numbered group, use, as an increasing degree, a total value of a difference obtained by subtracting an evaluation value calculated from each image generated using an averaging filter with each filter size from an evaluation value of each image generated using an averaging filter with a filter size smaller by 1 than the filter size.

Alternatively, the target determination module 154 may obtain a difference by subtracting an evaluation value of each filter size from an evaluation value of a filter size smaller by a predetermined size than the each filter size, in ascending order of the information level, i.e. in descending order of filter size. Then, each time the difference is obtained, the target determination module 154 may obtain an accumulated value of the obtained differences as an increasing degree to determine whether the increasing degree is equal to or more than a determination threshold value, and may determine that the partial image contains the face when the increasing degree is equal to or more than the determination threshold value. In that case, the multi-level data generation module 152, the evaluation value calculation module 153, and the target determination module 154 can determine that the partial image contains the face before performing each processing regarding all the information levels, so that time necessary for detection processing can be shortened. Since target determination module 154 detects that the evaluation value increases as the information level increases, it is preferable to perform processing in ascending order of the information level.

The sounding control module 155 inputs a buzzer sounding signal to the output module 12 to sound the buzzer when the target determination module 154 determines that any of partial images is an image containing the face.

Hereinbelow, a description will be given of an operation of target detection processing by the intercom 10 according to the present embodiment, with reference to a flowchart depicted in FIG. 10. A flow of the operation described below is stored in the storage module 14 and controlled by the control module 15 according to a program read by the control module 15.

First, when a visitor presses a not shown calling button, the control module 15 causes the imaging module 11 to capture an image of the entrance or the like, acquires a captured image through the interface module 13, and stores the image in the storage module 14. Then, the data input module 150 reads the captured image from the storage module 14 and sends the image to the trimming module 151 (step S1001). Next, the trimming module 151 trims a partial image from the acquired captured image and sends the trimmed partial image to the multi-level data generation module 152 (step S1002). The control module 15 executes processing of steps S1002 to 1011 by the number of partial images trimmed by the trimming module 151.

Next, the control module 15 sets information levels (step S1003). The control module 15 sets predetermined information levels in ascending order and executes processing of steps S1003 to S1007 by the number of the set information levels.

The multi-level data generation module 152 generates individual level images corresponding to the information levels set at the step S1003, correlates the generated individual level images with the information levels, and sends the images to the evaluation value calculation module 153 (step S1004). When the information level is not a maximum value, the multi-level data generation module 152 generates each individual level image corresponding to the information level from the partial image, and sends the each individual level image to the evaluation value calculation module 153. On the other hand, when the information level is a maximum value, the multi-level data generation module 152 sends the partial image as it is to the evaluation value calculation module 153.

Next, the evaluation value calculation module 153 extracts a facial feature parameter(s) from each individual level image received from the multi-level data generation module 152 (step S1005). Next, the evaluation value calculation module 153 calculates an evaluation value from the extracted facial feature parameter(s), correlates the calculated evaluation value with each information level, and sends them to the target determination module 154 (step S1006).

Next, the control module 15 determines whether the processing of the steps S1003 to S1006 has been executed on all of the information levels (step S1007). When the processing of the steps S1003 to S1006 has not been executed on all of the information levels (NO at step S1007), the control module 15 returns processing to the step S1003 to repeat the processing of the steps S1003 to S1006. On the other hand, when the processing of the steps S1003 to S1006 has been executed on all of the information levels (YES at step S1007), the target determination module 154 calculates an increasing degree by which each of evaluation values received by then from the evaluation value calculation module 153 increases according to increase of the information level (step S1008).

Next, the target determination module 154 compares the calculated increasing degree with a determination threshold value (step S1009). When the increasing degree is equal to or more than the determination threshold value (YES at step S1009), the sounding control module 155 outputs a buzzer sounding signal to the output module 12 through the interface module 13 to cause the output module 12 to sound the buzzer (step S1010). When the buzzer sounds, the control module 15 ends a series of the steps.

On the other hand, when the increasing degree is less than the determination threshold value (NO at step S1009), the control module 15 determines whether all partial images having all predetermined positions and sizes have been trimmed (step S1011). When not all of the partial images have been trimmed (NO at step S1011), the control module 15 returns processing to the step S1002 to repeat the processing of the steps S1002 to S1011. On the other hand, when all of the partial images have been trimmed (YES at step S1011), the control module 15 determines that the face of the visitor has not been detected and ends the series of the steps.

The target determination module 154 may calculate an increasing degree each time the evaluation value calculation module 153 sends an evaluation value at the step S1006, and may compare the calculated increasing degree with the determination threshold value. In that case, each time the evaluation value calculation module 153 sends the evaluation value at the step S1006, the target determination module 154 causes the storage module 14 to store the received evaluation value. Then, the target determination module 154 calculates a difference between the evaluation value and an already stored evaluation value and adds the calculated difference to an accumulated value to obtain an increasing degree of evaluation values. The target determination module 154 initializes the accumulated value to 0 when the information level is a minimum value. In this case, the target determination module 154 does not calculate a difference and does not change the accumulated value. On the other hand, when the information level is not a minimum value, the target determination module 154 calculates a difference between the evaluation value received from the evaluation value calculation module 153 and a lastly received evaluation value and adds the difference to the accumulated value. Then, each time an accumulated value is calculated, the target determination module 154 compares the calculated accumulated value with the determination threshold value. When the accumulated value is equal to or more than the determination threshold value, the sounding control module 155 outputs a buzzer sounding signal to the output module 12 through the interface module 13 to cause the output module 12 to sound a buzzer.

In addition, for example, when the intercom 10 is installed in such a manner that the face of a visitor is properly contained in a captured image captured by the imaging module 11, the control module 15 does not have to trim a partial image from the captured image and thus may generate individual level images directly from the captured image. In that case, the trimming module 151 is omitted from the control module 15, and the processing of the steps S1002 and S1011 is omitted in the flowchart of FIG. 10.

As described hereinabove, the intercom according to the present embodiment generates a plurality of individual level images mutually different in the information level from a partial image trimmed from a captured image captured by the imaging module or the captured image, and calculates an evaluation value from each of the generated individual level images. Then, the intercom obtains an increasing degree by which each of the calculated evaluation values increases according to increase of the information level and determines that the captured image contains a face when the obtained increasing degree is equal to or more than a lower limit value of an increasing degree where the face is contained in the partial image or the captured image. In this way, the intercom can improve accuracy for detecting a face from a captured image.

In addition, the intercom according to the present embodiment does not determine whether the face is contained in the partial image based on the evaluation value itself but determines that the face is contained in the partial image based on the increasing degree of the evaluation value. In other words, the intercom does not determine that the partial image contains a person depending on whether a feature parameter(s) extracted from the partial image is located on a face side or a non-face side with respect to a decision boundary in a feature parameter(s) space, but detects the face based on change of a position of the feature parameter(s) with respect to the decision boundary in accordance with change of the information level. Accordingly, since it is not necessary to learn the decision boundary itself with high accuracy, there is no need for collecting a large amount of images for learning, thus allowing improvement in device development efficiency.

In a first modified example of the first embodiment, the evaluation value calculation module uses a HOG (Histograms of Oriented Gradients) feature parameter(s) instead of a Haar-like feature parameter(s), as a facial feature parameter(s). The evaluation value calculation module divides an input image into a plurality of blocks and further divides each of the blocks into a plurality of cells. For example, each cell is a rectangular region having 5 pixels×5 pixels, and each block is a rectangular region having 3 cells×3 cells. Then, the evaluation value calculation module calculates a gradient direction and a gradient strength of a pixel value of each pixel in the input image. The gradient direction is calculated in a range of from 0 to 180 degrees since it is not necessary to consider direction, and set, for example, to 8 directions by dividing the range into each 22.5 degrees. The evaluation value calculation module obtains, per cell, a histogram of each gradient direction in which frequency represents a sum of gradient strength of each gradient direction, and normalizes each block of the obtained histogram to obtain a HOG feature parameter(s).

When the HOG feature parameter(s) is used as a facial feature parameter(s), a HOG feature parameter(s) obtained regarding a predetermined block is input to each weak classifier of the evaluation value calculation module. Based on the input HOG feature parameter(s), each weak classifier outputs a higher value as the corresponding partial image is more likely to contain the face and outputs a lower value as the corresponding partial image is less likely to contain the face. The block whose HOG feature parameter(s) is to be input to each weak classifier is determined by preliminarily learning from a plurality of facial images for learning containing a face and a plurality of non-facial images for learning not containing the face. Learning steps are the same as those in using a Haar-like feature parameter(s) as a facial feature parameter(s) and thus a description thereof will be omitted. Information representing a HOG feature parameter(s) used as each classifier determined by preliminarily learning and information presenting an output function of each classifier are stored as reference data of face in the storage module.

In a second modified example of the first embodiment, the multi-level data generation module generates a plurality of images mutually different in sharpness by changing a number of times of filter processing by an averaging filter, instead of changing the filter size of the averaging filter applied to the image. In that case, the multi-level data generation module uses an averaging filter having a fixed size (for example, 3×3) to generate each of an image subjected to filter processing one time, an image subjected to filter processing two times, . . . and an image subjected to filter processing "n" times. The more times the filter processing is repeated, the more blurred the generated images become. Thus, as the number of times of filter processing is increased, the sharpness decreases, whereas as the number of times of filter processing is reduced, the sharpness increases.

Alternatively, the multi-level data generation module may generate a plurality of images mutually different in sharpness by changing a filter coefficient of a filter to be applied to an image. In that case, the multi-level data generation module performs weighting on a filter having a fixed size (for example, 5×5) in such a manner that a portion closer to the center of the filter has a larger weight, and uses filters mutually different in the weighting to generate the plurality of images mutually different in sharpness. As the degree of change of the weight from an edge portion to the center of the filter to be applied is more moderate, the sharpness of a generated image becomes lower, whereas as the degree of change of the weight from the edge portion to the center thereof is steeper, the sharpness of the generated image becomes higher.

Alternatively, the multi-level data generation module may generate a plurality of images mutually different in sharpness by dividing the respective pixels in an image into groups (segments) of adjacent pixels having mutually similar pixel values and replacing, in each segment, pixel values of pixels forming the segment with the same value. In that case, the multi-level data generation module uses, as each segment, a group of adjacent pixels in which an absolute value of a difference between the pixel values thereof is equal to or less than a threshold value, and replaces the pixel values of the pixels forming each segment with an average pixel value in the each segment. The multi-level data generation module generates a plurality of images mutually different in sharpness by changing the threshold value to a plurality of values. As the threshold value for grouping adjacent pixels is higher, the sharpness of a generated image becomes lower, whereas as the threshold value for grouping adjacent pixels is lower, the sharpness thereof becomes higher.

In a third modified example of the first embodiment, the multi-level data generation module generates, as the plurality of images mutually different in the information level, a plurality of images by superimposing, on an input image, a smaller amount of noise as the information level is higher and a larger amount of noise as the information level is lower, respectively. In this case, the multi-level data generation module randomly selects a predetermined number of pixels in the input image and changes values of the selected pixels to a random value, thereby superimposing noise. The multi-level data generation module generates a plurality of images mutually different in an amount of superimposed noise by changing the number of pixels whose pixel values are to be changed to a plurality of numbers. As the amount of the superimposed noise is larger, an SN (signal to noise) ratio of a generated image is lower and thereby the information level becomes lower, whereas as the amount of the superimposed noise is smaller, the SN ratio is higher and thereby the information level becomes higher.

Alternatively, the multi-level data generation module may generate, as the plurality of images mutually different in the information level, a plurality of images mutually different in image intelligibility in which the image intelligibility is higher as the information level is higher, and the image intelligibility is lower as the information level is lower. In that case, for example, the multi-level data generation module generates, as the plurality of images mutually different in image intelligibility, a plurality of images by increasing a number of gradation levels of pixel values in an image as the information level is higher and by reducing the number of gradation levels of pixel values in the image as the information level is lower. Since a smaller number of gradation levels leads to lower intelligibility of a generated image, the information level becomes lower. On the other hand, since a larger number of gradation levels leads to higher intelligibility of a generated image, the information level becomes higher.

Alternatively, the multi-level data generation module may generate, as the plurality of images mutually different in image intelligibility, a plurality of images by increasing contrast as the information level is higher and by reducing contrast as the information level is lower. In that case, the multi-level data generation module generates images by changing a luminance value of each pixel in an input image so that a standardized deviation between luminance values of all pixels in the image becomes small. The smaller the standardized deviation between the luminance values of all the pixels in the image, the lower the intelligibility of a generated image, whereby the information level becomes lower. On the other hand, the larger the standardized deviation, the higher the intelligibility, whereby the information level becomes higher.

In a fourth modified example of the first embodiment, the multi-level data generation module generates, as the plurality of data mutually different in the information level, a plurality of data mutually different in a degree of masking (hereinafter referred to as masking degree) by reducing the masking degree for a portion that represents a detection target in the input data as the information level is higher and by increasing the masking degree therefor as the information level is lower. When the input data is image data, the multi-level data generation module generates a plurality of images mutually different in the masking degree of a portion that represents the face of a person as a detection target in the input image. In that case, the multi-level data generation module sets a masking region having a predetermined size for masking a part of the image in the image and replaces pixel values of the masking region in the image with a fixed value. Then, the multi-level data generation module generates, as the plurality of images mutually different in the masking degree, a plurality of images mutually different in the size of the masking region.

Figure 11:
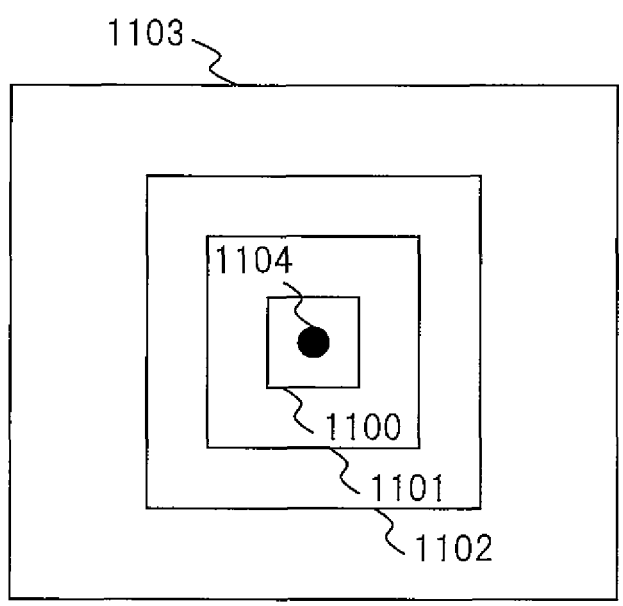
FIG. 11 is a schematic diagram for illustrating a masking region.

FIG. 11 depicts a schematic diagram for illustrating a masking region. In an example depicted in FIG. 11, masking regions 1100, 1101, and 1102 having mutually different sizes are set such that a center position of each of the masking regions is coincident with a center position 1104 of an image 1103.

The larger the size of the masking region, the higher the masking degree of a generated image, whereby accuracy of facial features appearing in the image becomes lower, so that the information level of the image becomes lower. On other hand, the smaller the size of the masking region, the lower the masking degree thereof, whereby the information level becomes higher. As an image having a lowest masking degree, there can be used an image having a masking region size of 0, i.e. the original image.

Alternatively, the multi-level data generation module may generate, as the plurality of images mutually different in the masking degree, a plurality of images mutually different in the position of the masking region. As described above, for example, when the intercom is installed in such a manner that the face of the visitor is properly contained in a captured image to be captured by the imaging module, the control module does not have to trim a partial image from the captured image and thus may generate individual level images directly from the captured image. In this case, distinctive portions of the face such as the eyes, the nose, and the mouth in the captured image are more likely to be located near the center of the captured image than at an edge portion thereof. Accordingly, in this case, changing the position of the masking region from the edge portion to the center thereof can reduce a degree to which the image is suitable for feature representation of the face. In this case, the nearer the position of the masking region is to the center thereof, the higher the masking degree of a generated image, whereas the nearer the position of the masking region is to the edge portion thereof, the lower the masking degree of the generated image.

In this way, detection accuracy for a detection target can also be improved by generating a plurality of images having mutually different masking degrees to calculate an evaluation value from each of the images and determining whether the partial image contains the face based on the increasing degree by which the evaluation value increases according to reduction of the masking degree.

In a fifth modified example of the first embodiment, the multi-level data generation module generates a feature parameter(s) regarding a detection target and generates, regarding the feature parameter(s), a plurality of data mutually different in level of an information amount (hereinafter referred to as analysis level) represented by the feature parameter(s). In the plurality of data mutually different in analysis level, a degree to which each data can represent features of the detection target is different from each other. Thus, in the present modified example, the multi-level data generation module uses, as the plurality of data mutually different in the information level, a plurality of data mutually different in analysis level by increasing the analysis level as the information level is higher and by reducing the analysis level as the information level is lower. In this case, a feature parameter(s), determined by preliminarily learning, which is to be input to each weak classifier of the evaluation value calculation module, is obtained not by the evaluation value calculation module but by the multi-level data generation module. The multi-level data generation module changes the analysis level of the obtained feature parameter(s) to a plurality of analysis levels.

For example, the multi-level data generation module generates, as the plurality of data mutually different in analysis level, a plurality of data by multiplying each Haar-like feature parameter(s) obtained for an input image by a positive coefficient $\alpha$ of 1 or less ($0<\alpha \leq 1.0$) that is larger as the analysis level is higher and is smaller as the analysis level is lower. The multi-level data generation module changes the coefficient $\alpha$ to a plurality of values in a predetermined range, for example, from 0.1, 0.2, 0.3 ... to 1.0. As the coefficient $\alpha$ is smaller, the facial feature is more lost and thus the information level of an obtained feature parameter(s) becomes lower. Conversely, as the coefficient $\alpha$ is larger, the information level thereof becomes higher.

Figure 10:
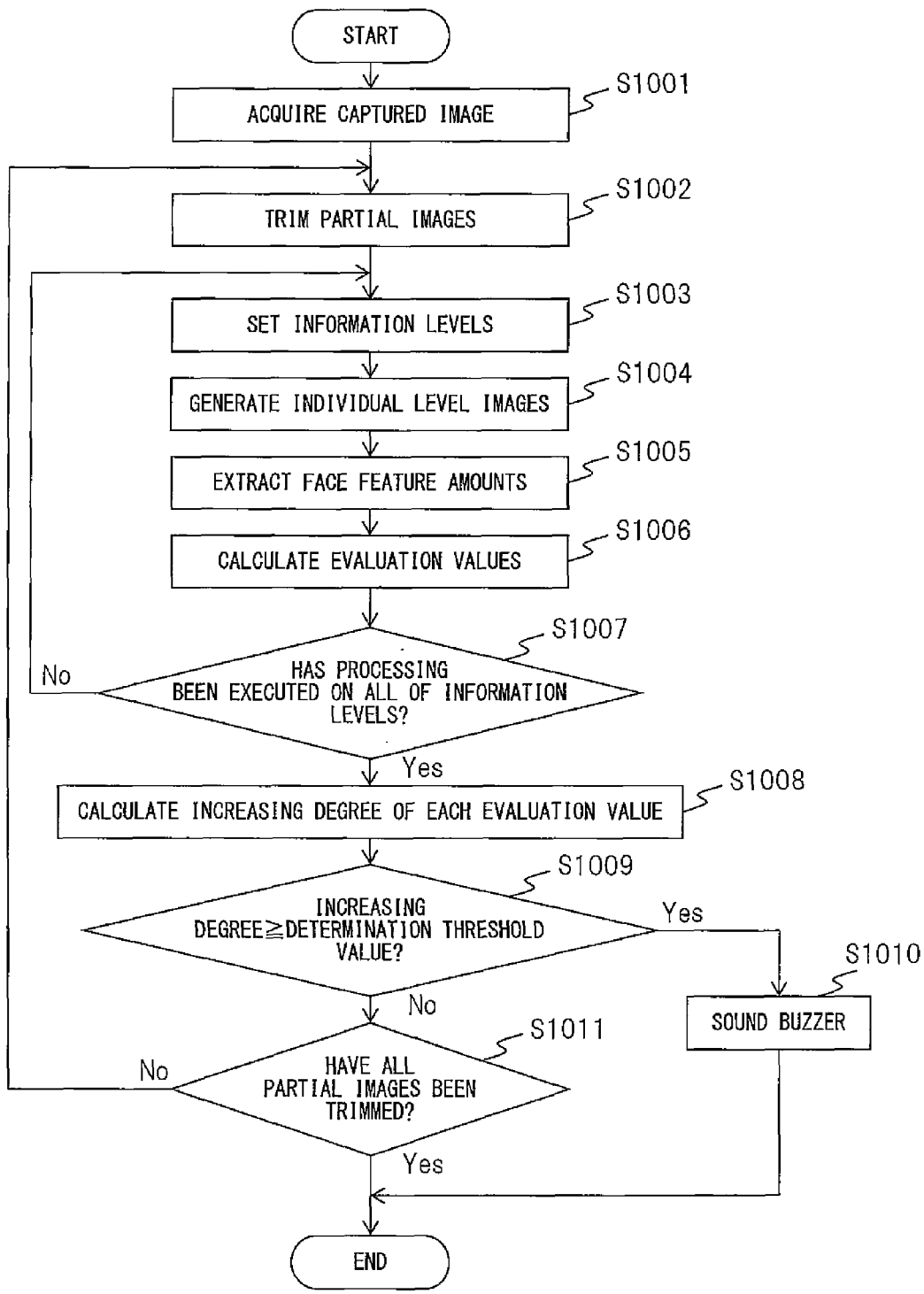
FIG. 10 is a flowchart depicting an operation of target detection processing by the intercom according to the first embodiment.

In this case, at the step S1004 of the flowchart of FIG. 10, the multi-level data generation module obtains a Haar-like feature parameter(s) to be input to each weak classifier of the evaluation value calculation module from a partial image, multiplies the each Haar-like feature parameter(s) by a coefficient $\alpha$ corresponding to each information level set at the step S1003 and sends to the evaluation value calculation module. Then, the step S1005 is omitted, and at the step S1006, the evaluation value calculation module calculates an evaluation value from the each Harr-like feature parameter(s) received from the multi-level data generation module.

In addition, for example, when using a HOG feature parameter(s) as the facial feature parameter(s), the multi-level data generation module may generate, as the plurality of data mutually different in analysis level, a plurality of data by increasing a number of quantization representing the feature parameter(s) as the analysis level is higher and by reducing the number of quantization representing the feature parameter(s) as the analysis level is lower. As described in the first modified example, when using a HOG feature parameter(s) as the facial feature parameter(s), a histogram using a sum of a gradient strength in each gradient direction of each cell in an image is obtained as a HOG feature parameter(s). The multi-level data generation module changes the analysis level by changing the number of quantization of the histogram, i.e. the number of gradient directions to a plurality of values, 2, 3, 4 . . . and 9 in a predetermined range. As the number of quantization is smaller, the facial feature is more lost, so that the information level of the extracted feature parameter(s) becomes lower. Conversely, as the number quantization is larger, the information level is higher.

Alternatively, the multi-level data generation module may change the analysis level by performing weighting on each feature parameter(s). For example, when using a HOG feature parameter(s) as the feature data, the multi-level data generation module changes the analysis level by setting different weight coefficients for cells near the center position of a partial image and cells at the edge portion of the partial image, which are distant from the center position thereof, and multiplying histograms of the respective cells by the weight coefficients. In this case, as a difference between the weight coefficients of the cells at the center position and the cells at the edge portion of the partial image is larger, the facial feature is more lost, so that the information level of the extracted feature parameter(s) becomes lower. Conversely, as the difference between the weight coefficients is smaller, the information level thereof becomes higher.

In this way, detection accuracy for a detection target can be improved also by obtaining feature parameters whose analysis levels are mutually different to calculate an evaluation value from each of the feature parameters, and determining whether the image contains the face of the target based on an increasing degree by which the evaluation value increases according to increase of the analysis level.

In a sixth modified example of the first embodiment, the evaluation value calculation module includes an adaboost classifier instead of the Real-Adaboost classifier. The classifier is configured by a plurality of weak classifiers and a strong classifier for integrating and determining determination results of the respective weak classifiers. A feature parameter(s) predetermined for each of the weak classifiers is input to each weak classifier. When each weak classifier determines that the corresponding partial image contains the face of the target based on the input feature parameter(s), the classifier outputs 1, whereas when each weak classifier determines that the image does not contain the face, the classifier outputs −1. On the other hand, the strong classifier performs weighting on each output value of each weak classifier and obtains a weighted sum to output the sum as an evaluation value. The feature parameter(s) to be input to each weak classifier and a weight for each weak classifier are determined by preliminarily learning using a feature parameter(s) calculated from a plurality of facial images for learning containing the face and a plurality of non-facial images for learning not containing the face.

Alternatively, the evaluation value calculation module may calculate an evaluation value, by using a support vector machine, a perceptron having a three layer or more layers, a random forest or the like. In that case, the evaluation value calculation module extracts in advance each one or more feature parameters from a plurality of facial images for learning and a plurality of non-facial images for learning and performs preliminarily learning using the extracted feature parameters. The preliminarily learning is performed to determine whether a specific image contains a face when a feature parameter(s) extracted from the specific image is input. When using a support vector machine, the evaluation value calculation module calculates, as an evaluation value, a value that is a positive value when the feature parameter(s) is located in a face-side region and that is a negative value when the feature parameter(s) is located in a non-face side region, with respect to a decision boundary obtained by the preliminarily learning in a feature parameter(s) space, and that corresponds to a distance between a position of the feature parameter(s) and the decision boundary. In addition, when using a perceptron having three or more layers, the evaluation value calculation module calculates, as an evaluation value, a sum of inputs to neurons of the output layer. Additionally, when using a random forest, the evaluation value calculation module combines outputs from each decision tree generated by preliminarily learning so that the higher a degree of certainty that the image contains the face, the higher the output thereof, so as to use the combined output as an evaluation value.

Alternatively, the evaluation value calculation module may output an evaluation value using a linear discriminant analysis method. In that case, the evaluation value calculation module extracts in advance one or more feature parameters from each of a plurality of facial images for learning and a plurality of non-facial images for learning, and generates a linear discriminant function, by using the extracted one or more feature parameters. When a feature parameter(s) extracted from a specific image is input, the evaluation value calculation module generates a linear discriminant function in such a manner that the higher the degree of certainty that the image contains the face, the higher an output value is, and uses the output value as an evaluation value.

Alternatively, the evaluation value calculation module may output an evaluation value using a Gaussian mixture distribution. In that case, the evaluation value calculation module extracts in advance one or more feature parameters from each of a plurality of facial images for learning and generates a Gaussian mixture distribution, by using the extracted feature parameters. The evaluation value calculation module uses, as an evaluation value, a probability obtained when a feature parameter(s) extracted from a specific image is input in the generated Gaussian mixture distribution. In using a Gaussian mixture distribution, preliminarily learning is performed using only data for learning for a detection target. Thus, it is unnecessary to collect data for learning for objects other than the detection target, i.e. non-facial images for learning not containing the face of the target.

In addition, for example, the evaluation value calculation module may calculate an evaluation value, by using a plurality of classifiers subjected to machine learning using different data for learning. In that case, the evaluation value calculation module connects each classifier in series and causes the classifiers to execute discrimination processing in order starting from a first-stage classifier and to repeat the discrimination processing until any of the classifiers determines that the image does not contain the face of a person. When an output value from each classifier is equal to or more than a threshold value, the evaluation value calculation module decides that the classifier has determined that the image does not contain the face of the person. The threshold value can be set to a value that is based on output values calculated for a plurality of facial images for test containing a face and output values calculated for a plurality of non-facial images for test not containing the face by prior experiment and allows the discrimination of these images. Then, the evaluation value calculation module uses, as an evaluation value, the number of classifiers that have determined that the image contains the face of the person.

In a seventh modified examples of the first embodiment, the evaluation value calculation module calculates an evaluation value by pattern matching, instead of calculating an evaluation value by classifiers subjected to machine learning. In this case, the control module generates in advance a pattern of data by performing averaging processing or the like on a plurality of data for learning that are known to be data representing a detection target, and stores the pattern of the data as reference data in the storage module. The evaluation value calculation module calculates, as an evaluation value, a degree to which each of the images received from the multi-level data generation module is similar to the data pattern stored as the reference data. The degree of likelihood can be, for example, an inner product of each image and the reference data.

In an eighth modified example of the first embodiment, the evaluation value calculation module calculates, as an evaluation value, a degree of extraction to which data specific to a detection target is extracted from input data, instead of calculating an evaluation value by classifiers subjected to machine learning or calculating an evaluation value by pattern matching. For example, when the detection target is a face, extracted data can be pixels that represent skin color (hereinafter referred to as skin color pixels). In that case, the control module sets a range of pixel values of the skin color pixels to be extracted and a standard ratio of the skin color pixels that can be regarded as a face to store them in the storage module in advance. The evaluation value calculation module extracts the skin color pixels from each of images received from the multi-level data generation modules. The evaluation value calculation module obtains an absolute value of a difference between a ratio of a number of pixels as the skin color pixels with respect to a number of all pixels in each of the images and the standard ratio stored in advance in the storage module, and uses a reciprocal of the obtained absolute value as an evaluation value.

In a ninth modified example of the first embodiment, the evaluation value calculation module outputs, as an evaluation value, a degree that represents a certainty of not being a detection target, instead of outputting a degree that represents a probability of being a detection target. In this case, the target determination module determines whether input data contains the detection target depending on whether the evaluation value significantly reduces as the information level increases. In other words, the target determination module determines that the input data contains the detection target when a decreasing degree by which the evaluation value decreases according to increase of the information level is equal to or more than a predetermined determination threshold value, whereas determines that the input data does not contain the detection target when the decreasing degree is less than the determination threshold value.

In a tenth modified example of the first embodiment, the target determination module obtains, for each information level, a difference by subtracting the evaluation value of an information level lower by a predetermined number of levels than the information level from the evaluation value of the information level, and sets a maximum value of obtained differences, as an increasing degree of the evaluation value. Setting the maximum value of the difference of the evaluation value as the increasing degree of the evaluation value allows the target determination module to appropriately detect changes in evaluation values even when the number of information levels is small.

Alternatively, the target determination module may set any one of a difference obtained by subtracting a minimum value of all evaluation values obtained regarding each information level from a maximum value thereof and a ratio of the maximum value to the minimum value, as the increasing degree of the evaluation value. In this way also, the target determination module can appropriately detect changes in evaluation values when the number of information levels is small.

Alternatively, when an evaluation value representing that the input data contains the detection target is a positive value and an evaluation value representing that the input data does not contain the detection target is a negative value, if the input data does not contain the detection target, a sign of the evaluation value obtained regarding each information level tends to frequently change. Thus, in this case, the target determination module may use a reciprocal of a number of times of sign changes of an evaluation value obtained regarding each information level, as the increasing degree of the evaluation value.

In that case, the target determination module counts the number of times of sign changes of an evaluation value in ascending order of the information level and sets a reciprocal of the number of times thereof as the increasing degree of the evaluation value. Alternatively, the target determination module may set any one of a reciprocal of the number of times of sign changes from negative to positive or a reciprocal of the number of times thereof from positive to negative, as the increasing degree of the evaluation value. Since the reciprocal of the number of times of sign changes of an evaluation value is set as the increasing degree of the evaluation value, the target determination module can detect the increasing degrees of evaluation values more accurately, particularly when the number of information levels is large.

Alternatively, the target determination module may set a variance of an evaluation value obtained regarding each information level, as an increasing degree of the evaluation value. In that case, the target determination module determines that the input data contains the detection target when the obtained variance is equal to or more than a determination threshold value, and determines that the input data does not contain the detection target when the obtained variance is less than the determination threshold value.

Alternatively, the target determination module may obtain a difference, for each information level, by subtracting an evaluation value of an information level lower by a predetermined number of levels than the information level from the evaluation value of the information level and may set a difference obtained by subtracting an average value of obtained differences from a maximum value thereof, as an increasing degree of the evaluation value.

Alternatively, the target determination module may obtain an envelope line by linear approximation of an evaluation value sequence in which evaluation values obtained regarding each information level are arranged in order of the information level, may obtain a difference, for each information level, by subtracting a value of an envelope line corresponding to an information level lower by a predetermined number of levels than the information level from a value of an envelope line corresponding to the information level, and may set a total value or a maximum value of obtained differences, as an increasing degree of the evaluation value. Alternatively, the target determination module may set any one of a difference obtained by subtracting a minimum value of the envelope line in each information level from a maximum value thereof or a ratio of the maximum to the minimum value, as an increasing degree of the evaluation value. In this way, even when evaluation values obtained regarding each information level include an extremely small outlier, erroneous determination due to the outlier can be reduced.

Alternatively, the target determination module uses data for learning known to be data representing the detection target to obtain in advance an envelope line of evaluation values obtained regarding each information level, and stores it in the storage module. Since the envelope line is one that has been obtained from the data representing the detection target, the value sharply increases as the information level becomes higher. Accordingly, when an envelope line obtained regarding input data is similar to the envelope line stored in the storage module, it is assumed that the value of the envelope line obtained regarding the input data also sharply increases as the information level becomes higher. Thus, the target determination module may calculate a cross correlation between the envelope line obtained regarding the input data and the envelope line stored in the storage module to obtain a cross-correlation value, and may set the obtained cross-correlation value, as an increasing degree of the evaluation value.

In an eleventh modified example of the first embodiment, the target determination module determines whether input data is data of a detection target not depending on whether the evaluation value becomes larger as the information level becomes higher but depending on whether the evaluation value becomes smaller as the information level becomes lower. In other words, the target determination module calculates a decreasing degree of the evaluation value as the information level becomes lower, and determines that the input data contains the detection target when the calculated decreasing degree is equal to or more than a determination threshold value, whereas determines that the input data does not contain the detection target when the calculated decreasing degree is less than the determination threshold value. When the evaluation value represents the certainty of not being the detection target, the target determination module determines whether the input data contains the detection target depending on whether the evaluation value becomes larger as the information level becomes lower.

In a twelfth modified example of the first embodiment, the target determination module determines whether input data contains a detection target not depending on only the increasing degree of the evaluation value but depending on the increasing degree of the evaluation value and the evaluation value itself. In this case, the target determination module calculates a representative evaluation value as a statistical representative value of a plurality of evaluation values obtained regarding each information level and determines that the input data contains the detection target when the increasing degree of the evaluation value is equal to or more than the determination threshold value and the representative evaluation value is equal to or more than a second determination threshold value. On the other hand, the target determination module determines that the input data does not contain the detection target when the increasing degree of the evaluation value is less than the determination threshold value or the representative evaluation value is less than the second determination threshold value. The representative evaluation value can be, for example, a maximum value of the plurality of evaluation values. Alternatively, the representative evaluation value may be, for example, an average value, a median, or a minimum value of the plurality of evaluation values. The second determination threshold value can be set to a lower limit value of a range in which a representative evaluation value for the input data containing the detection target is distributed, by prior experiment. In other words, values equal to or more than the second determination threshold value are those indicating that at least the representative evaluation value is a detection target, whereas values less than the second determination threshold value are those indicating that at least the representative evaluation value is not the detection target. This allows margin to be provided to the determination threshold value for the increasing degree, thus improving accuracy for detecting a detection target.

Next, a description will be given of an intercom incorporating a target detection device according to a second embodiment, with reference to the drawings.

The intercom of the present embodiment generates a plurality of images mutually different in the information level by generating a plurality of images by geometrically converting an input image into a plurality of images, instead of generating a plurality of images mutually different in image sharpness from the input image.

As described in the first embodiment, the intercom determines whether a partial image contains a detection target, by using classifiers subjected to preliminarily learning using images for learning at least containing the detection target.

Alternatively, the intercom determines whether a partial image contains the detection target by pattern matching between images for learning containing the detection target and partial images. In general, in order to improve detection accuracy, images for learning often used are those in which a detection target appears at the same degree of inclination as that of an inclination assumed for the detection target contained in a captured image captured by an intercom. Accordingly, for example, when the inclination of the detection target is changed by rotating the image, the inclination of the detection target in the image after the rotation becomes different from the inclination of the detection target in many images for learning, reducing a degree to which the image is suitable for feature representation of the detection target. Thus, the intercom of the present embodiment generates, as a plurality of images mutually different in the information level, a plurality of images by rotating a partial image at a plurality of angles. Thereby, the intercom achieves improvement in accuracy for detecting a face from a partial image, as in the first embodiment.

An intercom 10 according to the second embodiment includes an imaging module 11, an output module 12, an interface module 13, a storage module 14, and a control module 15, similarly to the intercom 10 according to the first embodiment depicted in FIG. 2. The imaging module 11, the output module 12, the interface module 13, and the storage module 14 are the same as those in the intercom 10 of the first embodiment and thus a description thereof will be omitted. In addition, the control module 15 of the intercom 10 according to the second embodiment is an example of the target detection device and includes a data input module 150, a trimming module 151, a multi-level data generation module 152, an evaluation value calculation module 153, a target determination module 154, and a sounding control module 155 as functional modules mounted by software operating on the processor, similarly to the control module 15 of the intercom 10 according to the first embodiment depicted in FIG. 3.

Each of these modules included in the control module 15 may be configured by an independent integrated circuit, firmware, a microprocessor, or the like.

The data input module 150, the trimming module 151, the multi-level data generation module 152, the evaluation value calculation module 153, the target determination module 154, and the sounding control module 155 are the same as those in the intercom 10 according to the first embodiment and thus a description thereof will be omitted. The following is a detailed description of the multi-level data generation module 152.

The multi-level data generation module 152 generates a plurality of individual level images by geometrically converting each partial image trimmed from a captured image in a lesser degree as the information level is higher and in a greater degree as the information level is lower. The multi-level data generation module 152 correlates the generated individual level images with information levels to send to the evaluation value calculation module 153. The multi-level data generation module 152 of the present embodiment generates, as the plurality of geometrically converted data, a plurality of individual level images by rotating each partial image at a smaller rotation angle as the information level is higher and at a larger rotation angle as the information level is lower. As a result, an inclination of the detection target contained in the image after the rotation becomes different from that of the detection target contained in many images for learning, thus reducing the degree to which the partial image is suitable for feature representation of the detection target. The larger the rotation angle for rotating the partial image, the lower the above degree, so that the information level of a generated image becomes lower. For example, information levels are set to 19 levels from 1 to 19. A rotation angle at an information level of 1 is set to 180 degrees, and as the information level increases by every 1, the rotation angle is set to a value smaller by 10 degrees. In addition, when the information level is a maximum value of 19, the original partial image that has not been rotated is used.

Figure 12:
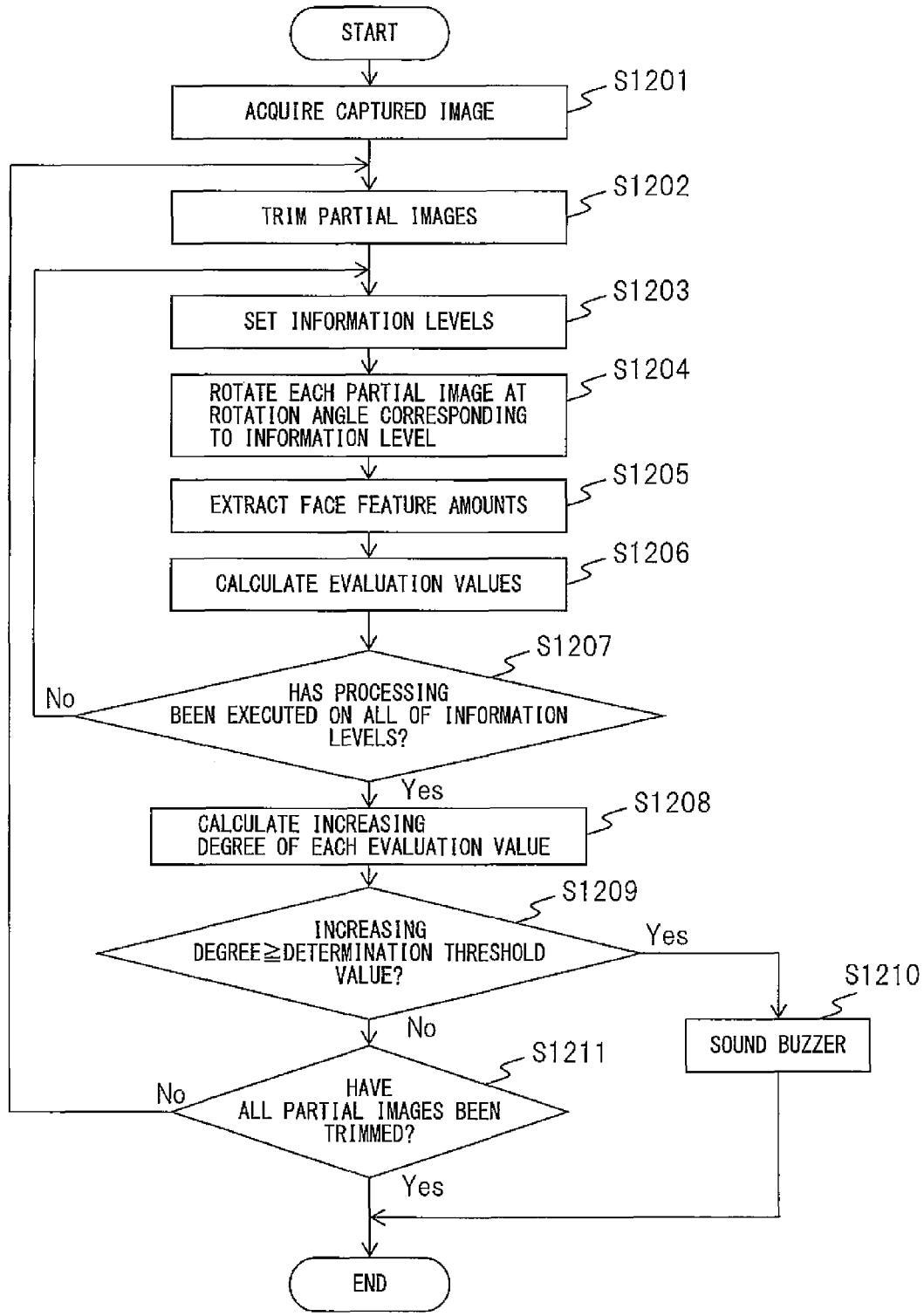
FIG. 12 is a flowchart depicting an operation of target detection processing by an intercom according to a second embodiment.

Hereinbelow, a description will be given of an operation of target detection processing by the intercom according to the second embodiment with reference to a flowchart depicted in FIG. 12. The flowchart can be executed, instead of the flowchart depicted in FIG. 10 described above, by the intercom of the second embodiment. A flow of the operation described below is stored in the storage module 14 and controlled by the control module 15 according to a program read by the control module 15. Processing of steps S1201 to S1202 and S1205 to S1211 in the flowchart depicted in FIG. 12 is the same as that of the steps S1001 to S1002 and S1005 to S1011 in the flowchart depicted in FIG. 10, and thus a description thereof will be omitted. Only processing of steps S1203 to S1204 will be described below.

At the step S1203, the control module 15 sets information levels. The control module 15 sets predetermined information levels in ascending order and executes processing of steps S1204 to S1207 by a number of the set information levels.

The multi-level data generation module 152 generates individual level images by rotating a partial image at a rotation angle corresponding to each information level set at the step S1203, correlates the generated individual level images with the information levels, and sends them to the evaluation value calculation module 153 (step S1204). When the information level is not a maximum value, the multi-level data generation module 152 generates each individual level image by rotating a partial image at a rotation angle corresponding to the information level and sends them to the evaluation value calculation module 153. On the other hand, when the information level is a maximum value, the multi-level data generation module 152 sends the partial image as it is to the evaluation value calculation module 153.

As described above, the intercom according to the present embodiment generates, as a plurality of images mutually different in the information level, a plurality of images by rotating a partial image trimmed from a captured image captured by the imaging module or the captured image at a plurality of rotation angles, and calculates an evaluation value from each of the generated images. Then, the intercom obtains an increasing degree by which each calculated evaluation value increases according to increase of the information level and determines that the captured image contains a face when the obtained increasing degree is equal to or more than a lower limit value of the increasing degree where the partial image or the captured image contains the face. In this way, the intercom can improve accuracy for detecting a face from a captured image.

In a first modified example of the second embodiment, the multi-level data generation module performs geometrical conversion by converting an input image into a trapezoid, instead of rotating the input image. For example, the multi-level data generation module performs trapezoid conversion by reducing a length of any one of four sides of the input image. The multi-level data generation module generates a plurality of data in which as the information level is higher, a ratio of a bottom side and a top side of the trapezoid after the conversion is closer to 1, whereas as the information level is lower, the ratio of the bottom side and the top side thereof after the conversion is more distant from 1. Thereby, a shape of a detection target contained in the image after the conversion becomes different from an original shape thereof, thus reducing a degree to which the image after the conversion is suitable for feature representation of the detection target. As the ratio of the bottom side and the top side of the trapezoid after the conversion is more distant from 1, the above degree becomes lower, so that the information level of a generated image becomes lower.

Alternatively, the multi-level data generation module may perform geometrical conversion by converting an input image into a parallelogram. For example, the multi-level data generation module moves any one side of the four sides of an input image in parallel to a side facing the any one side to convert the image into a parallelogram. In that case, the multi-level data generation module generates a plurality of data in which as the information level is higher, each angle of the parallelogram after the conversion is closer to 90 degrees, and as the information level is lower, each angle thereof after the conversion is more distant from 90 degrees. In this case also, the shape of the detection target contained in the image after the conversion becomes different from the original shape thereof, thus reducing the degree to which the image after the conversion is suitable for feature representation of the detection target. As each angle of the parallelogram becomes more distant from 90 degrees, the above degree becomes lower, so that the information level of a generated image becomes lower.

In a second modified example of the second embodiment, the multi-level data generation module generates, as a plurality of data mutually different in the information level, a plurality of feature parameters by performing mutually different kinds of processing corresponding to geometrical conversion. In this case, a feature parameter(s) determined by preliminarily learning to be input to each weak classifier of the evaluation value calculation module is obtained not by the evaluation value calculation module but by the multi-level data generation module. For example, when the feature parameter(s) is a Haar-like feature parameter(s), the multi-level data generation module rotates, for each adjacent rectangular region corresponding to the Haar-like feature parameter(s) to be input to each weak classifier determined by preliminarily learning, the adjacent rectangular region to obtain a luminance difference between the rotated adjacent rectangular regions as a Haar-like feature parameter(s) to be input to the weak classifier. In this case, for each adjacent rectangular region corresponding to the Haar-like feature parameter(s) to be input to each weak classifier determined by preliminarily learning, the multi-level data generation module obtains a plurality of Haar-like feature parameters while rotating step by step at rotation angles of from 0 to 180 degrees, and uses the obtained plurality of Haar-like feature parameters, as the plurality of data mutually different in the information level. In this way, there can be obtained the same advantageous effect as that in obtaining a Haar-like feature parameter(s) by rotating an input image. Furthermore, the Haar-like feature parameters can be obtained under lower load than in rotation of an input image.

In addition, when the feature parameter(s) is a HOG feature parameter(s), the multi-level data generation module divides the input image into a plurality of cells and calculates, for each cell, a gradient direction and a gradient strength of a pixel value of each pixel to obtain a histogram regarding each gradient direction, whose frequency is a sum of gradient strengths of each gradient direction. Then, regarding each gradient direction of the obtained histogram, the multi-level data generation module obtains a HOG feature parameter(s) by shifting cyclically the frequency, i.e., the sum of gradient strengths of each gradient direction by a predetermined number of steps. The multi-level data generation module obtains a plurality of HOG feature parameters by mutually changing the number of steps for the cyclic shift and uses the obtained plurality of HOG feature parameters, as a plurality of data mutually different in the information level. In this way, a HOG feature parameter(s) obtainable by rotation of a partial image can be obtained under lower load than in rotating a partial image.

In these cases, at the step S1204 of the flowchart of FIG. 12, the multi-level data generation module obtains, for each partial image, a feature parameter(s) corresponding to an information level set at the step S1203 and sends the obtained feature parameter(s) to the evaluation value calculation module. Then, the step S1205 is omitted, and at the step S1206, the evaluation value calculation module calculates an evaluation value from the feature parameter(s) received from the multi-level data generation module.

Additionally, the multi-level data generation module may change the information level of each partial image by the method described in the first embodiment, in addition to geometrical conversion of each partial image. In this way, the number of the plurality of data mutually different in the information level can be increased, thus allowing more detailed analysis of each evaluation value.

In addition, each of the first to the twelfth modified examples of the first embodiment can be applied also to the second embodiment.

Next, a description will be given of a monitoring system incorporating a target detection device according to a third embodiment with reference to the drawings.

The monitoring system of the present embodiment issues an alarm upon detection of a person who has entered in a monitored region. The monitoring system includes a monitoring device and a center device. The monitoring device generates a plurality of individual level images mutually different in the information level from each partial image trimmed from a captured image of the monitored region and calculates an evaluation value from each of the generated individual level images. Then, the monitoring device obtains an increasing degree by which each calculated evaluation value increases according to increase of the information level, and determines that the captured image contains a human body when the obtained increasing degree is equal to or more than a lower limit value of an increasing degree where the partial image contains the human body. When determining that the captured image contains the human body, the monitoring device determines that the person has entered the monitored region and issues an alarm to the center device. In this way, the monitoring system achieves improvement in accuracy for detecting a human body.

Figure 13:
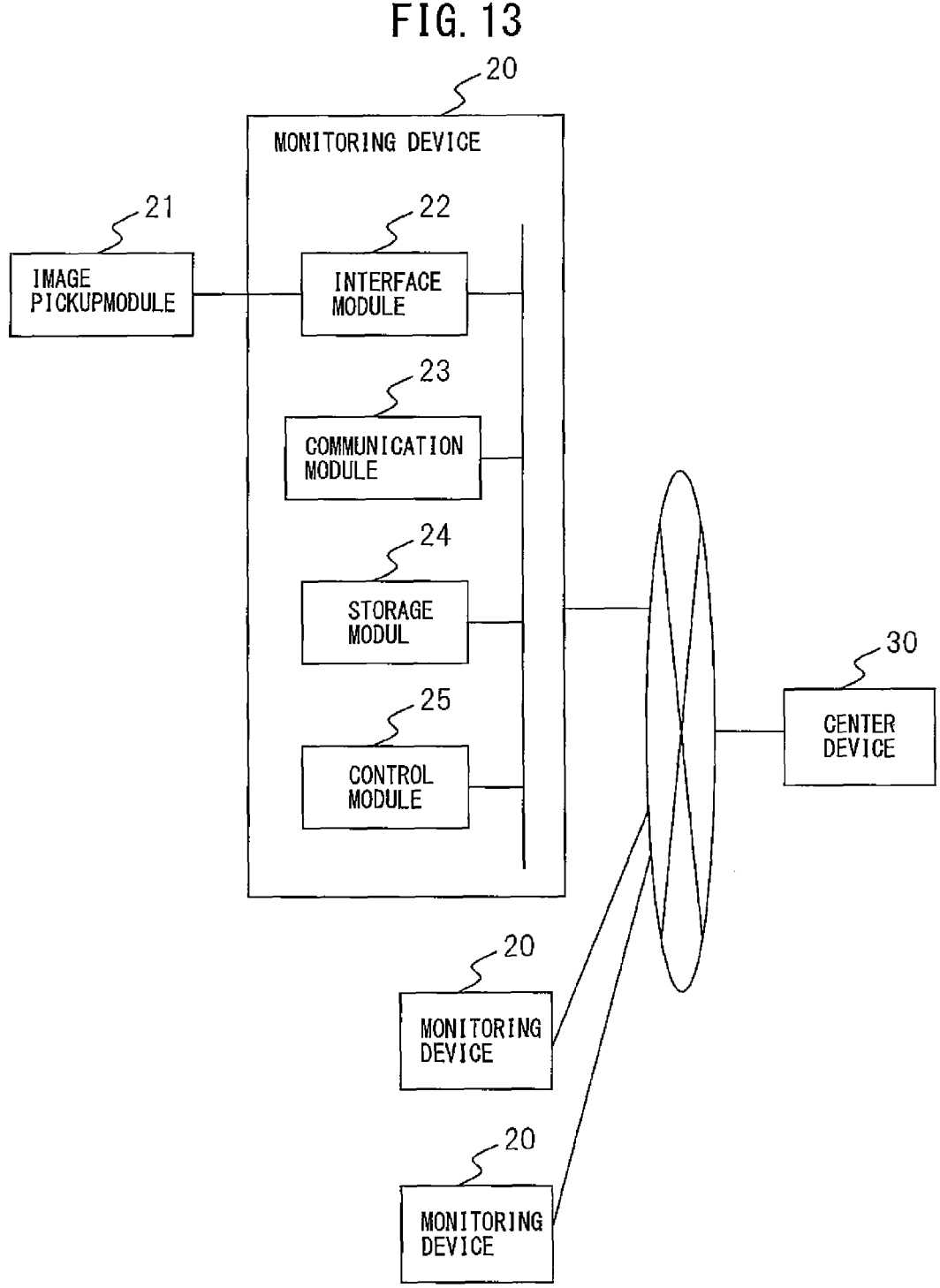
FIG. 13 is a schematic structural diagram of a monitoring system according to a third embodiment.

FIG. 13 is a diagram depicting a schematic structure of the monitoring system according to the present embodiment. As depicted in FIG. 13, the monitoring system includes one or more monitoring devices 20 and a center device 30 connected to the monitoring device(s) 20 through a public communication channel. Upon detection of a person who has entered in a monitored region, the monitoring device(s) 20 transmit an abnormality signal indicating the detection of entry of the person to the center device 30 connected thereto through the public communication channel. The monitoring device(s) 20 includes an imaging module 21, an interface module 22, a communication module 23, a storage module 24, and a control module 25. Each module of the monitoring device(s) 20 will be described in detail below.

The imaging module 21 is a camera that captures a monitored region at a predetermined number of cycles (for example, 200 ms) and includes, for example, photoelectric conversion elements (for example, CCD sensors, C-MOS, or the like) arranged in a two-dimensional array and outputting electric signals corresponding to an amount of received light and an imaging optical system for forming an image of the monitored region on the photoelectric conversion elements. The imaging module 21 is connected to the interface module 22 to send a captured image to the interface module 22. The captured image is the same as that described in the first embodiment and thus a description thereof will be omitted. In the present embodiment, partial images trimmed from the captured image are an example of input data.

The interface module 22 includes an interface circuit connected to the imaging module 21, for example, an interface circuit equivalent to a video interface or a serial bus such as a universal serial bus. The interface module 22 is connected to the control module 25 via, for example, a bus to send a captured image received from the imaging module 21 to the control module 25.

The communication module 23 includes a communication interface for connecting the monitoring device(s) 20 to the public communication channel and a control circuit therefor and connected to the control circuit 25 via, for example, a bus. When notifying the detection of the entry of the person in the monitored region, the communication module 23 performs processing for connecting the monitoring device(s) 20 with the center device 30 according to a control of the control module 25. Then, after establishment of the connection between the monitoring device(s) 20 and the center device 30, the communication module 23 transmits the abnormality signal received from the control module 25 to the center device 30. After ending the transmission of the abnormality signal, the communication module 23 performs processing for detaching the connection between the monitoring device(s) 20 and the center device 30.

The storage module 24 includes semiconductor memories such as a ROM and a RAM, a magnetic recording medium and an access device therefor, an optical recording medium and an access device therefor, or the like. The storage module 24 stores a computer program for controlling the monitoring device(s) 20 and various kinds of data and inputs/outputs the stored information from/to the control module 24. The computer program may be installed into the storage module 24 from a computer readable storage medium such as a CD-ROM (Compact Disk Read Only Memory) or a DVD-ROM (Digital Versatile Disk Read Only Memory). The various kinds of data include reference data of face.

The control module 25 is an example of the target detection device and includes at least one processor of a CPU, a DSP, an MCU, and the like and a peripheral circuit thereof. The control module 25 causes the storage module 24 to store the captured image received from the interface module 22 therein. Then, the control module 25 reads the captured image stored in the storage module 24 to determine whether the captured image contains a human body.

Figure 14:
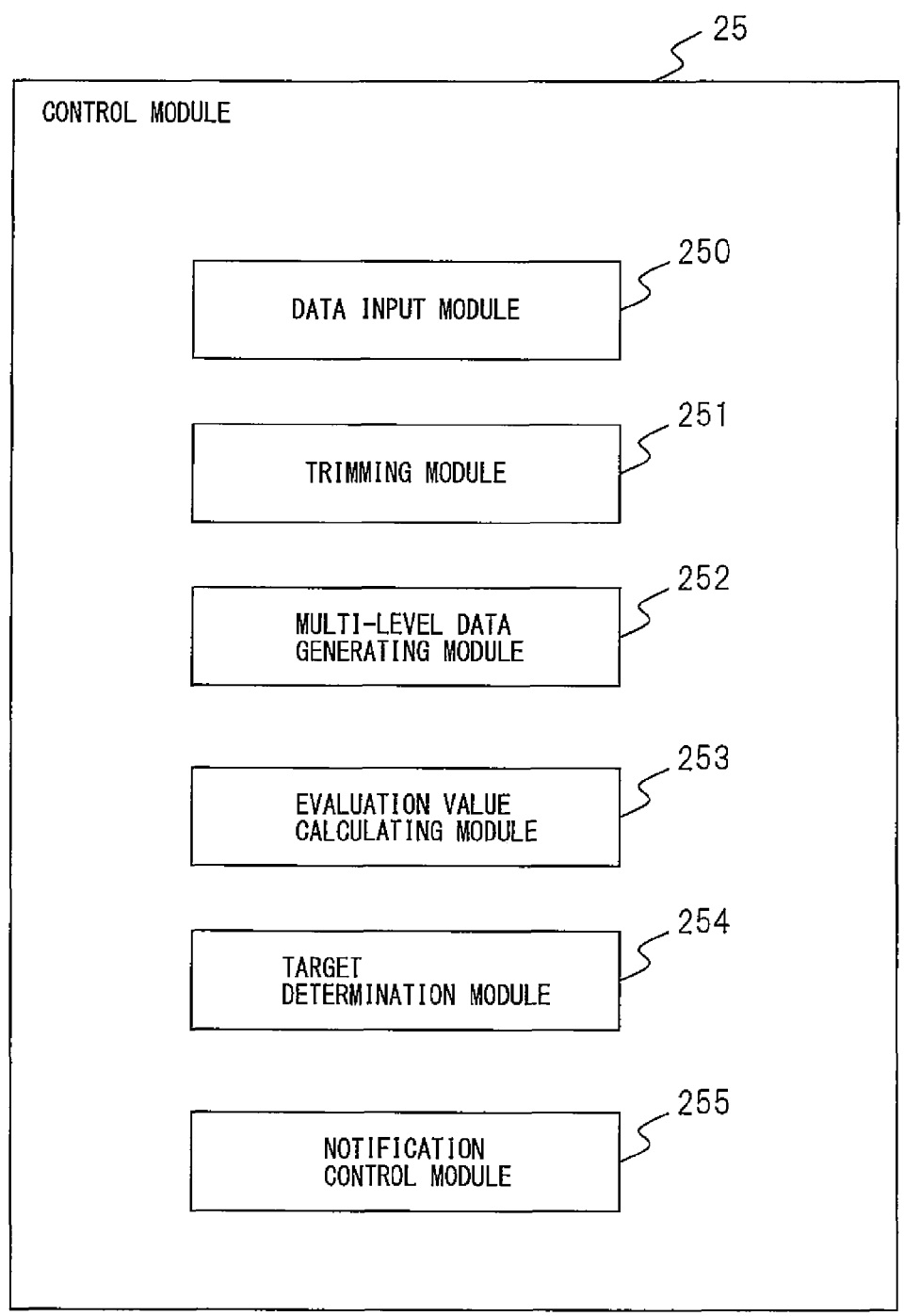
FIG. 14 is a schematic structural diagram of a control module of the monitoring device according to the third embodiment.

FIG. 14 is a diagram depicting a schematic structure of the control module 25. As depicted in FIG. 14, the control module 25 includes a data input module 250, a trimming module 251, a multi-level data generation module 252, an evaluation value calculation module 253, a target determination module 254, and a notification control module 255, as functional modules mounted by software operating on the processor.

Each of these modules included in the control module 25 may be configured by an independent integrated circuit, firmware, a microprocessor, or the like.

Each of the modules in the control module 25 will be described in detail below.

Each time the storage module 24 stores a captured image, the data input module 250 reads the captured image from the storage module 24 and sends the image to the trimming module 251.

Upon each reception of a captured image from the data input module 250, the trimming module 251 executes trimming processing of partial images in a range of a size of the human body in the captured image. Operations other than that are the same as those of the trimming module 151 in the first embodiment and thus a description thereof will be omitted. In addition, the multi-level data generation module 252 is the same as any one of the multi-level data generation 152 in the first embodiment or the multi-level data generation module 152 in the second embodiment, and thus a description thereof will be omitted. In addition, the evaluation value calculation module 253 and the target determination module 254 use information of a human body, instead of the information of the face used in the evaluation value calculation module 153 and the target determination module 154 of the first embodiment. Operations other than that are the same as those in the evaluation value calculation module 153 and the target determination module 154 of the first embodiment and thus a description thereof will be omitted.

The notification control module 255 transmits an abnormality signal to the center device 30 via the communication module 23 when the target determination module 254 determines that any of the partial images contains the human body.

Figure 15:
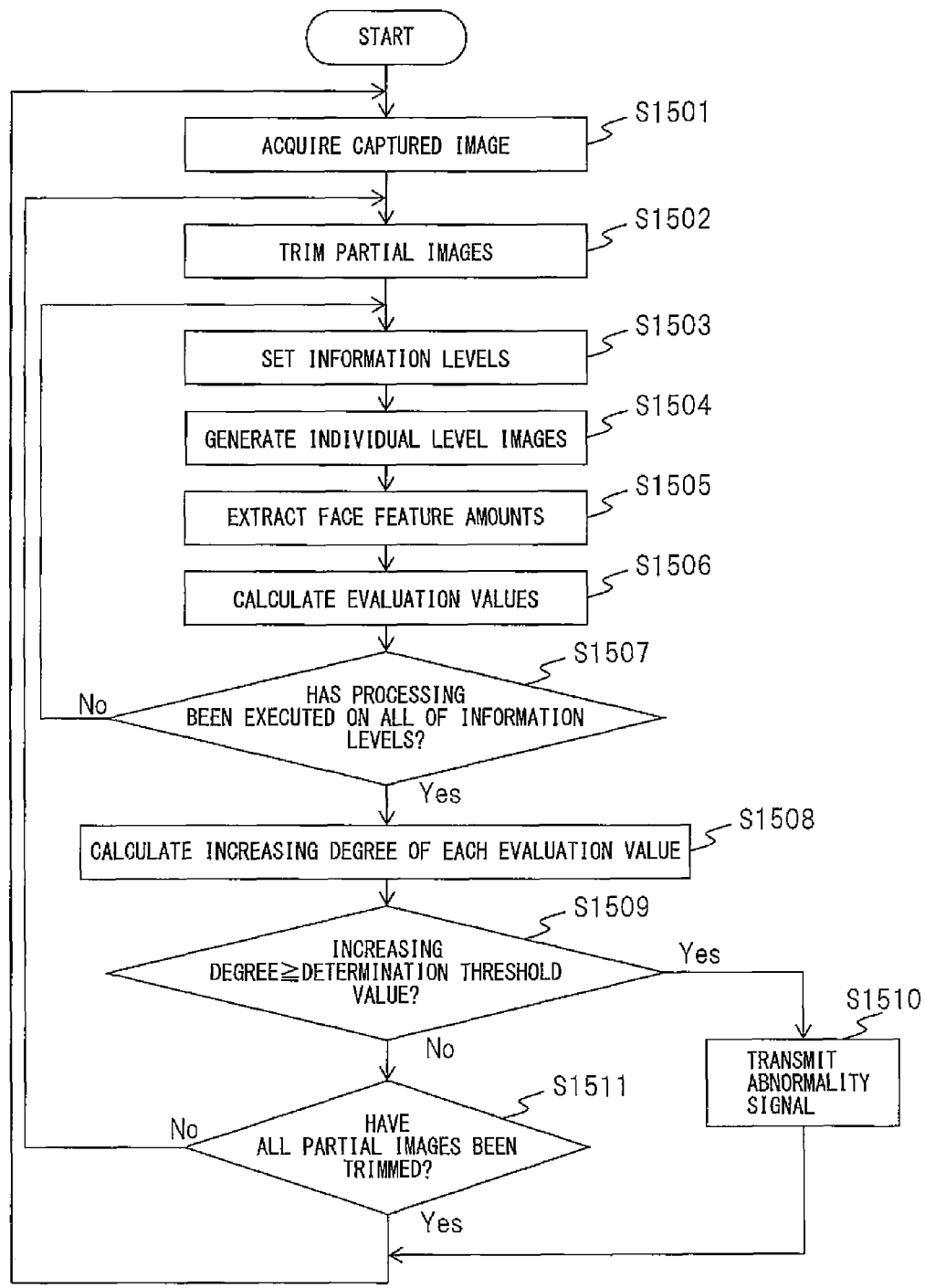
FIG. 15 is a flowchart depicting an operation of target detection processing of the monitoring device according to the third embodiment.

Hereinbelow, a description will be given of an operation of target detection processing by the monitoring device(s) 20 according to the present embodiment, with reference to a flowchart depicted in FIG. 15. A flow of the operation described below is stored in the storage module 24 and controlled by the control module 25 according to a program read by the control module 25. Processing of steps S1502 to S1509 and S1511 in the flowchart depicted in FIG. 15 is the same as that of the steps S1002 to S1009 and S1011 in the flowchart depicted in FIG. 10, and thus a description thereof will be omitted. Only processing of steps S1501 and S1510 will be described below.

At the step S1501, the control module 25 causes the imaging module 21 to capture an image of the monitored region, acquires the captured image through the interface module 22, and stores the image in the storage module 24. Then, the data input module 250 reads the captured image from the storage module 24 and sends the image to the trimming module 251.

In addition, at the step S1509, when an increasing degree calculated by the target determination module 254 is equal to or more than a determination threshold value, the notification control module 255 transmits an abnormality signal to the center device 30 through the communication module 23 (step S1510). When the abnormality signal is transmitted, the control module 25 returns processing to the step S1501 and repeats the processing of the steps S1501 to S1511.

In addition, at the step S1511, when all partial images have been trimmed, the control module 25 also returns processing to the step S1501 and repeats the processing of the steps S1501 to S1511.

As described above, the monitoring device according to the present embodiment generates a plurality of individual level images mutually different in the information level from each partial image trimmed from a captured image of a monitored region and calculates an evaluation value from each of the generated individual level images. Then, the monitoring device obtains an increasing degree by which each calculated evaluation value increases according to increase of the information level, and determines that the captured image contains a human body when the obtained increasing degree is equal to or more than a lower limit value of an increasing degree where the captured image contains the human body. In this way, the monitoring system can improve accuracy for detecting a human body.

Next, a description will be given of a monitoring system incorporating a target detection device according to a fourth embodiment with reference to the drawings.

The monitoring system of the present embodiment issues an alarm upon detection of a person who has entered in a monitored region, similarly to the monitoring system of the third embodiment. However, in the monitoring system of the present embodiment, the monitoring device transmits a captured image of the monitored region to the center device, and the center device determines whether a person has entered the monitored region.

Figure 16:
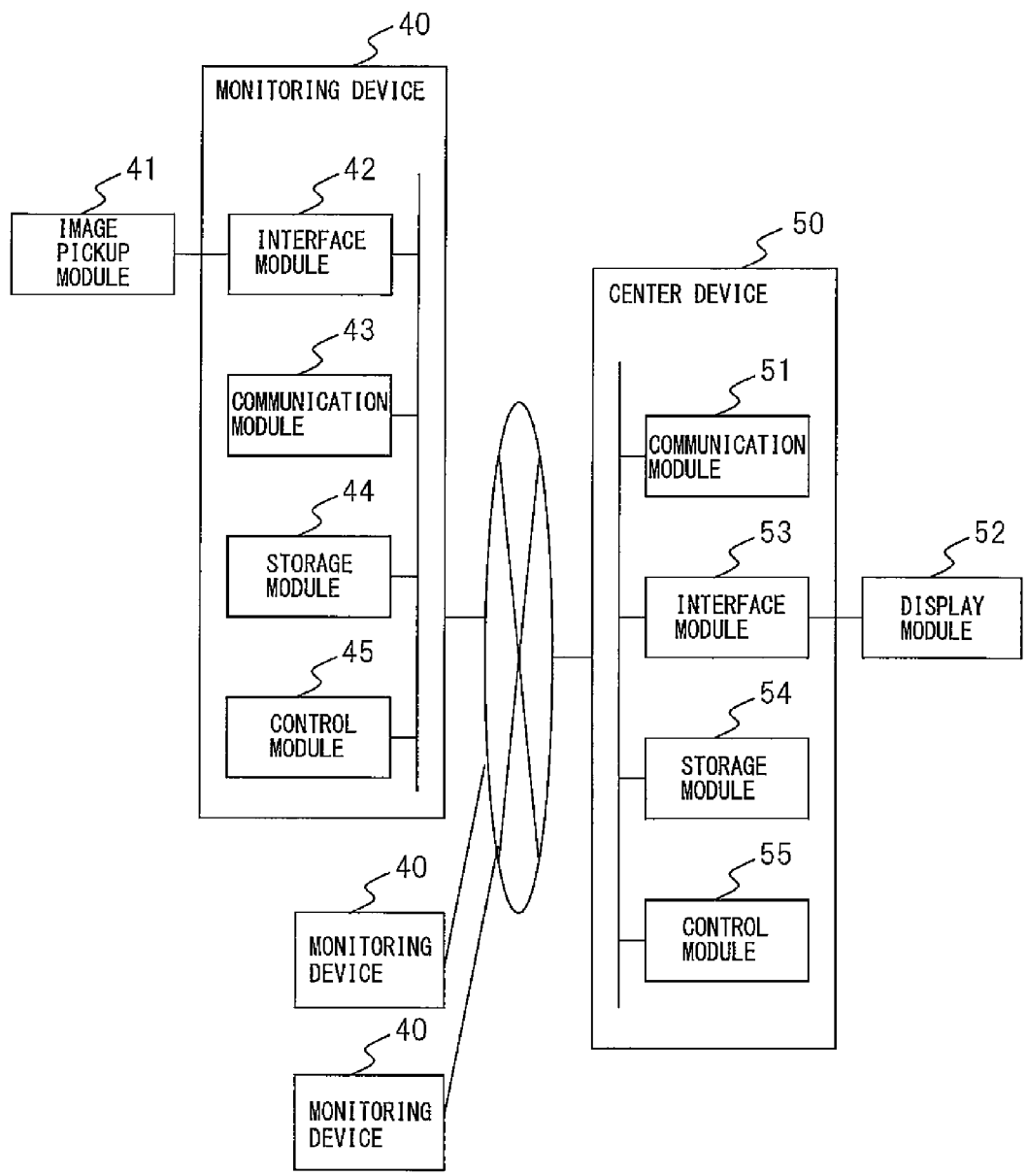
FIG. 16 is a schematic structural diagram of a monitoring system according to a fourth embodiment.

FIG. 16 is a diagram depicting a schematic structure of the monitoring system of the present embodiment. As depicted in FIG. 16, the monitoring system includes one or more monitoring devices 40 and a center device 50 connected to the monitoring device(s) 40 through a public communication channel.

Upon detection of a person who has entered in the monitored region, the monitoring device(s) 40 transmits a captured image of the monitored region to the center device 50 connected thereto through the public communication channel. The monitoring device(s) 40 includes an imaging module 41, an interface module 42, a communication module 43, a storage module 44, and a control module 45. The imaging module 41 and the interface module 42 are the same as the imaging module 21 and the interface module 22 of the monitoring device(s) 20 in the third embodiment, and thus a description thereof will be omitted.

The communication module 43 includes a communication interface for connecting the monitoring device(s) 40 to the public communication channel and a control circuit therefor, similarly to the communication module 23 of the monitoring device(s) 20 in the third embodiment, and is connected to the control circuit 45 via, for example, a bus. The communication module 43 performs processing for connecting the monitoring device(s) 40 with the center device 50 according to a control of the control module 45 when the monitoring device(s) 50 monitors the monitored region. Then, after establishment of the connection between the monitoring device(s) 40 and the center device 50, the communication module 43 transmits the captured image captured by the imaging module 41 and stored in the storage module 44 to the center device 50.

The storage module 44 includes semiconductor memories such as a ROM and a RAM, a magnetic recording medium and an access device therefor, an optical recording medium and an access device therefor, or the like, similarly to the storage module 24 of the monitoring device(s) 20 of the third embodiment. The storage module 44 stores a computer program for controlling the monitoring device(s) 40 and various kinds of data, and inputs/outputs the stored information from/to the control module 45. The computer program may be installed into the storage module 44 from a computer readable storage medium such as a CD-ROM or a DVD-ROM.

The control module 45 includes at least one processor of a CPU, a DSP, an MCU, and the like and a peripheral circuit thereof. Then, the control module 45 transmits the captured image captured by the imaging module 41 and stored in the storage module 44 to the center device 50 through the communication module 43. The control module 45 may compressively encode the captured image using a compression encoding method based on MPEG (Moving Picture Expert Group) specifications or the like and transmit the compressively encoded data to the center device 50.

Upon reception of the captured image from the monitoring device(s) 40, the center device 50 determines whether the received image contains a human body, thereby determining whether a person has entered the monitored region. The center device 50 includes a communication module 51, a display module 52, an interface module 53, a storage module 54, and a control module 55.

The communication module 51 includes a communication interface for connecting the center device 50 to a public communication channel and a control circuit therefor, and is connected to the control module 55 via, for example, via a bus. The communication module 51 performs processing for connecting the monitoring device(s) 40 with the center device 50 according to a control of the control module 55. Then, after establishment of the connection between the monitoring device(s) 40 and the center device 50, the communication module 51 receives the captured image from the monitoring device(s) 40 and stores the received captured image in the storage module 54.

The display module 52 is configured by a display device such as a liquid crystal display or a touch panel display, and displays various kinds of information and the like received from the control module 55 through the interface module 53 to notify to a user.

The interface module 53 includes an interface circuit connected to the display module 52, for example, an interface circuit equivalent to a video interface or a serial bus such as a universal serial bus. The interface module 53 is connected to the control module 55 via, for example, a bus, and outputs various kinds of information received from the control module 55 to the display module 52.

The storage module 54 includes semiconductor memories such as a ROM and a RAM, a magnetic recording medium and an access device therefor, an optical recording medium and an access device therefor, or the like. The storage module 54 stores a computer program for controlling the center device 50 and various kinds of data and inputs/outputs the stored information from/to the control module 55. The computer program may be installed into the storage module 54 from a computer readable storage medium such as a CD-ROM or a DVD-ROM. The various kinds of data include reference data of human body.

The control module 55 is an example of the target detection device and includes at least one processor of a CPU, a DSP, an MCU, and the like and a peripheral circuit thereof. Then, the control module 55 determines whether a human body is contained in a captured image received by the communication module 51 from the monitoring device(s) 40. When the captured image transmitted from the monitoring device(s) 40 is compressively encoded data, the control module 55 decodes the received data to the captured image and determines whether the decoded captured image contains a human body.

Figure 17:
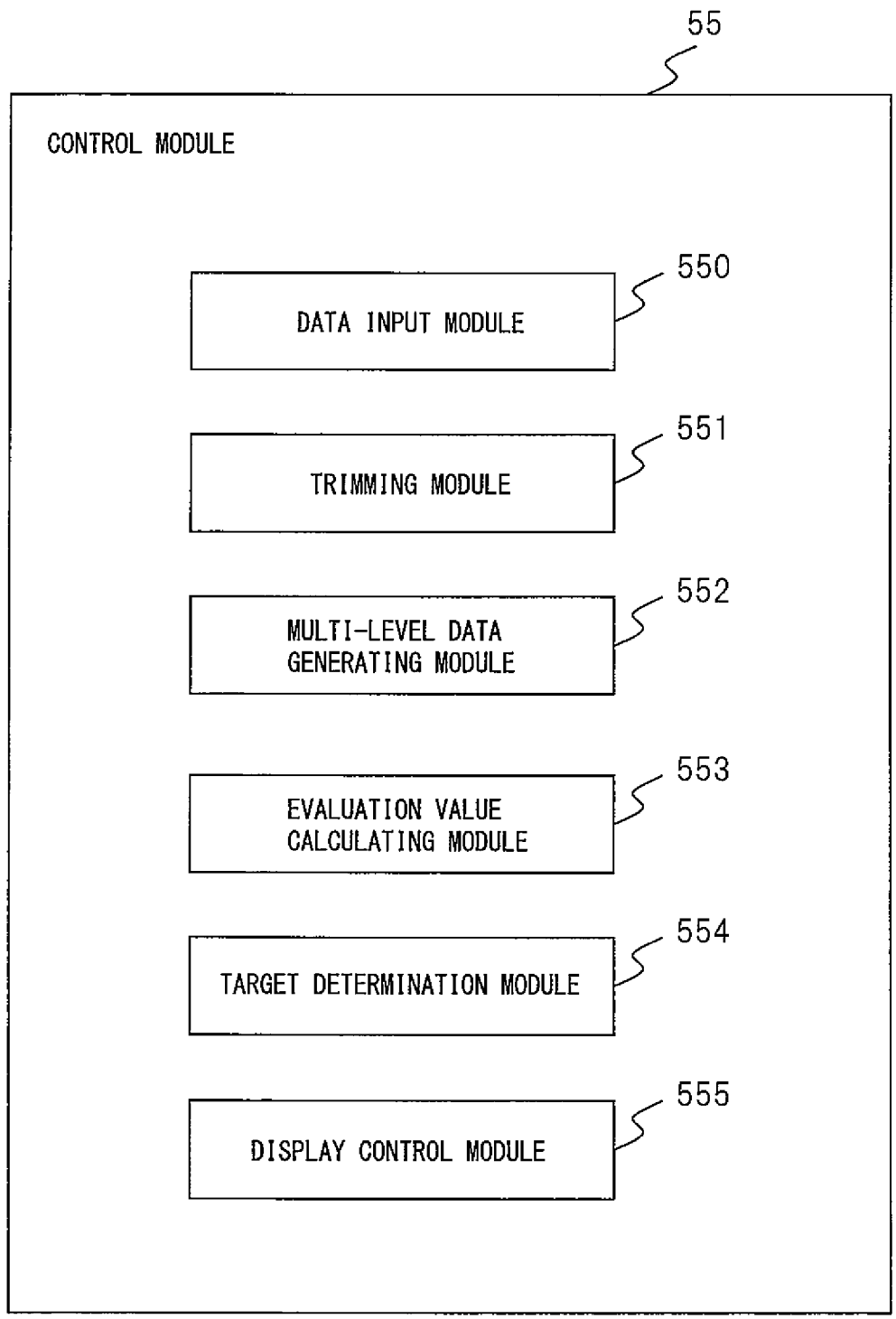
FIG. 17 is a schematic structural diagram of a control module of a center device in the fourth embodiment.

FIG. 17 is a diagram depicting a schematic structure of the control module 55. As depicted in FIG. 17, the control module 55 includes a data input module 550, a trimming module 551, a multi-level data generation module 552, an evaluation value calculation module 553, a target determination module 554, and a display control module 555 as functional modules mounted by software operating on the processor. Each of these modules included in the control module 55 may be configured by an independent integrated circuit, firmware, a microprocessor, or the like.

Each time the communication module 51 receives a captured image from the monitoring device(s) 40 and stores the image in the storage module 54, the data input module 550 reads the captured image from the storage module 54 and sends the image to the trimming module 551. The trimming module 551, the multi-level data generation module 552, the evaluation value calculation module 553, and the target determination module 554 are the same as the trimming module 251, the multi-level data generation module 252, the evaluation value calculation module 253, and the target determination module 254 of the monitoring device(s) 20 in the third embodiment, and thus a description thereof will be omitted.

The display control module 555 displays the entry of a person in the monitored region monitored by the monitoring device(s) 40 on the display module 52 through the interface module 53 when the target determination module 554 determines that a partial image contains a human body.

Figure 18:
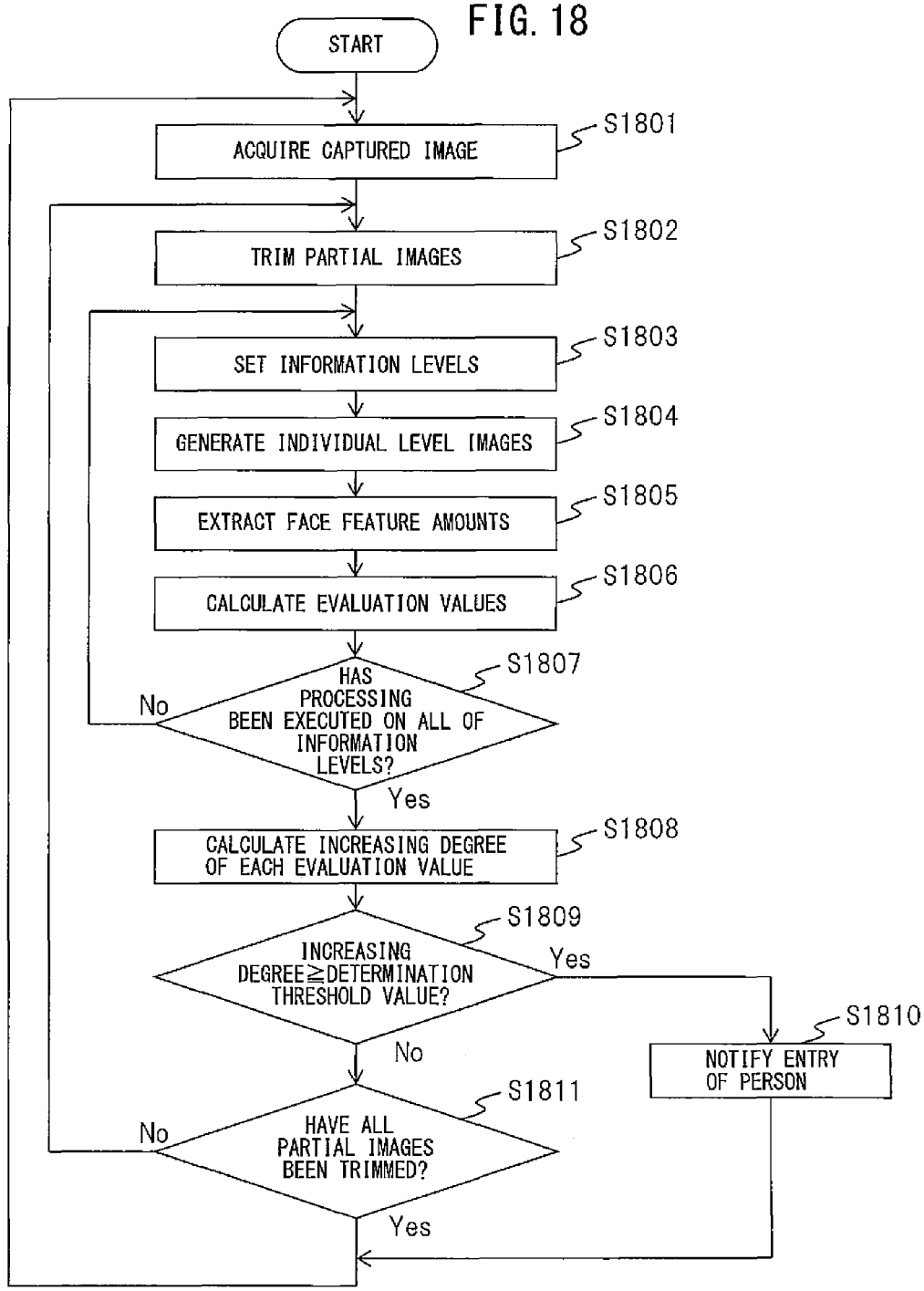
FIG. 18 is a flowchart depicting an operation of target detection processing of the center device in the fourth embodiment.

Hereinbelow, a description will be given of an operation of target detection processing by the center device 50 of the present embodiment with reference to a flowchart depicted in FIG. 18. A flow of the operation described below is stored in the storage module 54 and controlled by the control module 55 according to a program read by the control module 55. Processing of steps S1802 to S1809 and S1811 in the flowchart depicted in FIG. 18 is the same as that of the steps S1002 to S1009 and S1011 in the flowchart depicted in FIG. 10 and thus a description thereof will be omitted. Only processing of steps S1801 and S1810 will be described below.

At the step S1801, the data input module 550 reads the captured image received by the communication module 51 from the monitoring device(s) 40 and stored in the storage module 54 and sends the image to the trimming module 551.

In addition, at the step S1809, when an increasing degree calculated by the target determination module 554 is equal to or more than a determination threshold value, the display control module 555 displays the entry of a person in the monitored region monitored by the monitoring device(s) 40 on the display module 52 through the interface module 53 to notify to an administrator (step S1810). When the entry of the person is displayed on the display module 52, the control module 55 returns processing to the step S1801 and repeats the processing of the steps S1801 to S1811.

In addition, at the step S1811, when all partial images have been trimmed, the control module 55 also returns processing to the step S1801 and repeats the processing of the steps S1801 to S1811.

As described above, the center device according to the present embodiment generates a plurality of individual level images mutually different in the information level from each partial image trimmed from a captured image received from the monitoring device(s), and calculates an evaluation value from each of the generated individual level images. Then, the center device obtains an increasing degree by which each calculated evaluation value increases according to increase of the information level, and determines that the captured image contains a human body when the obtained increasing degree is equal to or more than a lower limit value of an increasing degree where the captured image contains the human body. In this way, the monitoring system can improve accuracy for detecting a human body.

Functional sharing between the monitoring device(s) and the center device is not limited to the example of the monitoring system of the third embodiment or the fourth embodiment. It is possible to change, as needed, as to whether each of the trimming module, the multi-level data generation module, the evaluation value calculation module, and the target determination module is arranged in the monitoring device(s) or the center device.

Next, a description will be given of a scream sensor incorporating a target detection device according to a fifth embodiment with reference to the drawings.

The scream sensor of the present embodiment trims a signal of a voice activity interval from an acoustic signal generated from a sound in a monitored space for monitoring the presence or absence of occurrence of a scream, generates a plurality of signals mutually different in the information level from the trimmed signal, and calculates an evaluation value representing a degree of likelihood of a scream from each of the generated signals. Then, the scream sensor obtains an increasing degree by which each of the calculated evaluation values increases according to increase of the information level, and determines that the acoustic signal contains a scream when the obtained increasing degree is equal to or more than a lower limit value of an increasing degree where the acoustic signal contains the scream. In other words, in the scream sensor according to the present embodiment, input data is an acoustic signal as a time-series signal, and detection target is a scream. In this way, the scream sensor achieves improvement in accuracy for detecting a scream from a sound that has occurred in a monitored space.

Figure 19:
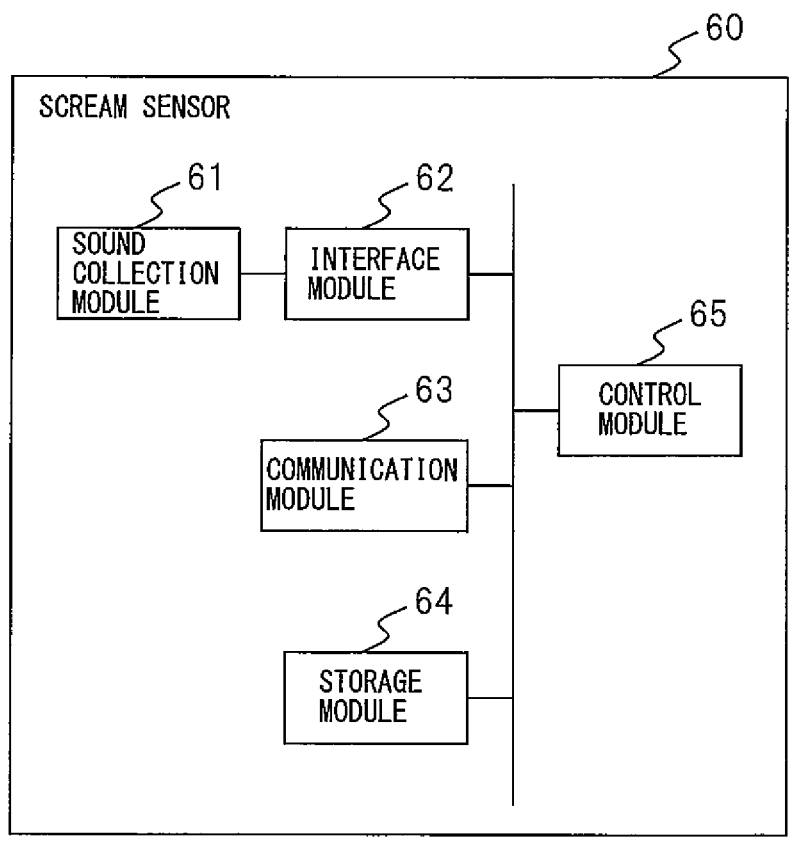
FIG. 19 is a schematic structural diagram of a scream sensor according to a fifth embodiment.

FIG. 19 is a diagram depicting a schematic structure of the scream sensor according to the present embodiment. A scream sensor 60 includes a sound collection module 61, an interface module 62, a communication module 63, a storage module 64, and a control module 65, as depicted in FIG. 19. The following is a detailed description of each module of the scream sensor 60.

The sound collection module 61 is arranged in a position that allows for collection of a sound occurring in the monitored space. The sound collection module 61 includes a microphone, an amplifier, an A/D converter, and the like, and is an electric circuit that converts a sound in the monitored space to an acoustic signal as a digital signal. The sound collection module 61 is connected to the interface module 62 to output the acoustic signal to the interface module 62. An amplification factor of the amplifier is set such that a volume of an acoustic signal output when a scream occurs in the monitored space is in a range of from 70 to 100 dB based on 200 μPa as a reference sound pressure.

The interface module 62 includes an interface circuit connected to the sound collection module 61, for example, an interface circuit equivalent to an audio interface or a serial bus such as a universal serial bus. The interface module 62 is connected to the control module 65 via, for example, a bus, to send an acoustic signal received from the sound collection module 61 to the control module 65.

The communication module 63 includes a communication interface connected to an external apparatus or the like and a control circuit therefor, and is connected to the control module 65 via, for example, a bus. The communication module 63 performs processing for connecting the scream sensor 60 with the external apparatus according to a control of the control module 65 when notifying the detection of a scream in the monitored space. Then, after establishment of the connection between the scream sensor 60 and the external apparatus, the communication module 63 transmits an abnormality signal received from the control module 65 to the external apparatus. After ending the transmission of the abnormality signal, the communication module 63 performs processing for detaching the connection between the scream sensor 60 and the external apparatus.

The storage module 64 includes semiconductor memories such as a ROM and a RAM. The storage module 64 stores a computer program for controlling the scream sensor 60 and various kinds of data, and inputs/outputs the stored information from/to the control module 65. The various kinds of data include reference data of scream.

The control module 65 is an example of the target detection device and includes at least one processor of a CPU, a DSP, an MCU, and the like and a peripheral circuit thereof. The control module 65 stores the acoustic signal received from the interface module 62 in the storage module 64. Then, the control module 65 reads the acoustic signal stored in the storage module 64 to determine whether the acoustic signal contains a scream.

Figure 20:
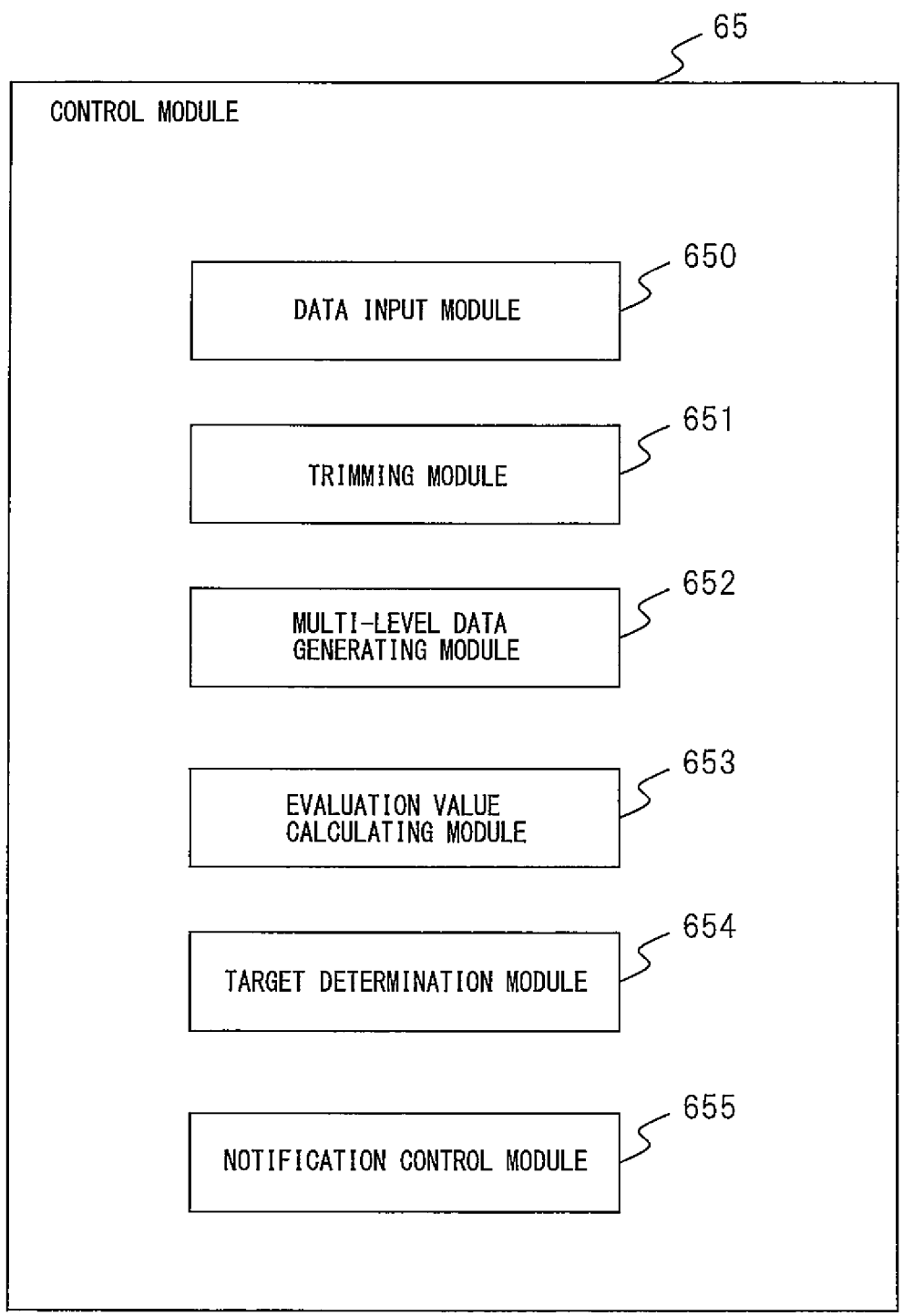
FIG. 20 is a schematic structural diagram of a control module of the scream sensor according to the fifth embodiment.

FIG. 20 is a diagram depicting a schematic structure of the control module 65. As depicted in FIG. 20, the control module 65 includes a data input module 650, a trimming module 651, a multi-level data generation module 652, an evaluation value calculation module 653, a target determination module 654, and a notification control module 655, as functional modules mounted by software operating on the processor.

Each of these modules included in the control module 65 may be configured by an independent integrated circuit, firmware, a microprocessor, or the like.

The following is a detailed description of each module of the control module 65.

The data input module 650 reads the acoustic signal from the storage module 64 to send the signal to the trimming module 651.

The trimming module 651 sequentially trims a signal of a voice activity interval as a target for scream detection processing from the acoustic signal acquired from the data input module 650 to send the trimmed signal of the voice activity interval to the multi-level data generation module 652. Hereinafter, the signal of the voice activity interval trimmed by the trimming module 651 will be referred to as partial acoustic signal. In the present embodiment, partial acoustic signal is an example of the input data. The trimming module 651 sequentially calculates, regarding an acoustic signal collected by the sound collection module 61, a power per frame having a predetermined frame length at every predetermined frame cycle, and sequentially trims, as a partial acoustic signal, a signal of an interval in which a frame having a power equal to or more than a power threshold value has been consecutively detected over a length equal to or more than a duration threshold value. For example, frame length can be 20 msec; frame cycle can be 10 msec; power threshold value can be 70 dB; and duration threshold value can be 20 frames. In this case, consecutive partial acoustic signals may be overlapped each other to be trimmed.

The multi-level data generation module 652 generates multi-level data and correlates the multi-level data with information levels to send to the evaluation value calculation module 653. The multi-level data generation module 652 in the present embodiment generates a plurality of signals mutually different in the information level (hereinafter referred to as individual level acoustic signals) from a partial acoustic signal trimmed from the acoustic signal as input data to generate the original partial acoustic signal and the generated individual level acoustic signals, as multi-level data. The multi-level data generation module 652 generates the individual level acoustic signals by superimposing white noise on a partial acoustic signal to reduce sound intelligibility on the signal.

The multi-level data generation module 652 in the present embodiment generates, as multi-level data, a plurality of signals mutually different in sound intelligibility in which the higher the information level, the higher the sound intelligibility, and the lower the information level, the lower the sound intelligibility. For example, the multi-level data generation module 652 generates a plurality of individual level acoustic signals by superimposing, on the partial signal, a smaller amount of white noise as the information level is higher and a larger amount of white noise as the information level is lower, respectively. For example, the multi-level data generation module 652 generates a plurality of individual level acoustic signals by changing an amount of the white noise to be superimposed, sequentially, to 5 dB, 10 dB, 15 dB, . . . and 70 dB based on the reference sound pressure. As the amount of the white noise to be superimposed is larger, the SN ratio becomes lower and thereby sound intelligibility is reduced, thus reducing a degree to which the corresponding individual level acoustic signal is suitable for feature representation of the scream, whereby the information level becomes lower. For example, information levels are set to 15 levels from 1 to 15. Then, an amount of the white noise to be superimposed at an information level of 1 is set to 70 dB, and as the information level increases by every 1, the amount of the white noise is set to a value smaller by 5 dB. When the information level is a maximum value of 15, the original partial acoustic signal is used where no white noise has been superimposed.

The evaluation value calculation module 653 calculates, for each data included in the multi-level data, an evaluation value representing a degree of likelihood of a detection target, correlates each evaluation value with information level, and sends to the target determination module 654. The evaluation value calculation module 653 in the present embodiment performs frame analysis of each signal received from the multi-level data generation module 652 to extract a feature parameter(s) useful for discrimination of a scream (hereinafter referred to as scream feature parameter(s)). The evaluation value calculation module 653 extracts, as the scream feature parameter(s), a parameter of a spectral envelope that represents a frequency feature parameter(s) of a scream ending. In the present embodiment, an eighth-order LPC (Linear Predictive Coding) cepstrum is used as the parameter of the spectral envelope. LPC cepstrum is a cepstrum modeled using a linear prediction method. The evaluation value calculation module 653 performs frequency conversion of the signal received from the multi-level data generation module 652 by a discrete Fourier transformation to obtain LPC coefficients by the linear prediction method, and converts the obtained LPC coefficients by means of a predetermined recursion formula to calculate LPC cepstral coefficients. The eighth-order LPC cepstrum including a zero-order component consists of 9 coefficients, and each signal includes 20 voice frames. Thus, each scream feature parameter(s) is a feature vector with dimensions of 9×20.

The evaluation value calculation module 653 includes a Real-Adaboost classifier using the feature vector with the dimensions of 9×20 as reference data of scream. The evaluation value calculation module 653 includes a classifier outputting an evaluation value representing a degree of likelihood of a scream whose ending vowel is /a/, a classifier outputting an evaluation value representing a degree of likelihood of a scream whose ending vowel is /e/, and a classifier outputting an evaluation value representing a degree of likelihood of a scream whose ending vowel is /o/. Each of the classifiers is configured by a plurality of weak classifiers and a strong classifier integrating and determining determination results of each weak classifier. A specific element in the scream feature parameter(s) is input to each weak classifier, and based on the input element, each weak classifier outputs a higher value as the probability in which the corresponding partial acoustic signal contains the scream ending vowel corresponding to the classifier is higher and outputs a lower value as the probability is lower. On the other hand, the strong classifier outputs a sum of values output from each weak classifier as an evaluation value.

Which element in the scream feature parameter(s) with dimensions of 9×20 is to be input to each weak classifier is determined by preliminarily learning using scream feature parameters calculated from a plurality of scream acoustic signals for learning containing the scream ending vowels and a plurality of non-scream acoustic signals for learning not containing the scream ending vowels. Learning steps are the same as those in the first embodiment and thus a description thereof will be omitted. Information representing the element in the scream feature parameter(s) to be input to each weak classifier determined by the preliminarily learning and information representing an output of each weak classifier are stored as reference data of scream in the storage module 64.

The evaluation value output by each classifier becomes a positive value when the input scream feature parameter(s) is located in a region on a side of the scream ending with respect to a decision boundary in a feature parameter(s) space, and becomes a negative value when the input scream feature parameter(s) is located in a region on a side of a word ending other than the scream ending with respect to the decision boundary therein. The farther the position of the amount is from the decision boundary, the larger the absolute value thereof is, whereas the closer the position is thereto, the smaller the absolute value is.

The target determination module 654 obtains an increasing degree by which the evaluation value calculated for each data included in the multi-level data increases according to increase of the information level to determine whether the input data contains the detection target depending on whether the obtained increasing degree represents an increasing degree regarding the detection target, and outputs a result of the determination. The target determination module 654 in the present embodiment calculates an increasing degree regarding each evaluation value calculated by the evaluation value calculation module 653 from the original partial acoustic signal and each individual level acoustic signal, and compares the increasing degree with a predetermined determination threshold value. Then, when the increasing degree regarding any of the vowels is equal to or more than the determination threshold value, the target determination module 654 determines that the partial acoustic signal contains a scream, whereas when all the increasing degrees are less than the determination threshold value, the target determination module 654 determines that the partial acoustic signal does not contain any scream. The determination threshold value to be set is a lower limit value of an increasing degree where the input data contains the detection target. For example, the determination threshold value can be set to a value that is based on increasing degrees of evaluation values calculated for a plurality of scream acoustic signals for test containing a scream and increasing degrees of evaluation values calculated for a plurality of non-scream acoustic signals for test not containing the scream by prior experiment and allows the discrimination of these signals. In that case, for example, the determination threshold value can be an average value between an average value of the increasing degrees of the evaluation values calculated regarding the scream acoustic signals for test and an average value of the increasing degrees of the evaluation values calculated regarding the non-scream acoustic signals for test. Alternatively, the determination threshold value can be a maximum value of the increasing degrees of the evaluation values calculated regarding the non-scream acoustic signals for test or a minimum value of the increasing degrees of the evaluation values calculated regarding the scream acoustic signals for test. A method for calculating the increasing degrees of evaluation values is the same as the calculation method described in the first embodiment and thus a description thereof will be omitted.

In order to improve determination accuracy, the target determination module 654 can also make it a condition that a plurality of partial acoustic signals in which the increasing degree of the evaluation value is equal to or more than the determination threshold value should continue, or alternatively can make it a condition that a plurality of partial acoustic signals in which the increasing degree of the evaluation value equal to or more than the determination threshold value should continue regarding the same vowel.

The notifying control module 655 transmits an abnormality signal to the external apparatus through the communication module 63 when the target determination module 654 determines that any of the partial acoustic signals contains a scream.

Hereinbelow, a description will be given of an operation of target detection processing by the scream sensor 60 according to the present embodiment, with reference to a flowchart depicted in FIG. 21. A flow of the operation described below is stored in the storage module 64 and controlled by the control module 65 according to a program read by the control module 65.

The control module 65 causes the sound collection module 61 to collect sounds in the monitored space to acquire acoustic signals through the interface module 62, and stores the signals in the storage module 64. Then, the data input module 650 reads each acoustic signal from the storage module 64 and sends the signal to the trimming module 651 (step S2101). Next, the trimming module 651 determines whether the acquired acoustic signal contains a voice activity interval (step S2102), and repeats the processing of the steps S2101 to S2102 until a voice activity interval is present (NO at step S2102). On the other hand, when the acquired acoustic signal contains a voice activity interval (YES at step S2102), the trimming module 651 trims a signal of the voice activity interval to generate a partial acoustic signal and sends the partial acoustic signal to the multi-level data generation module 652 (step S2103).

Next, the control module 65 sets information levels (step S2104). The control module 65 sets predetermined information levels in ascending order and executes processing of steps S2104 to S2108 by a number of the information levels to be set.

The multi-level data generation module 652 generates individual level acoustic signals corresponding to the information levels set at the step S2104, correlates the generated individual level acoustic signals with the information levels, and sends the signals to the evaluation value calculation module 653 (step S2105). When the information level is not a maximum value, the multi-level data generation module 652 sends individual level acoustic signals in which an amount of white noise corresponding to the information level has been superimposed on the partial acoustic signal, to the evaluation value calculation module 653. On the other hand, when the information level is a maximum value, the multi-level data generation module 652 sends the partial acoustic signal as it is, to the evaluation value calculation module 653.

Next, the evaluation value calculation module 653 extracts scream feature parameters from the individual level acoustic signals received from the multi-level data generation module 652 (step S2106). Next, the evaluation value calculation module 653 calculates evaluation values from the extracted scream feature parameters, correlates the calculated evaluation values with the information levels, and sends them to the target determination module 654 (step S2017).

Next, the control module 65 determines whether the processing of the steps S2104 to S2107 has been executed regarding all of the information levels (step S2108). When the processing of the steps S2104 to S2107 has not been executed regarding all of the information levels (NO at step S2108), the control module 65 returns processing to the step S2104 and repeats the processing of the steps S2104 to S2107. On the other hand, when the processing of the steps S2104 to S2107 has been executed regarding all of the information levels (YES at step S2108), the target determination module 654 calculates, for each vowel of the scream ending, increasing degrees by which evaluation values received by then from the evaluation value calculation module 653 increase according to increase of the information level (step S2109).

Next, the target determination module 654 compares the calculated increasing degrees with a determination threshold value (step S2110). When the increasing degrees regarding all the vowels are less than the determination threshold value (NO at step S2110), the control module 65 returns processing to the step S2101 and repeats processing of the steps S2101 to S2111. On the other hand, when the increasing degree regarding any of the vowels is equal to or more than the determination threshold value (YES at step S2110), the notification control module 655 transmits an abnormality signal to the external apparatus through the communication module 63 (step S2111). When the abnormality signal is transmitted, the control module 65 returns processing to the step S2101 and repeats the processing of the steps S2101 to S2111.

As described above, the scream sensor according to the present embodiment generates a plurality of signals mutually different in the information level from a partial acoustic signal trimmed from an acoustic signal generated from a sound in a monitored space, and calculates an evaluation value from each of the generated signals. Then, the scream sensor obtains the increasing degree by which each of the calculated evaluation values increases according to increase of the information level, to determine that the acoustic signal contains a scream when the obtained increasing degree is equal to or more than a lower limit value of the increasing degree where the acoustic signal contains the scream. In this way, the scream sensor can improve accuracy for detecting a scream from a sound in a monitored space.

In a first modified example of the fifth embodiment, the evaluation value calculation module uses LPC instead of LPC cepstrum, as a scream feature parameter(s). Alternatively, the evaluation value calculation module may use MFCC (Mel-frequency cepstral coefficients) that is a feature parameter(s) in which cepstrum has been weighted as a scream feature parameter(s) in consideration of characteristics of human frequency perception.

In a second modified example of the fifth embodiment the multi-level data generation module generates, as a plurality of signals mutually different in sound intelligibility, a plurality of signals by applying, to an input signal, a band pass filter whose pass band is wider as the information level is higher and narrower as the information level is lower, respectively. In this case, for example, the scream sensor includes a band pass filter allowing setting of pass band. The multi-level data generation module changes a pass band width of the band pass filter to a plurality of pass band widths and causes a partial acoustic signal to pass through the band pass filters having mutually different pass band widths to generate a plurality of signals mutually different in sound intelligibility. The narrower the pass band of the band pass filter, the lower the sound intelligibility of a generated signal, whereas the wider the pass band thereof, the higher the sound intelligibility thereof.

Alternatively, the multi-level data generation module may generate, as the plurality of signals mutually different in sound intelligibility, a plurality of signals by attenuating amplitude of an input signal such that the amplitude of the input signal is larger as the information level is higher and the amplitude thereof is smaller as the information level is lower. In this case, the multi-level data generation module attenuates the amplitude of the input signal, for example, to 0.5-fold, 0.25-fold, 0.125-fold, and the like to generate a plurality of signals mutually different in sound intelligibility. As the amplitude is attenuated to be smaller, the sound intelligibility of a generated signal becomes lower.

Alternatively, the multi-level data generation module may generate, as the plurality of signals mutually different in sound intelligibility, a plurality of signals by causing clipping by amplifying the amplitude of an input signal such that the amplitude of the input signal is smaller as the information level is higher and the amplitude thereof is larger as the information level is lower, respectively. In this case, the multi-level data generation module amplifies the amplitude of the input signal, for example, to 1.2-fold 1.4-fold, 1.6-fold, . . . and 5-fold to intentionally cause clipping, thereby generating a plurality of signals mutually different in sound intelligibility. As the amplitude is increased, the degree of occurrence of clipping increases, so that the sound intelligibility of a generated signal decreases.

Alternatively, the multi-level data generation module may generate, as the plurality of signals mutually different in the information level, a plurality of data by quantizing an input signal by increasing a number of steps for dividing a range in which a value of the signal can fall as the information level is higher and reducing the number of steps as the information level is lower, respectively. In this case, the multi-level data generation module generates a plurality of signals mutually different in the information level by changing the number of steps for quantizing the amplitude of the signal represented in 65536 steps (16 bits) to 2000 steps, 4000 steps, 6000 steps, . . . and 64000 steps. As the number of the steps is smaller, the degree to which the signal can represent features of a scream is lower and thus the information level becomes lower, whereas as the number of the steps is larger, the information level becomes higher.

Alternatively, the multi-level data generation module may generate, as the plurality of signals mutually different in the information level, a plurality of data by sampling an input signal at a higher sampling frequency as the information level is higher, and at a lower sampling frequency as the information level is lower, respectively. In that case, the multi-level data generation module resamples the partial acoustic signal to change the sampling frequency. For example, when the acoustic signal is generated by sampling, at 16 kHz, a sound acquired by the sound collection module from a microphone, the multi-level data generation module resamples the partial acoustic signal at sampling frequencies of 8 kHz, 4 kHz, 2 kHz, and 1 kHz to generate a plurality of signals mutually different in the information level. As the sampling frequency in resampling is lower, the degree to which the signal can represent features of a scream is lower and thus the information level becomes lower, whereas as the sampling frequency is higher, the information level becomes higher.

In a third modified example of the fifth embodiment, similarly to the fourth modified example of the first embodiment, the multi-level data generation module generates, as a plurality of data mutually different in the information level, a plurality of data by reducing the masking degree as the information level is higher and increasing the masking degree as the information level is lower. In this case, the multi-level data generation module sets a range of a predetermined time width centered on a specific position in a time axis direction of the input signal and replaces signal values in the set range with a fixed value. The multi-level data generation module changes the time width of the set range to a plurality of time widths to generate a plurality of signals mutually different in the information level. As the time width of the set range is larger, the degree to which the signal is suitable for feature representation of a scream is lower and thus the information level becomes lower, whereas as the time width of the set range is smaller, the information level becomes higher. A signal that can be used as a signal having a highest information level is one for which the time width of the set range is 0, i.e. the original signal.

In a fourth modified example of the fifth embodiment, the multi-level data generation module generates a feature parameter(s) of a detection target and generates a plurality of data mutually different in analysis level of the feature parameter(s) to use the data as a plurality of data mutually different in the information level. In this case, the feature parameter(s) determined by preliminarily learning to be input to each weak classifier of the evaluation value calculation module is obtained not by the evaluation value calculation module but by the multi-level data generation module. The multi-level data generation module changes the analysis level of the obtained feature parameter(s) to a plurality of analysis levels.

For example, the multi-level data generation module generates, as the plurality of data mutually different in analysis level, a plurality of data by increasing an analysis order regarding LPC cepstrum to be obtained for a partial acoustic signal as the information level is higher and reducing the analysis order as the information level is lower. In that case, the multi-level data generation module obtains respective LPC cepstrums of first order, second order, third order, . . . and eighth order regarding the partial acoustic signal. The evaluation value calculation module calculates an evaluation value from each of the LPC cepstrums of the respective orders. Even when obtaining LPC cepstrum of any order, the number of elements of a feature vector to be input to the classifiers of the evaluation value calculation module is not be changed. As for any element whose LPC cepstral coefficients have not been obtained, a small random value is set. The smaller the order of the LPC cepstrum, the lower the information level of the obtained feature parameter(s), whereas the larger the order thereof, the higher the information level.

Alternatively, the multi-level data generation module may generate, as the plurality of data mutually different in analysis level, a plurality of data by multiplying each of the eighth-order LPC cepstral coefficients by a positive coefficient α of 1 or less ($0 < \alpha \leq 1.0$) that is larger as the information level is higher and that is smaller as the information level is lower. The multi-level data generation module changes the coefficient α to a plurality of values in a predetermined range, for example, to 0.1, 0.2, 0.3, . . . and 1.0. As the coefficient α is smaller, the features of the scream are more lost and thus the information level of the obtained feature parameter(s) is lower. Conversely, as the coefficient α is larger, the information level thereof is higher.

Figure 21:
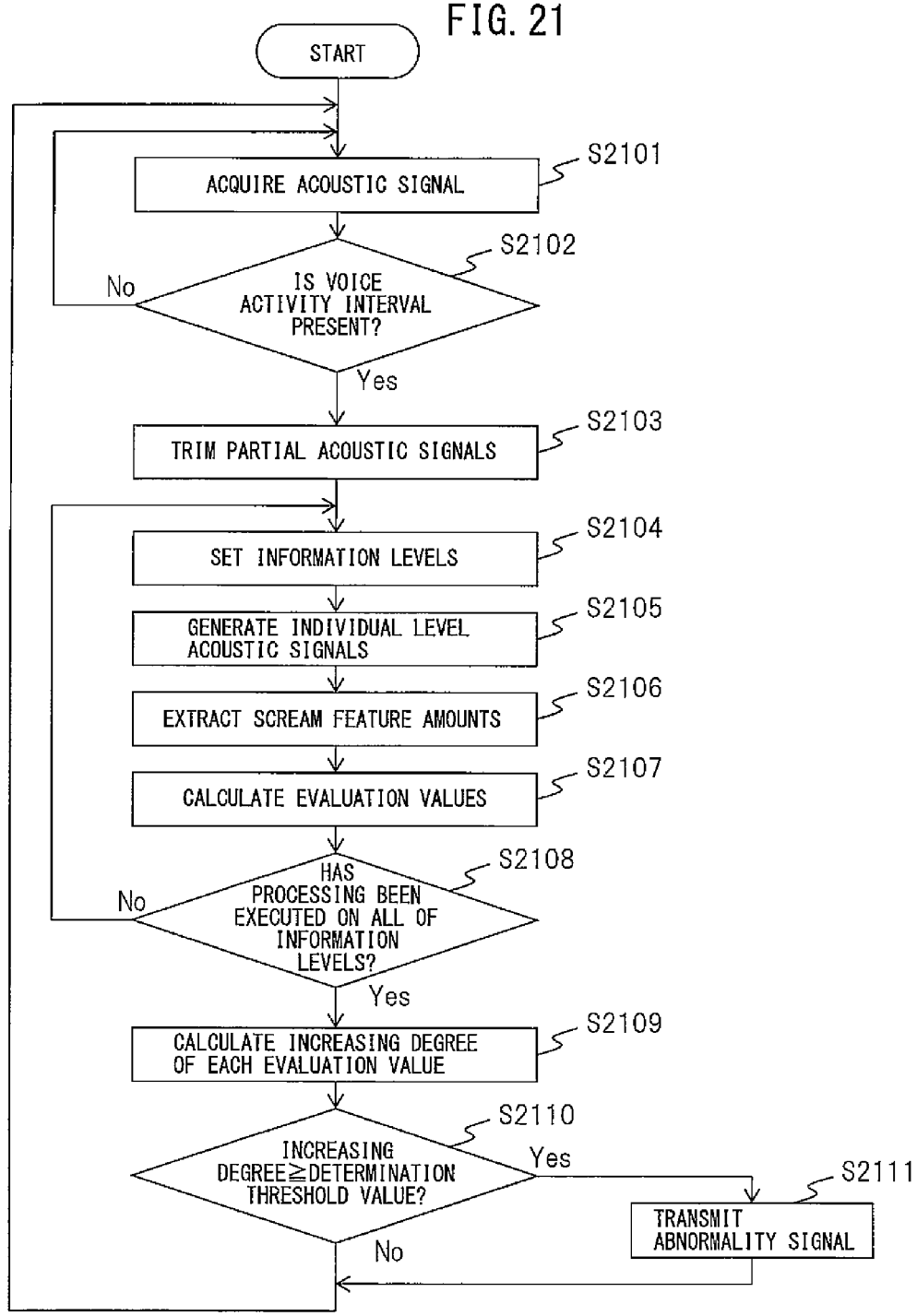
FIG. 21 is a flowchart depicting an operation of target detection processing of the scream sensor according to the fifth embodiment.

In these cases, at the step S2105 of the flowchart in FIG. 21, the multi-level data generation module obtains eighth-order LPC cepstrum coefficients from a partial acoustic signal, changes analysis levels of the eighth-order LPC cepstrum coefficients in accordance with the information levels set at the step S2104, and sends the coefficients to the evaluation value calculation module. Then, the step S2106 is omitted, and at the step S2107, the evaluation value calculation module calculates evaluation values from the eighth-order LPC cepstrum coefficients received from the multi-level data generation module.

In this way, accuracy for scream detection can be improved also by obtaining feature parameters mutually different in analysis level and calculating an evaluation value from each of the feature parameters to determine whether the acoustic signal contains a scream based on the increasing degree by which the evaluation value increases according to increase of the analysis level.

In a fifth modified example of the fifth embodiment, the evaluation value calculation module calculates evaluation values using an HMM (Hidden Markov Model), instead of calculating evaluation values using the Real-Adaboost classifier. In that case, the scream sensor extracts in advance, for each scream ending, scream feature parameters regarding a plurality of scream acoustic signals for learning containing a vowel of the scream ending to perform HMM learning. Then, the evaluation value calculation module inputs a scream feature parameter(s) generated from a partial acoustic signal to the HEM relating to each of the scream endings to use the resulting output as an evaluation value regarding each scream ending.

In a sixth modified example of the fifth embodiment, the evaluation value calculation module calculates evaluation values by pattern matching, instead of calculating evaluation values by classifiers subjected to machine learning. In this case, the control module extracts, for each scream ending, scream feature parameters from a plurality of scream acoustic signals for learning containing the vowel of the scream ending and generates in advance a representative scream feature parameter(s) by performing averaging processing or the like on the scream feature parameters. The generated representative scream feature parameter(s) is stored as reference data in the storage module. The evaluation value calculation module obtains a distance value between the scream feature parameter(s) generated from the partial acoustic signal and the representative scream feature parameter(s) stored as reference data to output a reciprocal of the obtained distance value as an evaluation value.

In addition, the sixth and the ninth to the twelfth modified examples of the first embodiment can also be applied in the fifth embodiment.

In addition, as in the monitoring system according to the fourth embodiment, a center device may be provided to be connected to the scream sensor, and the scream sensor may transmit an acoustic signal to the center device so that the center device may determine whether the received acoustic signal contains a scream. Alternatively, the present embodiment may be configured such that each of the trimming module, the multi-level data generation module, the evaluation value generation module, and the target determination module is arranged arbitrarily in either the scream sensor or the center device.

Next, a description will be given of a human body sensor in which a target detection device according to a sixth embodiment is incorporated, with reference to the drawings.

The human body sensor according to the present embodiment extracts only a Doppler component contained in a reflected wave obtained by transmitting an electromagnetic wave to a monitored region to use as a Doppler signal. The human body sensor generates a plurality of signals mutually different in the information level from a signal trimmed from the Doppler signal and calculates an evaluation value from each of the signals. Then, the human body sensor obtains an increasing degree by which each of the calculated evaluation values increases according to increase of the information level to determine that the Doppler signal is attributed to movement of a human body when the obtained increasing degree is equal to or more than a lower limit value of an increasing degree where the Doppler signal is attributed to movement of the human body. In other words, in the human body sensor according to the present embodiment, input data is a Doppler signal as a time-series signal, and detection target is a human body. In this way, the human body sensor achieves improvement in accuracy for detecting a human body.

Figure 22:
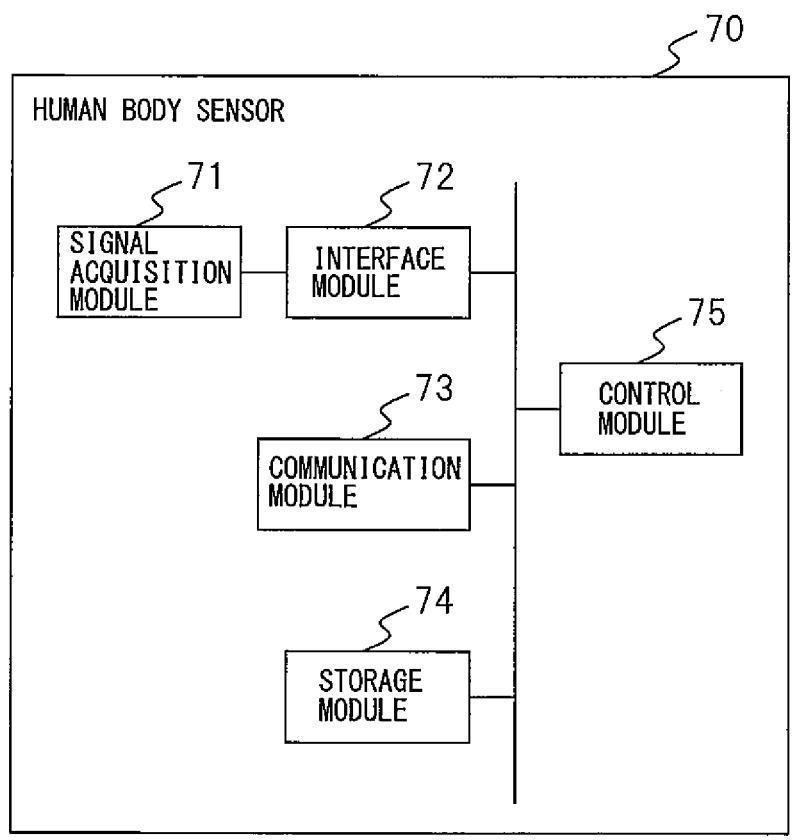
FIG. 22 is a schematic structural diagram of a human body sensor according to a sixth embodiment.

FIG. 22 is a diagram depicting a schematic structure of the human body sensor according to the present embodiment. A human body sensor 70 includes a signal acquisition module 71, an interface module 72, a communication module 73, a storage module 74, and a control module 75, as depicted in FIG. 22. The following is a detailed description of each module of the human body sensor 70.

The signal acquisition module 71 is provided with a transmitter, receiver, a mixer, an amplifier, and an A/D converter and is an electric circuit for acquiring a Doppler signal occurring due to movement of an object in a monitored region. The signal acquisition module 71 sends a transmission wave of a micro wave band or a millimeter wave band to the monitored region by the transmitter and receives a reflected wave thereagainst by the receiver. Then, the signal acquisition module 71 mixes the transmission wave and the reflected wave by the mixer to extract only a Doppler component contained in the reflected wave, amplifies a signal of the extracted Doppler component by the amplifier and samples the amplified signal by the A/D converter to digitize the signal, thereby obtaining a Doppler signal. The signal acquisition module 71 is connected to the interface module 72 to output the Doppler signal to the interface module 72.

The interface module 72 includes an interface circuit connected to the signal acquisition module 71, for example, an interface circuit equivalent to a serial bus such as a universal serial bus. The interface module 72 is connected to the control module 75 via, for example, a bus to send the Doppler signal received from the signal acquisition module 71 to the control module 75.

The communication module 73 includes a communication interface connected to an external apparatus or the like and a control circuit therefor and is connected to the control module 75 via, for example, a bus. The communication module 73 performs processing for connecting the human body sensor 70 with the external apparatus according to a control of the control module 75 when notifying the detection of a human body in the monitored region. Then, after establishment of the connection between the human body sensor 70 and the external apparatus, the communication module 73 transmits an abnormality signal received from the control module 75 to the external apparatus. The communication module 73 performs processing for detaching the connection between the human body sensor 70 and the external apparatus after ending the transmission of the abnormality signal.

The storage module 74 includes semiconductor memories such as a ROM and a RAM. The storage module 74 stores a computer program for controlling the human body sensor 70 and various kinds of data and inputs/outputs the stored information from/to the control module 75. The various kinds of data include reference data of human body.

The control module 75 is an example of the target detection device and includes at least one processor of a CPU, a DSP, an MCU, and the like and a peripheral circuit thereof. The control module 75 stores the Doppler signal received from the interface module 72 in the storage module 74. Then, the control module 75 reads the Doppler signal stored in the storage module 74 to determine whether the Doppler signal is attributed to movement of a human body.

Figure 23:
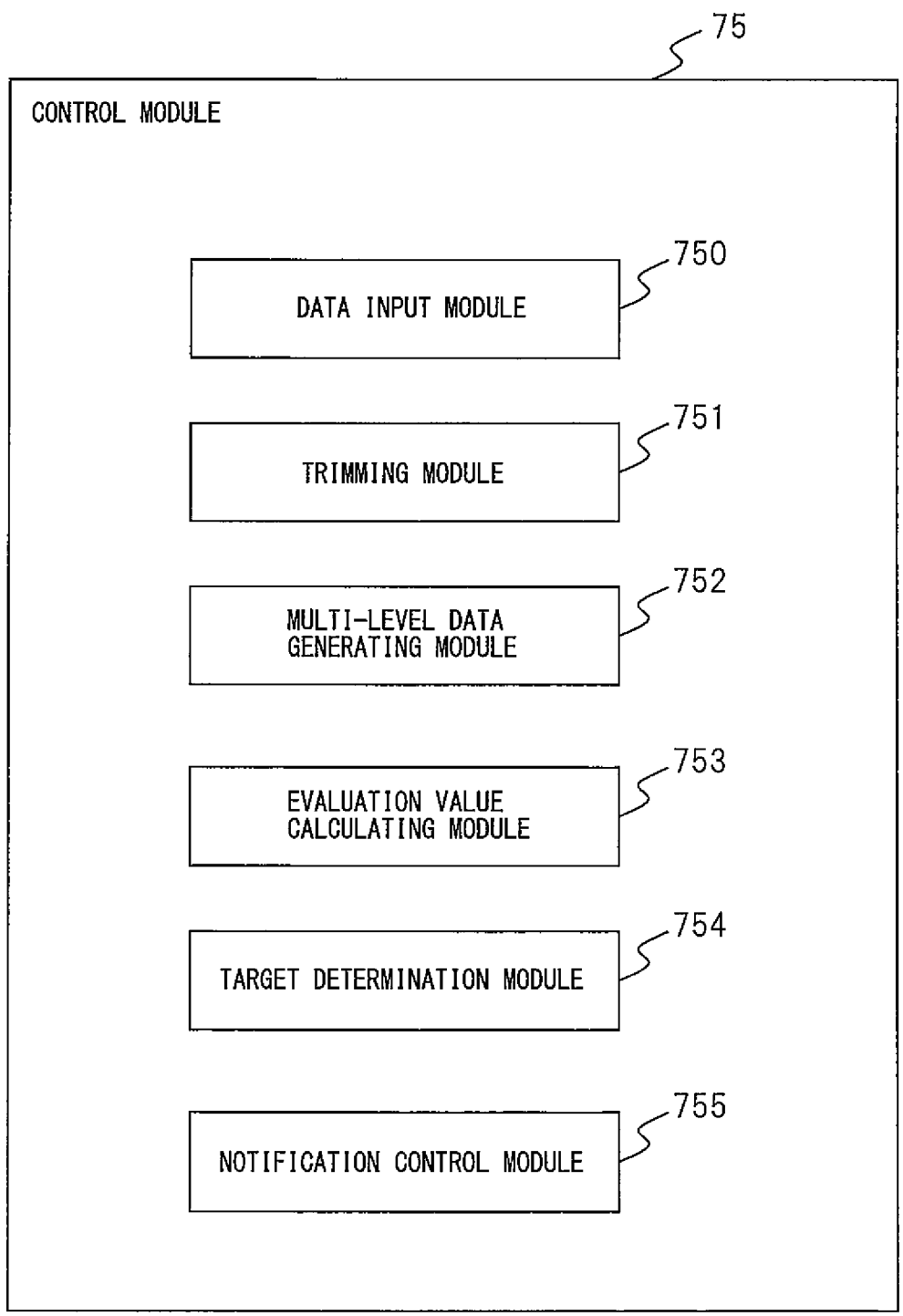
FIG. 23 is a schematic structural diagram of a control module of the human body sensor according to the sixth embodiment.

FIG. 23 is a diagram depicting a schematic structure of the control module 75. As depicted in FIG. 23, the control module 75 includes a data input module 750, a trimming module 751, a multi-level data generation module 752, an evaluation value calculation module 753, a target determination module 754, and a notification control module 755, as functional modules mounted by software operating on the processor.

Each of these modules included in the control module 75 may be configured by an independent integrated circuit, firmware, a microprocessor, or the like.

The following is a detailed description of each module of the control module 75.

The data input module 750 reads a Doppler signal from the storage module 74 and sends the signal to the trimming module 751.

The trimming module 751 sequentially trims a signal of an interval as a target for detection processing from the Doppler signal acquired from the data input module 750 and sends the signal of the trimmed interval to the multi-level data generation module 752. The signal of the interval trimmed by the trimming module 751 will be hereinafter referred to as partial Doppler signal. In the present embodiment, partial Doppler signal is an example of the input data. The trimming module 751 sequentially trims, as a partial Doppler signal, a signal of an interval having a predetermined length. For example, the trimming module 751 trims, per second, data of 8 seconds as a partial Doppler signal from the Doppler signal. In other words, when the frequency of sampling by the A/C converter is 11.025 kHz, 88,200 data are trimmed per 11,025 data, as a partial Doppler signal. In this case, data of 7 seconds are overlapped between consecutively trimmed partial Doppler signals.

The multi-level data generation module 752 generates multi-level data, correlates the multi-level data with information levels, and sends the data to the evaluation value calculation module 753. The multi-level data generation module 752 in the present embodiment generates a plurality of signals mutually different in the information level (hereinafter referred to as individual level Doppler signals) from a partial Doppler signal as input data to generates the original partial Doppler signal and the generated individual level acoustic signals, as multi-level data. The multi-level data generation module 752 generates the plurality of individual level Doppler signals by superimposing, on the partial Doppler signal, a smaller amount of white noise as the information level is higher and a larger amount of white noise as the information level is lower, respectively. For example, the multi-level data generation module 752 generates a plurality of individual level Doppler signals by changing the white noise to be superimposed sequentially to 3 dB, 6 dB, 9 dB, . . . and 90 dB based on an output of a transmission wave. SN ratio becomes lower as the amount of the white noise to be superimposed becomes larger, thus reducing a degree to which the signal is suitable for feature representation of a human body, so that the information level becomes lower. For example, information levels are set to 31 levels from 1 to 31. Then, an amount of white noise to be superimposed at an information level of 1 is set to 90 dB, and as the information level becomes larger by every 1, the amount thereof is set to a value smaller by 3 dB. When the information level is a maximum value of 31, the original partial Doppler signal is used on which no white noise has been superimposed.

The evaluation value calculation module 753 calculates an evaluation value representing a degree of likelihood of a detection target for each data included in the multi-level data, correlates each evaluation value with each information level, and sends them to the target determination module 754. The evaluation value calculation module 753 in the present embodiment performs frame analysis of each signal received from the multi-level data generation module 752 to extract a feature parameter(s) useful for discrimination of a human body (hereinafter referred to as human body feature parameter(s)). For example, the evaluation value calculation module 753 divides, per frame cycle of 250 msec, the partial Doppler signal into frame units having a frame length of 1000 msec. In this case, data of 750 msec are overlapped each other between adjacent frames. Then, the evaluation value calculation module 753 performs frequency conversion of each frame by high-speed Fourier transformation to calculate a peak frequency, a peak power, and a half value width of a frequency spectrum of each frame. Next, the evaluation value calculation module 753 uses a vector in which the peak frequencies, the peak powers, and the half value widths are arranged in time series, as a human body feature parameter(s). Since the partial Doppler signal consists of 29 frames, a human body feature parameter(s) extracted from each partial Doppler signal is a feature vector with dimensions of 3×29. In other words, the human body feature parameter(s) represents a time-varying amount of peak frequency, a time-varying amount of peak power, and a time-varying amount of half value width.

The evaluation value calculation module 753 includes a Real-Adaboost classifier using a human body feature parameter(s). The Real-Adaboost classifier outputs an evaluation value representing a degree of likelihood of a human body. Each classifier is configured by a plurality of weak classifiers and a strong classifier for integrating and determining determination results of each of the weak classifiers. A specific element in the human body feature parameter(s) is input to each of the weak classifiers. Based on the input element, each weak classifier outputs a higher value as the corresponding partial Doppler signal is more likely to be attributed to movement of a human body and outputs a lower value as the corresponding partial Doppler signal is less likely to be attributed thereto. On the other hand, the strong classifier outputs a sum of output values obtained from each weak classifier, as an evaluation value.

Which element in the human body feature parameter(s) is to be input to each weak classifier is determined by preliminarily learning using human body feature parameters calculated from a plurality of human body Doppler signals for learning attributed to movement of a human body and a plurality of non-human body Doppler signals for learning not attributed to movement of the human body. Learning steps are the same as those in the first embodiment and thus a description thereof will be omitted. Information representing the element in the human body feature parameter(s) determined by the preliminarily learning to be input to each weak classifier and information representing an output of each weak classifier are stored as reference data for human body detection in the storage module 74.

The evaluation value output by each classifier becomes a positive value when the obtained human body feature parameter(s) is located in a region on a human body side with respect to a decision boundary in a feature parameter(s) space, and becomes a negative value when the human body feature parameter(s) is located in a region not on the human body side with respect to the decision boundary therein. The farther the position of the amount is from the decision boundary, the larger the absolute value thereof is, whereas the closer the position is thereto, the smaller the absolute value is.

The target determination module 754 obtains an increasing degree by which an evaluation value calculated for each data included in multi-level data increases according to increase of the information level to determine whether the input data contains a detection target depending on whether the obtained increasing degree represents an increasing degree regarding the detection target, and outputs a result of the determination. The target determination module 754 in the present embodiment calculates an increasing degree regarding each evaluation value calculated by the evaluation value calculation module 753 from the original partial Doppler signal and each individual level Doppler signal and compares the increasing degree with a predetermined determination threshold value. Then, the target determination module 754 determines that the partial Doppler signal is attributed to movement of a human body when the increasing degree is equal to or more than a determination threshold value, and determines that the partial Doppler signal is not attributed to movement of the human body when the increasing degree is less than the determination threshold value. The determination threshold value to be set is a lower limit value of an increasing degree where the input data contains the detection target. For example, the determination threshold value can be set to a value that is based on increasing degrees of evaluation values calculated for a plurality of human body Doppler signals for test attributed to movement of a human body and increasing degrees of evaluation values calculated for a plurality of non-human body Doppler signals for test not attributed to movement of the human body by prior experiment and allows the discrimination of the signals. In that case, for example, the determination threshold value can be an average value between an average value of the increasing degrees of evaluation values calculated for the human body Doppler signals for test and an average value of the increasing degrees of evaluation values calculated for the non-human body Doppler signals for test. Alternatively, the determination threshold value may be may be set to a maximum value of the increasing degrees of evaluation values calculated for the non-human body Doppler signals for test or a minimum value of the increasing degrees of evaluation values calculated for the human body Doppler signals for test. A method for calculating the increasing degrees of evaluation values is the same as the calculation method described in the first embodiment and thus a description thereof will be omitted.

In order to improve detection accuracy, the target determination module 754 can also make it a condition that a plurality of partial Doppler signals with the increasing degree of the evaluation value equal to or more than the determination threshold value should continue.

The notification control module 755 transmits an abnormality signal to the external apparatus through the communication module 73 when the target determination module 754 determines that any of the partial Doppler signals is attributed to movement of a human body.

Hereinbelow, a description will be given of an operation of target detection processing by the human body sensor 70 according to the present embodiment, with reference to a flowchart depicted in FIG. 24. A flow of the operation described below is stored in the storage module 74 and controlled by the control module 75 according to a program read by the control module 75.

The data input module 750 of the control module 75 causes the signal acquisition module 71 to generate a Doppler signal, acquires the Doppler signal through the interface module 72, and stores the signal in the storage module 74. This operation is constantly performed, independently from the flowchart of FIG. 24. The trimming module 751 trims partial Doppler signals from the Doppler signal in the storage module 74 and sends the signals to the multi-level data generation module 752 (step S2401). The control module 75 executes processing of steps S2401 to 2409 for each partial Doppler signal trimmed by the trimming module 751.

Next, the control module 75 sets information levels (step S2402). The control module 75 sets predetermined information levels in ascending order and executes processing of steps S2402 to S2406 by a number of the set information levels.

The multi-level data generation module 752 generates individual level Doppler signals corresponding to the information levels set at the step S2402, correlates the generated individual level Doppler signals with the information levels, and sends the signals to the evaluation value calculation module 753 (step S2403). When the information level is not a maximum value, the multi-level data generation module 752 sends individual level Doppler signals generated by superimposing an amount of white noise corresponding to the information level on a partial Doppler signal to the evaluation value calculation module 753. On the other hand, when the information level is the maximum value, the multi-level data generation module 752 sends the partial Doppler signal as it is to the evaluation value calculation module 753.

Next, the evaluation value calculation module 753 extracts a human body feature parameter(s) from each of the individual level Doppler signals received from the multi-level data generation module 752 (step S2404). Then, the evaluation value calculation module 753 calculates evaluation values from the extracted human body feature parameters, correlates the calculated evaluation values with the information levels, and sends the evaluation values to the target determination module 754 (step S2405).

Next, the control module 75 determines whether the processing of the steps S2402 to S2405 has been executed regarding all the information levels (step S2406). When the processing of the steps S2402 to S2405 has not been executed regarding all of the information levels (NO at step S2406), the control module 75 returns processing to the step S2402 and repeats the processing of the steps S2402 to S2405. On the other hand, when the processing of the steps S2402 to S2405 has been executed regarding all of the information levels (YES at step S2406), the target determination module 754 calculates an increasing degree by which each of the evaluation values received by then from the evaluation value calculation module 753 increases according to increase of the information level (step S2407).

Next, the target determination module 754 compares the calculated increasing degree with a determination threshold value (step S2408). When the increasing degree is equal to or more than the determination threshold value (YES at step S2408), the notification control module 755 transmits an abnormality signal to the external apparatus through the communication module 73 (step S2409). When the abnormality signal is transmitted, the control module 75 returns processing to the step S2401 and repeats the processing of the steps S2401 to S2409.

On the other hand, when the increasing degree is less than the determination threshold value (NO at step S2408), the control module 75 returns processing to the step S2401 and repeats the processing of the steps S2401 to S2409.

As described above, the human body sensor according to the present embodiment generates a Doppler signal from a transmission wave transmitted in a monitored region and a reflected wave thereagainst, generates a plurality of signals mutually different in the information level from each partial Doppler signal trimmed from the Doppler signal, and calculates an evaluation value from each of the generated signals. Then, the human body sensor obtains an increasing degree by which the evaluation value increases according to increase of the information level to determine that the partial Doppler signal is attributed to movement of a human body when the obtained increasing degree is equal to or more than a lower limit value of an increasing degree where the partial Doppler signal is attributed to movement of the human body. In this way, the human body sensor can improve accuracy for detecting a human body.

In a first modified example of the sixth embodiment, the multi-level data generation module generates, as a plurality of signals mutually different in the information level, a plurality of data by applying, to an input signal, a band pass filter whose pass band is wider as the information level is higher and whose pass band is narrower as the information level is lower, respectively. In this case, for example, the human body sensor includes a band pass filter allowing changing of pass band. The multi-level data generation module changes a pass band width of the band pass filter to a plurality of pass band widths, and causes a partial Doppler signal to pass through the band pass filters having mutually different pass band widths to generate a plurality of signals mutually different in the information level. The narrower the pass band of the band pass filter, the lower the information level of a generated signal, whereas the wider the pass band, the higher the information level thereof.

Alternatively, the multi-level data generation module may generate, as the plurality of signals mutually different in the information level, a plurality of signals by attenuating amplitude of an input signal such that the amplitude of the input signal is larger as the information level is higher and the amplitude thereof is smaller as the information level is lower. In this case, the multi-level data generation module attenuates the amplitude of the input signal, for example, to 0.5-fold, 0.25-fold, 0.125-fold, and the like to generate a plurality of signals mutually different in the information level. As the amplitude is attenuated to be smaller, the information level of a generated signal becomes lower.

Alternatively, the multi-level data generation module may generate, as the plurality of signals mutually different in the information level, a plurality of data by sampling an input signal at a higher sampling frequency as the information level is higher and at a lower sampling frequency as the information level is lower, respectively. In that case, the multi-level data generation module resamples the partial Doppler signal to change the sampling frequency. For example, when the frequency of sampling by the A/D converter of the signal acquisition module is 11.025 kHz, the multi-level data generation module resamples the partial Doppler signal at sampling frequencies of 8 kHz 4 kHz 2 kHz, and 1 kHz to generate a plurality of signals mutually different in the information level. The lower the sampling frequency in resampling, the lower the information level of a generated signals, whereas the higher the sampling frequency, the higher the information level.

In a second modified example of the sixth embodiment, the multi-level data generation module generates a feature parameter(s) regarding a detection target, and generates a plurality of data mutually different in analysis level of the feature parameter(s) to use the data as a plurality of data mutually different in the information level. In this case, a feature parameter(s) determined by preliminarily learning to be input to each weak classifier of the evaluation value calculation module is obtained not by the evaluation value calculation module but by the multi-level data generation module. The multi-level data generation module changes the analysis level of the obtained feature parameter(s) into a plurality of analysis levels.

For example, the multi-level data generation module generates, as a plurality of data mutually different in analysis level, a plurality of data by increasing a frame length for frame analysis of an input signal as the information level is higher and reducing the frame length therefor as the information level is lower. In that case, the multi-level data generation module fixes a frame cycle of the input signal to 250 msec and sets the frame length in a plurality of steps: 15.625 msec, 31.25 msec, 62.5 msec, 125 msec, 250 msec, 500 msec, and 1000 msec. The multi-level data generation module performs frequency conversion of each frame with each set frame length by high-speed Fourier transformation to calculate a peak frequency, a peak power, and a half value width of a frequency spectrum of each frame, so as to use them as a human body feature parameter(s). The evaluation value calculation module calculates each evaluation value from the human body feature parameters obtained from the frames with each frame length. The shorter the frame length, the lower the information level of the obtained feature parameter(s), whereas the longer the frame length, the higher the information level thereof.

Alternatively, the multi-level data generation module may generate, as the plurality of data mutually different in analysis level, a plurality of data by multiplying each element of a feature vector of the human body feature parameter(s) by a positive coefficient α of 1 or less ($0 < \alpha \le 1.0$) that is larger as the information level is higher and that is smaller as the information level is lower. The multi-level data generation module changes the coefficient α to a plurality of values in a predetermined range, for example, to 0.1, 0.2, 0.3, ... and 1.0. The smaller the coefficient α, the lower the information level of an obtained feature parameter(s), whereas the larger the coefficient α, the higher the information level thereof.

In these cases, at the step S2404 of the flowchart of FIG. 24, the multi-level data generation module obtains human body feature parameters from the partial Doppler signals in accordance with the information levels set at the step S2403 and sends them to the evaluation value calculation module. Then, the step S2405 is omitted, and at the step S2406, the evaluation value calculation module calculates evaluation values from the human body feature parameters received from the multi-level data generation module.

Accordingly, accuracy for detecting a human body can be improved also by obtaining feature parameters mutually different in analysis level and calculating an evaluation value from each of the feature parameters to determine whether the Doppler signal is attributed to movement of a human body based on the increasing degree by which the evaluation value increases according to increase of the analysis level.

In addition, each of the sixth modified example, the seventh modified example, and the ninth to the twelfth modified examples of the first embodiment can also be applied in the sixth embodiment.

In addition, as in the monitoring system according to the fourth embodiment, a center device may be provided to be connected to the human body sensor, and the human body sensor may transmit a Doppler signal to the center device so that the center device may determine whether the received Doppler signal is attributed to movement of a human body. Alternatively, the present embodiment may be configured such that each of the trimming module, the multi-level data generation module, the evaluation value generation module, and the target determination module is arranged arbitrarily in either the human body sensor or the center device.

As described hereinabove, those skilled in the art are able to make various changes in accordance with embodiments implemented within the scope of this application.

REFERENCE SIGNS LIST

10: Intercom
11, 21, 41: Imaging module
12: Output module
13, 22, 42, 53, 62, 72: Interface module
14, 24, 44, 54, 64, 74: Storage module
15, 25, 45, 55, 65, 75: Control module
150, 250, 550, 650, 750: Data input module
151, 251, 551, 651, 751: Trimming module
152, 252, 552, 652, 752: Multi-level data generation module
153, 253, 553, 653, 753: Evaluation value calculation module
154, 254, 554, 654, 754: Target determination module
155: Sounding control module
20, 40: Monitoring device
23, 43, 51, 63, 73: Communication module
255, 655, 755: Notification control module
555: Display control module
30, 50: Center device
52: Display module
60: Scream sensor
61: Sound collection module
70: Human body sensor
71: Signal acquisition module

What is claimed is:

1. A target detection device that determines whether input data acquired from a data input module contains a detection target, the target detection device comprising:
a multi-level data generation module for generating, from the input data, a plurality of data mutually different in an information level, the information level being a degree representing the detection target;
an evaluation value calculation module for calculating, for each of the plurality of data, an evaluation value representing a degree of likelihood of the detection target; and
a target determination module for determining that the input data contains the detection target when an increasing degree by which the evaluation value calculated for each of the plurality of data mutually different in the information level increases according to increase of the information level is equal to or more than a lower limit value of the increasing degree where the input data contains the detection target.

2. The target detection device according to claim 1, wherein the target determination module obtains, for each information level, a difference by subtracting the evaluation value of an information level lower by a predetermined number of levels than each information level from the evaluation value of each information level, and obtains any one of a total value and a maximum value of obtained differences, as the increasing degree.

3. The target detection device according to claim 1, wherein the target determination module obtains a difference by subtracting, in ascending order of the information level, the evaluation value of an information level lower by a predetermined number of levels than each information level from the evaluation value of each information level, obtains, each time the difference is obtained, an accumulated value of the obtained difference as the increasing degree, determines whether the obtained increasing degree is equal to or more than the lower limit value, and determines that the input data contains the detection target when the obtained increasing degree is equal to or more than the lower limit value.

4. The target detection device according to claim 1, wherein the target determination module obtains, as the increasing degree, any one of a difference obtained by subtracting a minimum value of the evaluation values of all the information levels from a maximum value of the evaluation values thereof and a ratio of the maximum value of the evaluation values of all the information levels to the minimum value of the evaluation values thereof.

5. The target detection device according to claim 1, wherein the target determination module determines that the input data contains the detection target when the increasing degree is equal to or more than the lower limit value and a representative evaluation value which is a statistical representative value of the evaluation value calculated for each of the plurality of data mutually different in the information level is equal to or more than a predetermined value, whereas determines that the input data does not contain the detection target when the increasing degree is less than the lower limit value or the representative evaluation value is less than the predetermined value.

6. The target detection device according to claim 1, wherein the information level is a degree of detail to which each of the plurality of data represents the detection target.

7. The target detection device according to claim 6, wherein
the input data is image data; and
the multi-level data generation module generates, as the plurality of data mutually different in the information level, a plurality of data mutually different in sharpness in which the sharpness is higher as the information level is higher, whereas the sharpness is lower as the information level is lower.

8. The target detection device according to claim 7, wherein the multi-level data generation module generates, as the plurality of data mutually different in the sharpness, a plurality of data by applying an averaging filter which has a smaller filter size as the information level is higher and which has a larger filter size as the information level is lower, respectively.

9. The target detection device according to claim 6, wherein the multi-level data generation module generates, as the plurality of data mutually different in the information level, a plurality of data by superimposing, on the input data, a smaller amount of noise as the information level is higher and a larger amount of noise as the information level is lower, respectively.

10. The target detection device according to claim 6, wherein
the input data is image data; and
the multi-level data generation module generates, as the plurality of data mutually different in the information level, a plurality of data mutually different in image intelligibility in which the image intelligibility is higher as the information level is higher, whereas the image intelligibility is lower as the information level is lower.

11. The target detection device according to claim 10, wherein the multi-level data generation module generates, as the plurality of data mutually different in the image intelligibility, a plurality of data by increasing a number of gradation levels of pixel values of the input data as the information level is higher and by reducing the number of gradation levels of the pixel values of the input data as the information level is lower.

12. The target detection device according to claim 1, wherein the information level is a degree to which each of the plurality of data is suitable for feature representation of the detection target.

13. The target detection device according to claim 12, wherein the multi-level data generation module generates, as the plurality of data mutually different in the information level, a plurality of data by reducing a masking degree for a portion which represents the detection target in the input data as the information level is higher and by increasing the masking degree for the portion as the information level is lower.

14. The target detection device according to claim 12, wherein the multi-level data generation module generates a feature parameter of the detection target, and generates, as the plurality of data mutually different in the information level, a plurality of data mutually different in information amount regarding the feature parameter such that the information amount represented by the feature parameter is larger as the information level is higher, whereas the information amount is smaller as the information level is lower.

15. The target detection device according to claim 14, wherein the multi-level data generation module generates, as the plurality of data mutually different in the information level, a plurality of data by multiplying respectively the feature parameter by a positive coefficient of 1 or less which is larger as the information level is higher and which is smaller as the information level is lower.

16. The target detection device according to claim 12, wherein
the input data is image data; and
the multi-level data generation module generates, as the plurality of data mutually different in the information level, a plurality of data by geometrically converting the input data in a lesser degree as the information level is higher and in a greater degree as the information level is lower.

17. A target detection method for determining whether input data acquired from a data input module contains a detection target in a target detection device, the target detection method comprising:
generating, from the input data, a plurality of data mutually different in an information level, the information level being a degree representing the detection target;
calculating, for each of the plurality of data, an evaluation value representing a degree of likelihood of the detection target; and
determining, by the target detection device, that the input data contains the detection target when an increasing degree by which the evaluation value calculated for each of the plurality of data mutually different in the information level increases according to increase of the information level is equal to or more than a lower limit value of the increasing degree where the input data contains the detection target.

* * * * *